US012408161B2

(12) United States Patent
Zhang et al.

(10) Patent No.: US 12,408,161 B2
(45) Date of Patent: Sep. 2, 2025

(54) INFORMATION INDICATION METHOD AND APPARATUS IN A MULTI-BEAM TRANSMISSION SCENARIO

(71) Applicant: HUAWEI TECHNOLOGIES CO., LTD., Shenzhen (CN)

(72) Inventors: Di Zhang, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/674,559

(22) Filed: May 24, 2024

(65) Prior Publication Data
US 2024/0314767 A1    Sep. 19, 2024

Related U.S. Application Data

(63) Continuation of application No. 17/403,437, filed on Aug. 16, 2021, now abandoned, which is a
(Continued)

(30) Foreign Application Priority Data

Feb. 15, 2019  (CN) .......................... 201910118164.7
Nov. 5, 2019   (CN) .......................... 201911072492.4

(51) Int. Cl.
*H04W 72/04*     (2023.01)
*H04B 7/08*      (2006.01)
(Continued)

(52) U.S. Cl.
CPC ........ *H04W 72/1263* (2013.01); *H04B 7/088* (2013.01); *H04L 1/1614* (2013.01); *H04W 80/02* (2013.01)

(58) Field of Classification Search
CPC ............. H04W 72/1263; H04W 72/23; H04W 72/046; H04W 72/542; H04W 80/02;
(Continued)

(56) References Cited

U.S. PATENT DOCUMENTS 11,723,027 B2 *  8/2023  Lee ..................... H04L 5/0051
                                                         370/329
11,974,270 B2 *  4/2024  Matsumura .......... H04L 5/0051
(Continued)

FOREIGN PATENT DOCUMENTS

CN    109076560 A    12/2018
CN    109089322 A    12/2018
(Continued)

OTHER PUBLICATIONS

Nokia, "CR to 38.214 capturing the RAN1#92bis meeting agreements," 3GPP TSG-RAN1 Meeting #92bis, Sanya, P.R. China, R1-1805796, total 87 pages, 3rd Generation Partnership Project, Valbonne, France (Apr. 16-20, 2018).
(Continued)

*Primary Examiner* — Mahbubul Bar Chowdhury
(74) *Attorney, Agent, or Firm* — Leydig, Voit & Mayer, Ltd.

(57) ABSTRACT

Embodiments of this application provide an information indication method and apparatus, to implement indication of transmission configuration indication information and data transmission in a multi-beam transmission scenario. In the method and the apparatus, a network device sends configuration information to a terminal device, to configure M transmission configuration indicator TCI states; the network device sends first indication information to the terminal device, where the first indication information is used to indicate A TCI states in the M TCI states; the network device sends second indication information to the terminal device,
(Continued)

to indicate a first codepoint, where the first codepoint is determined by the network device based on at least one TCI state and according to a preset mapping rule between a TCI state and a codepoint; and the network device communicates with the terminal device based on the at least one TCI state.

18 Claims, 12 Drawing Sheets

Related U.S. Application Data continuation of application No. PCT/CN2020/075317, filed on Feb. 14, 2020.

(51) Int. Cl.
*H04L 1/1607* (2023.01)
*H04W 72/1263* (2023.01)
*H04W 80/02* (2009.01)

(58) Field of Classification Search
CPC ..... H04W 76/19; H04B 7/088; H04B 7/0695; H04B 7/0408; H04B 7/0626; H04B 7/0632; H04L 1/1614; H04L 5/0053; H04L 5/0094; H04L 5/0048
See application file for complete search history.

(56) References Cited

U.S. PATENT DOCUMENTS

| | | | |
|---|---|---|---|
| 12,075,431 B2* | 8/2024 | Lee | H04L 5/0091 |
| 12,156,224 B2* | 11/2024 | Shi | H04B 7/02 |
| 2019/0260524 A1 | 8/2019 | Nam et al. | |
| 2020/0107352 A1 | 4/2020 | Tsai et al. | |
| 2020/0107353 A1 | 4/2020 | Jung et al. | |
| 2020/0153581 A1 | 5/2020 | Tsai et al. | |
| 2020/0267712 A1* | 8/2020 | Cirik | H04L 5/0023 |
| 2020/0267734 A1 | 8/2020 | Khoshnevisan et al. | |
| 2021/0112586 A1 | 4/2021 | Bhamri et al. | |
| 2021/0385803 A1* | 12/2021 | Shi | H04W 48/08 |
| 2022/0039022 A1 | 2/2022 | Liu et al. | |
| 2022/0077982 A1 | 3/2022 | Zhang et al. | |
| 2022/0104031 A1 | 3/2022 | Matsumura et al. | |
| 2022/0110138 A1 | 4/2022 | Miao et al. | |
| 2022/0124751 A1 | 4/2022 | Matsumura et al. | |
| 2022/0131668 A1 | 4/2022 | Matsumura et al. | |
| 2022/0191892 A1 | 6/2022 | Muruganathan et al. | |
| 2023/0208490 A1* | 6/2023 | Kim | H04L 5/0051 370/329 |

FOREIGN PATENT DOCUMENTS

| | | |
|---|---|---|
| CN | 109257754 A | 1/2019 |
| EP | 3833081 A1 | 6/2021 |
| WO | 2015180104 A1 | 12/2015 |
| WO | 2018141165 A1 | 8/2018 |
| WO | 2018156696 A1 | 8/2018 |
| WO | 2019017751 A1 | 1/2019 |

OTHER PUBLICATIONS

"3rd Generation Partnership Project; Technical Specification Group Radio Access Network; NR; Physical layer procedures for control (Release 15)," 3GPP TS 38.213 V15.3.0, total 101 pages, 3rd Generation Partnership Project, Valbonne, France (Sep. 2018).

"3rd Generation Partnership Project; Technical Specification Group Radio Access Network; NR; Physical layer procedures for data (Release 15)," 3GPP TS 38.214 V15.4.0, total 102 pages, 3rd Generation Partnership Project, Valbonne, France (Dec. 2018).

"3rd Generation Partnership Project; Technical Specification Group Radio Access Network; NR; Medium Access Control (MAC) protocol specification (Release 15)," 3GPP TS 38.321 V15.4.0, total 77 pages, 3rd Generation Partnership Project, Valbonne, France (Dec. 2018).

"3rd Generation Partnership Project; Technical Specification Group Radio Access Network; NR; Radio Resource Control (RRC) protocol specification (Release 15)," 3GPP TS 38.331 V15.4.0, total 474 pages, 3rd Generation Partnership Project, Valbonne, France (Dec. 2018).

* cited by examiner

| Reserved bit (R) | Serving cell identity | | | | | Bandwidth part identifier | | Oct 1 |
|---|---|---|---|---|---|---|---|---|
| $C_{7,1}$ | $C_{6,1}$ | $C_{5,1}$ | $C_{4,1}$ | $C_{3,1}$ | $C_{2,1}$ | $C_{1,1}$ | $C_{0,1}$ | Oct 2 |
| $C_{7,2}$ | $C_{6,2}$ | $C_{5,2}$ | $C_{4,2}$ | $C_{3,2}$ | $C_{2,2}$ | $C_{1,2}$ | $C_{0,2}$ | Oct 3 |
| Reserved bit (R) | Transmission configuration indicator state identifier$_{0,1}$ (TCI state ID$_{0,1}$) | | | | | | | Oct 4 |
| Reserved bit (R) | Transmission configuration indicator state identifier$_{1,1}$ (TCI state ID$_{1,1}$) | | | | | | | Oct 5 |

...

| Reserved bit (R) | Transmission configuration indicator state identifier$_{k1-1,1}$ (TCI state ID$_{k1-1,1}$) | Oct K1+3 |
|---|---|---|
| Reserved bit (R) | Transmission configuration indicator state identifier$_{0,2}$ (TCI state ID$_{0,2}$) | Oct K1+4 |
| Reserved bit (R) | Transmission configuration indicator state identifier$_{1,2}$ (TCI state ID$_{1,2}$) | Oct K1+5 |

...

| Reserved bit (R) | Transmission configuration indicator state identifier$_{k2-1,2}$ (TCI state ID$_{k2-1,2}$) | Oct K1+ K2+3 |
|---|---|---|

FIG. 4A

| Reserved bit (R) | Serving cell identity | Bandwidth part identifier | | Oct 1 |
|---|---|---|---|---|
| Reserved bit (R) | Reserved bit (R) | $A_2$ | $A_1$ | Oct 2 |
| Reserved bit (R) | Transmission configuration indicator state identifier$_{0,1}$ (TCI state ID$_{0,1}$) | | | Oct 3 |
| Reserved bit (R) | Transmission configuration indicator state identifier$_{1,1}$ (TCI state ID$_{1,1}$) | | | Oct 4 |

...

| Reserved bit (R) | Transmission configuration indicator state identifier$_{k1-1,1}$ (TCI state ID$_{k1-1,1}$) | Oct K1+2 |
|---|---|---|
| Reserved bit (R) | Transmission configuration indicator state identifier$_{0,2}$ (TCI state ID$_{0,2}$) | Oct K1+3 |
| Reserved bit (R) | Transmission configuration indicator state identifier$_{1,2}$ (TCI state ID$_{1,2}$) | Oct K1+4 |

...

| Reserved bit (R) | Transmission configuration indicator state identifier$_{k2-1,2}$ (TCI state ID$_{k2-1,2}$) | Oct K1+ K2+2 |
|---|---|---|

FIG. 4B

| Reserved bit (R) | Serving cell identity | | | | | Bandwidth part identifier | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |
|---|---|---|---|---|---|---|---|---|
| $C_7$ | $C_6$ | $C_5$ | $C_4$ | $C_3$ | $C_2$ | $C_1$ | $C_0$ | Oct N+1 |
| Reserved bit (R) | Transmission configuration indicator state identifier$_0$ (TCI state ID$_0$) | | | | | | | Oct N+2 |
| Reserved bit (R) | Transmission configuration indicator state identifier$_1$ (TCI state ID$_1$) | | | | | | | Oct N+3 |

...

| Reserved bit (R) | Transmission configuration indicator state identifier$_{k2-1}$ (TCI state ID$_{k2-1}$) | Oct N+K2+1 |
|---|---|---|

FIG. 4C

| Reserved bit (R) | Serving cell identity | | | | | Bandwidth part identifier | | Oct 1 |
|---|---|---|---|---|---|---|---|---|
| $C_{7,1}$ | $C_{6,1}$ | $C_{5,1}$ | $C_{4,1}$ | $C_{3,1}$ | $C_{2,1}$ | $C_{1,1}$ | $C_{0,1}$ | Oct 2 |
| $C_{7,2}$ | $C_{6,2}$ | $C_{5,2}$ | $C_{4,2}$ | $C_{3,2}$ | $C_{2,2}$ | $C_{1,2}$ | $C_{0,2}$ | Oct 3 |
| Reserved bit (R) | Reserved bit (R) | Transmission configuration indicator state identifier$_1$ (TCI state ID$_1$) | | | Transmission configuration indicator state identifier$_0$ (TCI state ID$_0$) | | | Oct 4 |
| Reserved bit (R) | Reserved bit (R) | Transmission configuration indicator state identifier$_3$ (TCI state ID$_3$) | | | Transmission configuration indicator state identifier$_2$ (TCI state ID$_2$) | | | Oct 5 |

...

| Reserved bit (R) | Reserved bit (R) | Transmission configuration indicator state identifier$_N$ (TCI state ID$_N$) | Transmission configuration indicator state identifier$_{N-1}$ (TCI state ID$_{N-1}$) | Oct M |
|---|---|---|---|---|

FIG. 4D

INFORMATION INDICATION METHOD AND APPARATUS IN A MULTI-BEAM TRANSMISSION SCENARIO

CROSS-REFERENCE TO RELATED APPLICATIONS

This application is a continuation of U.S. patent application Ser. No. 17/403,437, filed on Aug. 16, 2021, which is a continuation of International Application No. PCT/CN2020/075317, filed on Feb. 14, 2020. The International Application claims priority to Chinese Patent Application No. 201910118164.7, filed on Feb. 15, 2019 and Chinese Patent Application No. 201911072492.4, filed on Nov. 5, 2019. All of the afore-mentioned patent applications are hereby incorporated by reference in their entireties.

TECHNICAL FIELD

This application relates to the communications field, and more specifically, to an information indication method and apparatus.

BACKGROUND

With the emergence of video services on intelligent terminals, current spectrum resources cannot meet an explosive growth of capacity requirements of users. A high frequency band with higher available bandwidth, such as a millimeter-wave band, increasingly becomes a candidate frequency band of a next-generation communications system. In addition, in a modern communications system, a multi-antenna technology is usually used to increase a capacity and coverage of the system, so as to improve user experience. In addition, the high frequency band is used, so that a size of a configured multi-antenna can be greatly reduced, to facilitate site obtaining and deployment of more antennas. However, different from an operating frequency band of an existing long term evolution (LTE) system, the high frequency band causes a larger path loss. Particularly, impact of factors such as atmosphere and vegetation further increases a radio propagation loss.

To cope with a propagation loss caused by the high frequency band, a signal transmission mechanism based on a beamforming (BF) technology is used to compensate for a loss in a signal propagation process by using a relatively large antenna gain. Beamforming signals may include a broadcast signal, a synchronization signal, a cell-specific reference signal, and the like. FIG. 1A is a schematic diagram of beam training, including downlink joint beam training, uplink joint beam training, downlink beam training for a terminal, uplink beam training from a terminal, downlink beam training from a network device, and uplink beam training for a network device, which are respectively shown in (a) to (f).

When a signal is transmitted based on the beamforming technology, once the user moves, a direction of a formed beam corresponding to the transmitted signal may no longer match a location of the user after the user moves, thereby causing frequent interruption of a received signal. To track a change of the formed beam in a signal transmission process, channel quality measurement and result reporting based on the beamforming technology are introduced. The channel quality measurement may be implemented based on a synchronization signal or a cell-specific reference signal obtained through beamforming. Compared with inter-cell handover, handover of the user between different formed beams is more dynamic and frequent. Therefore, a dynamic measurement and reporting mechanism is required. Optionally, similar to CSI information reporting, reporting of a channel quality result of the formed beam may also be sent by user equipment to a base station through a physical uplink control channel or a physical uplink shared channel.

During downlink signal transmission, both a transmit beam of a network device and a receive beam of a terminal may dynamically change, and there may be a plurality of optimal receive beams determined by the terminal based on received signals. To enable the terminal to determine the receive beam of the terminal, the terminal may feed back information about a plurality of receive beams to the network device, and the network device may indicate the receive beam of the terminal to the terminal by sending beam indication information to the terminal. When analog domain beamforming is used for the terminal, the terminal may accurately determine the receive beam of the terminal based on the beam indication information sent by the network device, thereby reducing a beam sweeping time of the terminal device, and achieving a power saving effect.

In a current beam indication method, only a transmission mode in which a single transmission reception point (TRP) communicates with the terminal at a specific moment by using one beam is considered. However, the next-generation communications system such as new radio (NR) can support the network device in communicating with one terminal by simultaneously using different beams, that is, multi-beam transmission, or can support a plurality of TRPs in serving the terminal. That a plurality of TRPs communicate with one terminal includes: The plurality of TRPs simultaneously communicate with the terminal, or the plurality of TRPs communicate with the terminal through dynamic point selection (DPS). A scenario in which a plurality of TRPs simultaneously communicate with one terminal may also be referred to as a non-coherent joint transmission (NCJT) scenario or an NCJT transmission mode.

An existing protocol cannot support beam indication in a plurality of transmission modes. In a multi-beam or multi-TRP transmission scenario, a corresponding mechanism needs to be introduced to indicate a beam of a data channel. To be specific, in a multi-beam/multi-link/multi-layer transmission scenario or the multi-TRP transmission scenario, a corresponding mechanism needs to be introduced to indicate beam information of the data channel.

SUMMARY

Embodiments of this application provide an information indication method and apparatus, to implement indication of transmission configuration indication information and data transmission in a multi-beam transmission scenario.

According to a first aspect, an embodiment of this application provides an information indication method, including: A terminal device receives first indication information, where the first indication information is used to indicate A transmission configuration indicator TCI states, and A is a positive integer; receives second indication information, where the second indication information is used to indicate a first codepoint, and the first codepoint is one of P codepoints; determines, according to a preset rule and based on the first codepoint, at least one TCI state corresponding to the first codepoint, where the preset rule includes a rule for mapping the A TCI states to the P codepoints, and at least one codepoint in the P codepoints corresponds to at least two TCI states in the A TCI states; and receives downlink information and/or sends uplink information based on the at least one TCI state. This method implements indication of transmission configuration indication information and data transmission in a multi-beam transmission scenario.

With reference to the first aspect, in an embodiment, the terminal device receives configuration information. The configuration information is used to indicate M TCI states, and M is a positive integer greater than 1.

According to a second aspect, an embodiment of this application provides an information indication method, including: A network device sends first indication information, where the first indication information is used to indicate A transmission configuration indicator TCI states, and A is a positive integer; determines, according to a preset rule and based on at least one TCI state, a first codepoint corresponding to the at least one TCI state, where the preset rule includes a rule for mapping the A TCI states to P codepoints, at least one codepoint in the P codepoints corresponds to at least two TCI states in the A TCI states, and the first codepoint is one of the P codepoints; sends second indication information, where the second indication information is used to indicate the first codepoint; and receives downlink information and/or sends uplink information based on the at least one TCI state. This method implements indication of transmission configuration indication information and data transmission in a multi-beam transmission scenario.

With reference to the second aspect, in an embodiment, the network device sends configuration information. The configuration information is used to indicate M TCI states, and M is a positive integer greater than 1.

According to a third aspect, an embodiment of this application provides an information indication apparatus, including a processor and a transceiver that is coupled to the processor. The transceiver is configured to receive first indication information, where the first indication information is used to indicate A transmission configuration indicator TCI states, and A is a positive integer; and the transceiver is further configured to receive second indication information, where the second indication information is used to indicate a first codepoint, and the first codepoint is one of P codepoints. The processor is configured to determine, according to a preset rule and based on the first codepoint, at least one TCI state corresponding to the first codepoint, where the preset rule includes a rule for mapping the A TCI states to the P codepoints, and at least one codepoint in the P codepoints corresponds to at least two TCI states in the A TCI states. The transceiver is further configured to receive downlink information and/or send uplink information based on the at least one TCI state. This apparatus implements indication of transmission configuration indication information and data transmission in a multi-beam transmission scenario.

With reference to the third aspect, in an embodiment, the transceiver is further configured to receive configuration information. The configuration information is used to indicate M TCI states, and M is a positive integer greater than 1.

According to a fourth aspect, an embodiment of this application provides an information indication apparatus, including a processor and a transceiver that is coupled to the processor. The transceiver is configured to send first indication information, where the first indication information is used to indicate A transmission configuration indicator TCI states, and A is a positive integer. The processor is configured to determine, according to a preset rule and based on at least one TCI state, a first codepoint corresponding to the at least one TCI state, where the preset rule includes a rule for mapping the A TCI states to P codepoints, at least one codepoint in the P codepoints corresponds to at least two TCI states in the A TCI states, and the first codepoint is one of the P codepoints. The transceiver is further configured to send second indication information, where the second indication information is used to indicate the first codepoint. The transceiver is further configured to receive downlink information and/or send uplink information based on the at least one TCI state. This apparatus implements indication of transmission configuration indication information and data transmission in a multi-beam transmission scenario.

With reference to the fourth aspect, in an embodiment, the transceiver is further configured to send configuration information. The configuration information is used to indicate M TCI states, and M is a positive integer greater than 1.

With reference to any one of the foregoing aspects or possible designs, in an embodiment, the A TCI states include K1 first TCI states and K2 second TCI states. At least one first TCI state in the K1 first TCI states includes one or more TCI states in the A TCI states. At least one second TCI state in the K2 second TCI states includes one or more TCI states in the A TCI states. K1 and K2 are positive integers, and K1+K2≤A.

With reference to any one of the foregoing aspects or possible designs, in an embodiment, the preset rule includes a first TCI state mapping rule and a second TCI state mapping rule. The first TCI state mapping rule includes a rule for mapping the K1 first TCI states to L1 codepoints in the P codepoints. The second TCI state mapping rule includes a rule for mapping the K2 second TCI states to L2 codepoints in the P codepoints. L1 and L2 are positive integers, L1≤P, and L2≤P.

With reference to any one of the foregoing aspects or possible designs, in an embodiment, the first TCI state mapping rule includes: The K1 first TCI states arranged in a first order are sequentially mapped to K1 codepoints in the L1 codepoints arranged in a second order, where K1≤L1.

Alternatively, the K1 first TCI states arranged in a first order are mapped to the L1 codepoints arranged in a second order, where K1=w1×L1, an $i^{th}$ first TCI state in the K1 first TCI states is mapped to an $\lceil i/W1 \rceil^{th}$ codepoint in the L1 codepoints, i is a positive integer, w1 is a positive integer, $\lceil \ \rceil$ represents rounding up, and K1≥L1. The first order is an ascending order of TCI state identifiers, or a descending order of TCI state identifiers, or an order obtained by transforming a vector including the K1 first TCI states arranged in ascending order of TCI state identifiers, or an order obtained by transforming a vector including the K1 first TCI states arranged in descending order of TCI state identifiers, or an order that is of the K1 first TCI states and that is indicated by the first indication information, or an order obtained by transforming a vector including the K1 first TCI states arranged in an order that is of the K1 first TCI states and that is indicated by the first indication information. The second order is an ascending order of codepoint values or a descending order of codepoint values.

With reference to any one of the foregoing aspects or possible designs, in an embodiment, the second TCI state mapping rule includes: The K2 second TCI states arranged in a third order are sequentially mapped to K2 codepoints in the L2 codepoints arranged in a fourth order, where K2≤L2. Alternatively, the K2 second TCI states arranged in a third order are mapped to the L2 codepoints arranged in a fourth order, where K2=w2×L2, a $j^{th}$ second TCI state in the K2 second TCI states is mapped to a $\lceil j/w2 \rceil^{th}$ codepoint in the L2 codepoints, j is a positive integer, w2 is a positive integer, $\lceil \ \rceil$ represents rounding up, and K2≥L2. The third order is an ascending order of TCI state identifiers, or a descending order of TCI state identifiers, or an order obtained by transforming a vector including the K2 second TCI states arranged in ascending order of TCI state identifiers, or an order obtained by transforming a vector including the K2 second TCI states arranged in descending order of TCI state identifiers, or an order that is of the K2 second TCI states and that is indicated by the first indication information, or an order obtained by transforming a vector including the K2 second TCI states arranged in an order that is of the K2 second TCI states and that is indicated by the first indication information. The fourth order is an ascending order of codepoint values or a descending order of codepoint values.

With reference to any one of the foregoing aspects or possible designs, in an embodiment, the L1 codepoints are predefined, or indicated by using third indication information; and/or the L2 codepoints are predefined, or indicated by using fourth indication information.

With reference to any one of the foregoing aspects or possible designs, in an embodiment, the third indication information includes a first bitmap. The first bitmap is a P bitmap, and L1 bits whose values are 1 in the first bitmap are used to indicate the L1 codepoints. In addition/Alternatively, the fourth indication information includes a second bitmap. The second bitmap is a P bitmap, and L2 bits whose values are 1 in the second bitmap are used to indicate the L2 codepoints.

With reference to any one of the foregoing aspects or possible designs, in an embodiment, a minimum codepoint value in the L1 codepoints is X, where X is predefined, or indicated by using fifth indication information, X is an integer, and $0 \leq X+L1 \leq P$; or a maximum codepoint value in the L1 codepoints is X, where X is predefined, or indicated by using fifth indication information, X is an integer, and $X \geq L1$. In addition/Alternatively, a minimum codepoint value in the L2 codepoints is Y, where Y is predefined, or indicated by using sixth indication information, Y is an integer, and $0 \leq Y+L2 \leq P$; or a maximum codepoint value in the L2 codepoints is Y, where Y is predefined, or indicated by using sixth indication information, Y is an integer, and $Y \geq L2$.

With reference to any one of the foregoing aspects or possible designs, in an embodiment, the codepoint values of the L1 codepoints are consecutive or nonconsecutive; and/or the codepoint values of the L2 codepoints are consecutive or nonconsecutive.

With reference to any one of the foregoing aspects or possible designs, in an embodiment, the L1 codepoints and the L2 codepoints include at least one same codepoint.

With reference to any one of the foregoing aspects or possible designs, in an embodiment, the first indication information is a media access control control element MAC CE, and the K1 first TCI states are before the K2 second TCI states.

With reference to any one of the foregoing aspects or possible designs, in an embodiment, the first indication information includes a first media access control control element MAC CE and a second MAC CE. The first MAC CE is used to indicate the K1 first TCI states, and the second MAC CE is used to indicate the K2 second TCI states.

According to a fifth aspect, an embodiment of this application provides an apparatus, including a functional unit configured to perform the methods in the embodiments of this application.

According to a sixth aspect, an embodiment of this application provides a computer storage medium, including computer instructions. When the computer instructions are run on a device, the device is enabled to perform the information indication method according to the embodiments of this application.

According to a seventh aspect, an embodiment of this application provides a chip, configured to perform the methods in the embodiments of this application.

According to an eighth aspect, a communication failure method is provided, including: A terminal device sends, on a first uplink resource in a $p^{th}$ time unit, first indication information to a network device, where the first indication information is used to indicate a communication failure on a first downlink resource; and the terminal device detects communication failure response information in a $q^{th}$ time unit, a time window starting from the $q^{th}$ time unit, or a time window starting from a $v^{th}$ time-frequency resource location that is after the $q^{th}$ time unit and that is used to send a downlink control channel, where the communication failure response information is a response, carried on a second downlink resource, to a communication failure on the first downlink resource.

v is a number greater than or equal to 0, and q is a number greater than or equal to 0. The first uplink resource belongs to a first cell, and the first downlink resource and/or the second downlink resource belong to a second cell. The first cell and the second cell are different cells or a same cell.

The $q^{th}$ time unit is determined based on a time unit in which the first indication information is sent or sending of the first indication information is completed, and/or a numerology of the first cell, and/or a numerology of the second cell.

Optionally, the $q^{th}$ time unit is a $q^{th}$ downlink time unit of the second cell.

In some embodiments, the time unit in which the first indication information is sent or sending of the first indication information is completed is a $p^{th}$ time unit. The $p^{th}$ time unit is determined based on the numerology of the first cell and/or the numerology of the second cell.

Optionally, the $p^{th}$ time unit is a $p^{th}$ time unit determined based on a minimum value or a maximum value between the numerology of the first cell and the numerology of the second cell.

In some embodiments, the numerology of the first cell is a numerology of an uplink carrier in the first cell, and/or the numerology of the second cell is a numerology of a downlink carrier in the second cell. Second uplink resource.

In some embodiments, the numerology of the uplink carrier in the first cell is one of a numerology of the first uplink resource, a numerology of a second uplink resource of the first cell, and a numerology of an uplink resource with a smallest numerology in all uplink resources of the first cell.

In some embodiments, the numerology of the downlink carrier in the second cell is one of a numerology of the first downlink resource, a numerology of the second downlink resource, a numerology of a third downlink resource of the second cell, and a numerology of a downlink resource with a smallest numerology in all downlink resources of the second cell. The second uplink resource, the third downlink resource, the second uplink resource, and the third downlink resource.

Optionally, the $p^{th}$ time unit is a $p^{th}$ time unit determined based on the numerology of the uplink carrier in the first cell.

Alternatively, the $p^{th}$ time unit is a $p^{th}$ time unit determined based on the numerology of the first uplink resource.

Alternatively, the $p^{th}$ time unit is a $p^{th}$ time unit determined based on the numerology of the second uplink resource of the first cell.

Alternatively, the $p^{th}$ time unit is a $p^{th}$ time unit determined based on the numerology of the uplink resource with the smallest numerology in all the uplink resources of the first cell.

Alternatively, the $p^{th}$ time unit is a $p^{th}$ time unit determined based on the numerology of the downlink carrier in the second cell.

Alternatively, the $p^{th}$ time unit is a $p^{th}$ time unit determined based on the numerology of the first downlink resource. Alternatively, the $p^{th}$ time unit is a $p^{th}$ time unit determined based on the numerology of the second downlink resource.

Alternatively, the $p^{th}$ time unit is a $p^{th}$ time unit determined based on the numerology of the third uplink resource of the second cell.

Alternatively, the $p^{th}$ time unit is a $p^{th}$ time unit determined based on the numerology of the downlink resource with the smallest numerology in all the downlink resources of the second cell.

Optionally, the $q^{th}$ time unit is a $q^{th}$ time unit determined based on the numerology of the uplink carrier in the first cell and the numerology of the downlink carrier in the second cell.

Alternatively, the $q^{th}$ time unit is a $q^{th}$ time unit determined based on the numerology of the first uplink resource and the numerology of the first downlink resource.

Alternatively, the $q^{th}$ time unit is a $q^{th}$ time unit determined based on the numerology of the second uplink resource of the first cell and the numerology of the third downlink resource of the second cell.

Alternatively, the $q^{th}$ time unit is a $q^{th}$ time unit determined based on the numerology of the uplink carrier in the first cell, the numerology of the downlink carrier in the second cell, and p.

Alternatively, the $q^{th}$ time unit is a $q^{th}$ time unit determined based on the numerology of the first uplink resource, the numerology of the first downlink resource, and p.

Alternatively, the $q^{th}$ time unit is a $q^{th}$ time unit determined based on the numerology of the second uplink resource of the first cell, the numerology of the third downlink resource of the second cell, and p.

In some embodiments, q is determined by using any one of the following formulas:

$$q = p + K \quad (1)$$

$$q = p + K \cdot \left\lfloor \frac{2^{\mu 2}}{2^{\mu 1}} \right\rfloor \quad (2)$$

$$q = p + K \cdot \left\lceil \frac{2^{\mu 2}}{2^{\mu 1}} \right\rceil \quad (3)$$

$$q = p + \left\lfloor K \cdot \frac{2^{\mu 2}}{2^{\mu 1}} \right\rfloor \quad (4)$$

$$q = p + \left\lceil K \cdot \frac{2^{\mu 2}}{2^{\mu 1}} \right\rceil \quad (5)$$

$$q = p + K \cdot \frac{2^{\mu 2}}{2^{\mu 1}} \quad (6)$$

$$q = \left\lceil p \cdot \frac{2^{\mu 2}}{2^{\mu 1}} \right\rceil + \left\lceil K \cdot \frac{2^{\mu 2}}{2^{\mu 1}} \right\rceil \quad (7)$$

$$q = \left\lfloor p \cdot \frac{2^{\mu 2}}{2^{\mu 1}} \right\rfloor + \left\lfloor K \cdot \frac{2^{\mu 2}}{2^{\mu 1}} \right\rfloor \quad (8)$$

$$q = \left\lfloor p \cdot \frac{2^{\mu 2}}{2^{\mu 1}} \right\rfloor + \left\lceil K \cdot \frac{2^{\mu 2}}{2^{\mu 1}} \right\rceil \quad (9)$$

$$q = \left\lfloor p \cdot \frac{2^{\mu 2}}{2^{\mu 1}} \right\rfloor + K \cdot \frac{2^{\mu 2}}{2^{\mu 1}} \quad (10)$$

$$q = \left\lceil (p + K) \cdot \frac{2^{\mu 2}}{2^{\mu 1}} \right\rceil \quad (11)$$

$$q = \left\lfloor (p + K) \cdot \frac{2^{\mu 2}}{2^{\mu 1}} \right\rfloor \quad (12)$$

$\lfloor \cdot \rfloor$ is a round-down operation, and $\lceil \cdot \rceil$ is a round-up operation. K is an integer greater than or equal to 0.

$\mu 1$ is the numerology of the uplink carrier in the first cell, and $\mu 2$ is the numerology of the downlink carrier in the second cell. Alternatively, $\mu 1$ is the numerology of the downlink carrier in the second cell, and $\mu 2$ is the numerology of the uplink carrier in the first cell. In some embodiments, K is predefined, reported by the terminal device based on terminal device capability, or indicated by the network device (for example, indicated by using third indication information). For example, K is four slots.

Optionally, when q is a quantity of time units determined by a numerology, K is also the quantity of the time units determined by the numerology. For example, q is a quantity of time units of a downlink subcarrier in the second cell, and K is also the quantity of the time units of the downlink subcarrier in the second cell.

Optionally, when p is a quantity of time units determined by a numerology, K is also the quantity of the time units determined by the numerology. For example, p is a quantity of time units of a downlink subcarrier in the second cell, and K is also the quantity of the time units of the downlink subcarrier in the second cell. K is a positive integer.

Optionally, K is determined based on a maximum value or a minimum value between a numerology of the downlink subcarrier in the second cell and a numerology of an uplink subcarrier in the first cell.

Optionally, K is a quantity of time units determined based on the numerology of the downlink carrier in the second cell, the numerology of the first downlink resource of the second cell, the numerology of the second downlink resource of the second cell, or the numerology of the third downlink resource of the second cell.

Optionally, K is a quantity of time units determined based on the numerology of the uplink carrier in the first cell, the numerology of the first uplink resource of the first cell, or the numerology of the second uplink resource of the first cell.

According to a ninth aspect, a communication failure method is provided, including: a network device receives first indication information on a first uplink resource, where the first indication information is used to indicate a communication failure on a first downlink resource; and the network device sends communication failure response information in an $s^{th}$ time unit, a time window starting from the $s^{th}$ time unit, or a time window starting from a $z^{th}$ time-frequency resource location that is after the $s^{th}$ time unit and that is used to send a downlink control channel, where the communication failure response information is a response, carried on a second downlink resource, to a communication failure on the first downlink resource.

z is a number greater than or equal to 0, and s is a number greater than or equal to 0. The first uplink resource belongs to a first cell, and the first downlink resource and/or the second downlink resource belong to a second cell. The first cell and the second cell are different cells or a same cell.

The $s^{th}$ time unit is determined based on a time unit in which the first indication information is received or receiving of the first indication information is completed, and/or a numerology of the first cell, and/or a numerology of the second cell. In some embodiments, the time unit in which the first indication information is received or receiving of the first indication information is completed is a $t^{th}$ time unit. The $t^{th}$ time unit is determined based on the numerology of the first cell and/or the numerology of the second cell.

t is a number greater than or equal to 0. Second uplink resource. In some embodiments, the numerology of the first cell is a numerology of an uplink carrier in the first cell, and/or the numerology of the second cell is a numerology of a downlink carrier in the second cell. The second uplink resource, the third downlink resource, the second uplink resource, and the third downlink resource.

In some embodiments, the numerology of the uplink carrier in the first cell is one of a numerology of the first uplink resource, a numerology of a second uplink resource of the first cell, and a numerology of an uplink resource with a smallest numerology in all uplink resources of the first cell.

In addition/alternatively, the numerology of the downlink carrier in the second cell is one of a numerology of the first downlink resource, a numerology of the second downlink resource, a numerology of a third downlink resource of the second cell, and a numerology of a downlink resource with a smallest numerology in all downlink resources of the second cell.

In some embodiments, s is determined by using any one of a formula (13), a formula (14), a formula (15), a formula (16), a formula (17), a formula (18), a formula (19), a formula (20), a formula (21), a formula (22), a formula (23), or a formula (24):

$$s = t + L \qquad (13)$$

$$s = t + L \cdot \left\lfloor \frac{2^{\mu 2}}{2^{\mu 1}} \right\rfloor \qquad (14)$$

$$s = t + L \cdot \left\lceil \frac{2^{\mu 2}}{2^{\mu 1}} \right\rceil \qquad (15)$$

$$s = t + \left\lfloor L \cdot \frac{2^{\mu 2}}{2^{\mu 1}} \right\rfloor \qquad (16)$$

$$s = t + \left\lceil L \cdot \frac{2^{\mu 2}}{2^{\mu 1}} \right\rceil \qquad (17)$$

$$s = t + L \cdot \frac{2^{\mu 2}}{2^{\mu 1}} \qquad (18)$$

$$s = \left\lfloor t \cdot \frac{2^{\mu 2}}{2^{\mu 1}} \right\rfloor + \left\lfloor L \cdot \frac{2^{\mu 2}}{2^{\mu 1}} \right\rfloor \qquad (19)$$

$$s = \left\lceil t \cdot \frac{2^{\mu 2}}{2^{\mu 1}} \right\rceil + \left\lceil L \cdot \frac{2^{\mu 2}}{2^{\mu 1}} \right\rceil \qquad (20)$$

$$s = \left\lfloor t \cdot \frac{2^{\mu 2}}{2^{\mu 1}} \right\rfloor + \left\lceil L \cdot \frac{2^{\mu 2}}{2^{\mu 1}} \right\rceil \qquad (21)$$

$$s = \left\lceil t \cdot \frac{2^{\mu 2}}{2^{\mu 1}} \right\rceil + L \cdot \frac{2^{\mu 2}}{2^{\mu 1}} \qquad (22)$$

$$s = \left\lfloor (t+L) \cdot \frac{2^{\mu 2}}{2^{\mu 1}} \right\rfloor \qquad (23)$$

$$s = \left\lceil (t+L) \cdot \frac{2^{\mu 2}}{2^{\mu 1}} \right\rceil \qquad (24)$$

$\lfloor \cdot \rfloor$ is a round-down operation, and $\lceil \cdot \rceil$ is a round-up operation. L is an integer greater than or equal to 0. µ1 is the numerology of the uplink carrier in the first cell, and µ2 is the numerology of the downlink carrier in the second cell. Alternatively, µ1 is the numerology of the downlink carrier in the second cell, and µ2 is the numerology of the uplink carrier in the first cell. The second uplink resource and the third downlink resource.

In some embodiments, L is predefined, reported by the terminal device based on terminal device capability, or indicated by the network device (for example, indicated by using third indication information). For example, L is four slots.

Optionally, when s is a quantity of time units determined by a numerology, L is also the quantity of the time units determined by the numerology. For example, s is a quantity of time units of a downlink subcarrier in the second cell, and L is also the quantity of the time units of a downlink subcarrier in the second cell.

Optionally, when t is a quantity of time units determined by a numerology, L is also the quantity of the time units determined by the numerology. For example, t is a quantity of time units of a downlink subcarrier in the second cell, and L is also the quantity of the time units of the downlink subcarrier in the second cell. L is a positive integer.

Optionally, L is determined based on a maximum value or a minimum value between a numerology of the downlink subcarrier in the second cell and a numerology of an uplink subcarrier in the first cell.

Optionally, L is a quantity of time units determined based on the numerology of the downlink carrier in the second cell, the numerology of the first downlink resource of the second cell, the numerology of the second downlink resource of the second cell, or the numerology of the third downlink resource of the second cell.

Optionally, L is a quantity of time units determined based on the numerology of the uplink carrier in the first cell, the numerology of the first uplink resource of the first cell, or the numerology of the second uplink resource of the first cell.

In some embodiments, in the eighth aspect or the ninth aspect, $$\frac{2^{\mu 2}}{2^{\mu 1}}$$

may be replaced with $$\frac{f2}{f1}.$$

f1 is a subcarrier spacing of the uplink carrier in the first cell, or f1 is a subcarrier spacing of the first uplink resource, or f1 is a subcarrier spacing of the second uplink resource of the first cell; and f2 is a subcarrier spacing of the downlink carrier in the second cell, or f2 is a subcarrier spacing of the first downlink resource of the second cell, or f2 is a subcarrier spacing of the third downlink resource of the second cell. Alternatively, f2 is a subcarrier spacing of the uplink carrier in the first cell, or f2 is a subcarrier spacing of the first uplink resource, or f2 is a subcarrier spacing of the second uplink resource of the first cell; and f1 is a subcarrier spacing of the downlink carrier in the second cell, or f1 is a subcarrier spacing of the first downlink resource of the second cell, or f1 is a subcarrier spacing of the third downlink resource of the second cell. f1 and f2 are equivalent to $\Delta f$ in Table 7.

According to a tenth aspect, a communication failure recovery apparatus is provided. The apparatus includes units configured to perform steps in the method according to any one of the eighth aspect or the embodiments of the eighth aspect.

According to an eleventh aspect, a communication failure recovery apparatus is provided. The apparatus includes units configured to perform steps in the method according to any one of the ninth aspect or the embodiments of the ninth aspect.

According to a twelfth aspect, a communication failure recovery apparatus is provided, and the apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal and control a transmitter to transmit a signal. When the processor executes the instructions stored in the memory, the execution enables the processor to perform the method according to the eighth aspect or any possible implementation of the eighth aspect.

According to a thirteenth aspect, a communication failure recovery apparatus is provided, and the apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal and control a transmitter to transmit a signal. When the processor executes the instructions stored in the memory, the execution enables the processor to perform the method according to the ninth aspect or any possible implementation of the ninth aspect.

According to a fourteenth aspect, a communication failure recovery system is provided. The system includes the apparatus provided in the eighth aspect and the apparatus provided in the ninth aspect.

Alternatively, the system includes the apparatus provided in the eighth aspect and the apparatus provided in the ninth aspect.

According to a fifteenth aspect, a computer program product is provided. The computer program product includes a computer program. When the computer program is executed by a processor, the computer program is used to perform the method according to any one of the eighth aspect or the embodiments of the eighth aspect.

According to a sixteenth aspect, a computer program product is provided. The computer program product includes a computer program. When the computer program is executed by a processor, the computer program is used to perform the method according to any one of the ninth aspect or the embodiments of the ninth aspect.

According to a seventeenth aspect, a computer-readable storage medium is provided. The computer-readable storage medium stores a computer program. When being executed, the computer program is used to perform the method according to any one of the eighth aspect or the embodiments of the eighth aspect.

According to an eighteenth aspect, a computer-readable storage medium is provided. The computer-readable storage medium stores a computer program. When being executed, the computer program is used to perform the method according to any one of the ninth aspect or the embodiments of the ninth aspect.

BRIEF DESCRIPTION OF DRAWINGS

FIG. 4A is a MAC CE format according to an embodiment of this application;

FIG. 4B is another MAC CE format according to an embodiment of this application;

FIG. 4C is another MAC CE format according to an embodiment of this application;

FIG. 4D is another MAC CE format according to an embodiment of this application;

DESCRIPTION OF EMBODIMENTS

To make a person skilled in the art understand the technical solutions in the embodiments of this application better, and make the objectives, features, and advantages of the embodiments of this application clearer, the following further describes the technical solutions in the embodiments of this application in detail with reference to the accompanying drawings.

The embodiments of this application may be applied to various wireless communications systems, such as a global system for mobile communications (GSM) system, a code division multiple access (CDMA) system, a wideband code division multiple access (WCDMA) system, a general packet radio service (GPRS) system, a universal mobile telecommunications system (UMTS), a long term evolution (LTE) system and an evolved system thereof, and a new radio (NR) system.

Figure 1A:
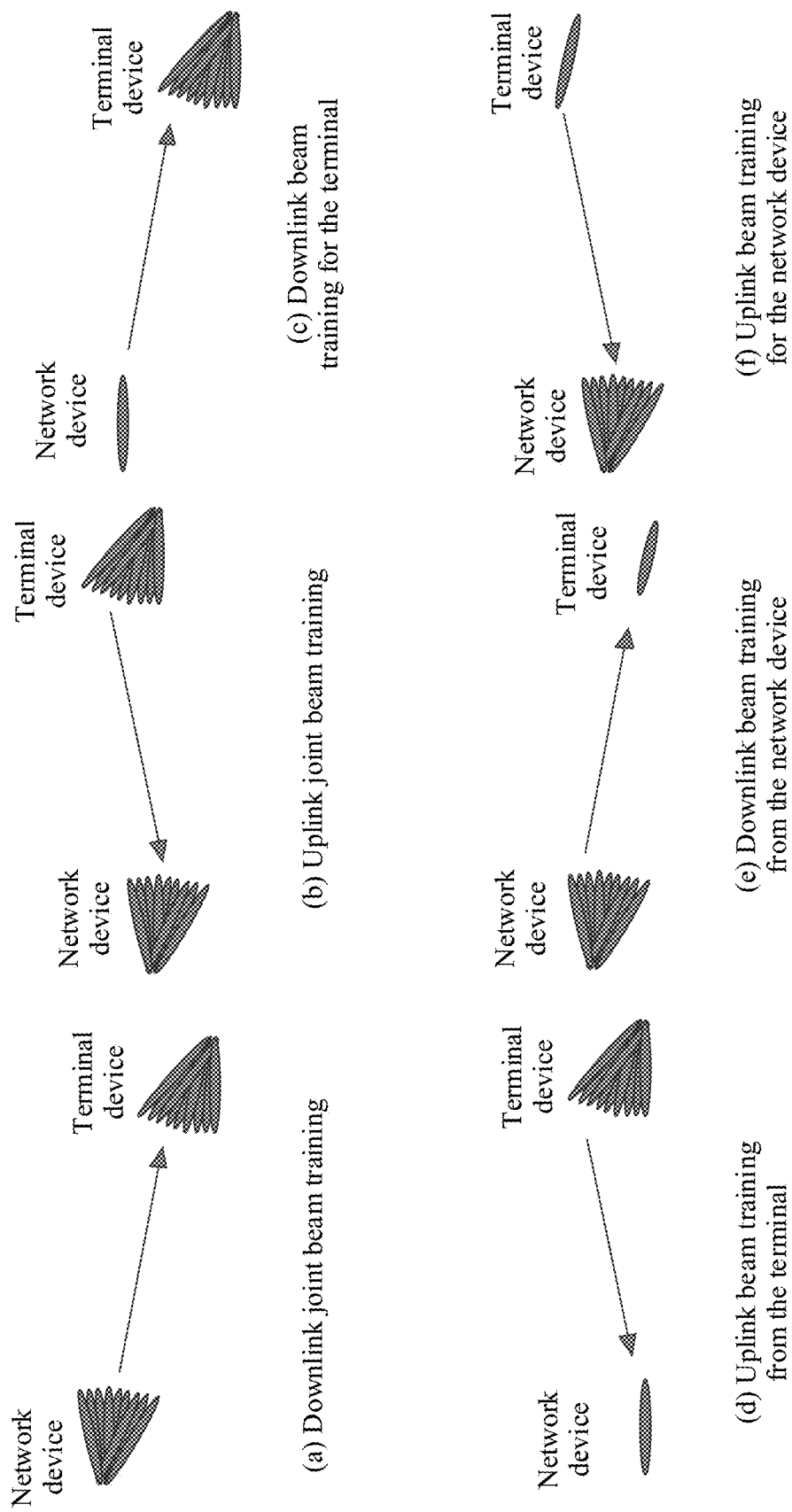
FIG. 1A is a schematic diagram of beam training according to this application.
Figure 1B:
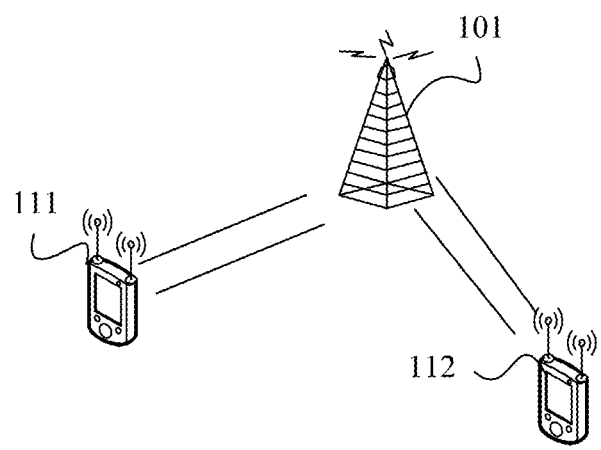
FIG. 1B is a schematic diagram of an application scenario according to an embodiment of this application.

FIG. 1B is a schematic diagram of a communications system according to an embodiment of this application. As shown in FIG. 1B, the communications system includes at least one network device 101 and at least one terminal device. Two terminal devices are used as an example for description herein. The two terminal devices are respectively a terminal device 111 and a terminal device 112. The terminal device 111 and the terminal device 112 are within coverage of a base station 101 and communicate with the network device 101, to implement the following technical solutions provided in the embodiments of this application. For example, the network device 101 is abase station in an NR system, and the terminal device 101 and the terminal device 102 correspond to terminal devices in the NR system.

In the embodiments of this application, the embodiments are described with reference to a network device and a terminal device. The network device and the terminal device may work on a licensed frequency band or an unlicensed frequency band.

The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a station (ST) in a wireless local area network (WLAN), a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, a wearable device, a terminal device in a next generation communications system, for example, a $5^{th}$ generation (5G) communications network, a terminal device in a future evolved public land mobile network (PLMN), a terminal device in an NR system, or the like.

As an example instead of a limitation, in the embodiments of this application, the terminal device may alternatively be a wearable device. The wearable device may also be referred to as a wearable intelligent device, and is a general term for wearable device such as glasses, gloves, watches, clothes, and shoes that are developed by applying wearable technologies to intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on a smartphone, for example, a smart watch or a smart glass, and devices that focus on only one type of application function and need to work with another device such as a smartphone, for example, various smart bands or smart accessories for monitoring physical signs.

In addition, the network device may be a device configured to communicate with a mobile device. The network device may be an access point (AP) in the WLAN, a base transceiver station (BTS) in GSM or CDMA, a NodeB (NB) in WCDMA, an evolved Node B (evolutional Node B, eNB or eNodeB) in LTE, a relay station or an access point, a vehicle-mounted device, a wearable device, a network device in the future 5G network, a network device in the future evolved PLMN network, a next generation Node B (new generation Node B, gNodeB) in the NR system, or the like. It may be understood that a plurality of network devices may communicate with one terminal device.

In addition, in the embodiments of this application, the network device provides a service for a cell, and the terminal device communicates with the network device by using a transmission resource (for example, a frequency domain resource, namely, a spectrum resource) used in the cell. The cell may be a cell corresponding to the network device (for example, a base station), and the cell may belong to a macro base station, or may belong to a base station corresponding to a small cell. The small cell herein may include a metro cell, a micro cell, a pico cell, a femto cell, or the like. These small cells have characteristics of small coverage and low transmit power, and are applicable to providing a high-rate data transmission service.

In addition, in the LTE system or the NR system, a plurality of cells may simultaneously work on a carrier at a same frequency. In some special scenarios, it may also be considered that a concept of the carrier is equivalent to a concept of the cell. For example, in a carrier aggregation (CA) scenario, when a secondary carrier is configured for UE, both a carrier index of the secondary carrier and a cell identity (Cell ID) of a secondary cell working on the secondary carrier are carried. In this case, it may be considered that the concept of the carrier is equivalent to the concept of the cell. For example, that the UE accesses a carrier is equivalent to that the UE accesses a cell.

Unless otherwise specified, higher layer signaling in the embodiments of this application may be signaling sent by a higher-layer protocol layer. The higher-layer protocol layer is at least one protocol layer in each protocol layer above a physical layer. The higher-layer protocol layer may be specifically at least one of the following protocol layers: a medium access control (MAC) layer, a radio link control (RLC) layer, a packet data convergence protocol (PDCP) layer, a radio resource control (RRC) layer, and a non-access stratum (NAS). The higher layer signaling may be signaling dedicated to one terminal device, signaling shared by a plurality of terminal devices or a group of terminal devices, or signaling shared by all terminal devices in a cell.

Unless otherwise specified, in the embodiments of this application, the physical layer signaling may be physical downlink control DCI or other physical control information. The physical layer signaling may be signaling dedicated to one terminal device, for example, physical layer signaling scrambled by using an identifier dedicated to the terminal device, or physical layer signaling sent in search space dedicated to the terminal device, or physical layer signaling sent in a control channel resource set dedicated to the terminal device. Alternatively, physical layer control signaling is signaling shared by a plurality of terminal devices or a group of terminal devices, for example, physical layer signaling scrambled by a group identifier, physical layer signaling sent in search space shared by the group of terminal devices, or physical layer signaling sent in a control channel resource set shared by the group of terminal devices. Alternatively, the physical layer signaling is signaling shared by all terminal devices in a cell. Alternatively, the physical layer control signaling is signaling shared by all terminal devices, for example, physical layer signaling scrambled by an identifier shared by all the terminal devices, physical layer signaling sent in search space shared by all the terminal devices, or physical layer signaling sent in a control channel resource set shared by all the terminal devices.

It should be understood that the term "and/or" in this specification describes only an association relationship for describing associated objects and represents that three relationships may exist. For example, A and/or B may represent the following three cases: Only A exists, both A and B exist, and only B exists.

It should be understood that, for the term "not in X" used in this specification, "in X" includes any moment on X, a start moment of X, and an end moment of X. "Not in X" may indicate that "not at any moment on X", or may indicate that "not at one or more moments on X". This is not limited in this application.

Figure 2:
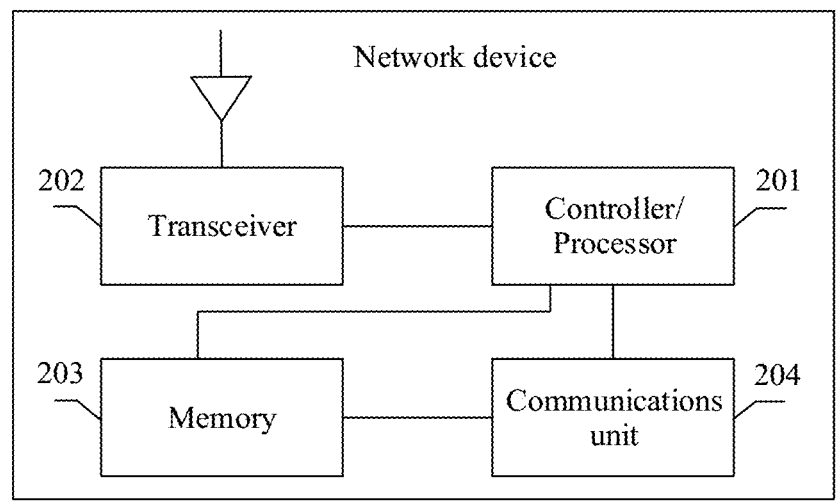
FIG. 2 is a schematic structural diagram of a communications device according to an embodiment of this application.

FIG. 2 shows a wireless communications device according to an embodiment of the present invention. The wireless communications device may be used as a network device 101 or an apparatus applied to a network device 101. The following uses an example in which the wireless communications device is the network device 101 for description. The network device 101 can perform the method provided in the embodiments of the present invention. The network device 101 may include a processor 201 and a transceiver 202 that are configured to implement a wireless communication function.

A processor in the embodiments of this application may be a processing unit, a transceiver, or a transceiver unit. Details are not described below again.

The processor 201 may be a modem processor. The processor 201 may include a baseband processor (BBP). The baseband processor processes a received digitalized signal to extract information or a data bit carried in the signal. To achieve such an objective, the BBP is generally implemented by using one or more digital signal processors (DSP) in the processor 201 or by using separate integrated circuits (IC).

The transceiver 202 may be configured to support information receiving and sending between the network device 101 and a terminal device. On an uplink, an uplink radio frequency signal from the terminal device is received by using an antenna. The transceiver 202 demodulates the uplink radio frequency signal, extracts a baseband signal, and outputs the baseband signal to the processor 201 for processing, to restore service data and/or signaling information that are/is sent by the terminal device. On a downlink, a baseband signal that carries service data and/or a signaling message to be sent to the terminal device is modulated by the transceiver 202, to generate a downlink radio frequency signal, and the downlink radio frequency signal is transmitted to UE by using the antenna. The transceiver 202 may include independent receiver and transmitter circuits, or a receiver circuit and a transmitter circuit may be integrated into a same circuit to implement receiving and sending functions.

The network device 101 may further include a memory 203, and the memory 203 may be configured to store program code and/or data of the network device 101.

A memory in the embodiments of this application may be a storage unit. Details are not described below again.

The network device 101 may further include a communications unit 204, and the communications unit 204 is configured to support communication between the network device 101 and another network entity. For example, the communications unit 204 is configured to support communication between the network device 101 and a network device or the like of a core network.

In an embodiment shown in FIG. 2, the processor 201 may be separately coupled/connected to the transceiver 202, the memory 203, and the communications unit 204. In another alternative manner, the network device 101 may further include a bus. The transceiver 202, the memory 203, and the communications unit 204 may be connected to the processor 201 through the bus. For example, the bus may be a peripheral component interconnect (PCI) bus, an extended industry standard architecture (EISA) bus, and or the like. The bus may include an address bus, a data bus, a control bus, and the like.

Figure 3:
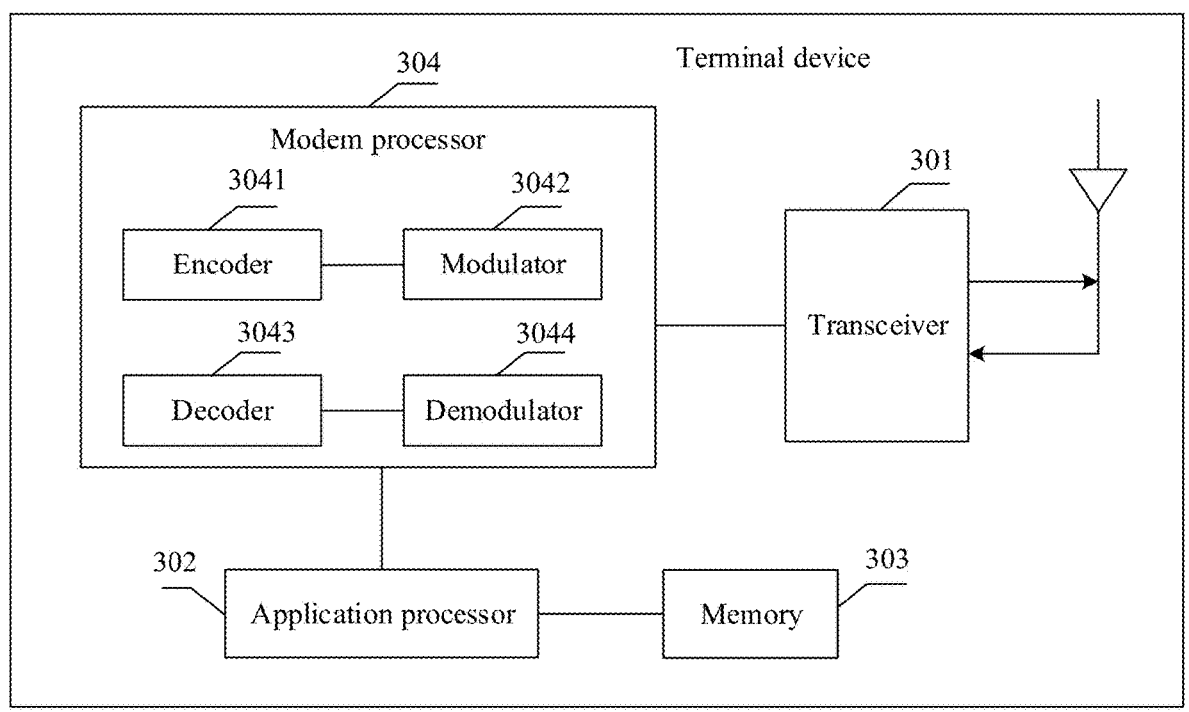
FIG. 3 is a schematic structural diagram of another communications device according to an embodiment of this application.

FIG. 3 shows another wireless communications device according to an embodiment of the present invention. The wireless communications device may be used as either of terminal devices 111 and 112, or an apparatus applied to either of the terminal devices 111 and 112. The following uses an example in which the wireless communications device shown in FIG. 3 is a terminal device for description. The terminal device can perform the method provided in the embodiments of the present invention. The terminal device may be either of the two terminal devices 111 and 112. The terminal device includes a transceiver 301, a memory 303, and a processor 304 that is configured to implement a wireless communication function.

A processor in the embodiments of this application may be a processing unit, a transceiver, or a transceiver unit. Details are not described below again.

The transceiver 301 may be configured to support information receiving and sending between the terminal devices 111 and 112 and the network device 101. On a downlink, a downlink radio frequency signal from the network device is received by using an antenna. The transceiver 301 demodulates the downlink radio frequency signal, extracts a baseband signal, and outputs the baseband signal to the processor 304 for processing, to restore service data and/or signaling information that are/is sent by the network device. On an uplink, a baseband signal that carries service data and/or a signaling message to be sent to the network device is modulated by the transceiver 301, to generate an uplink radio frequency signal, and the uplink radio frequency signal is transmitted to the network device by using the antenna. The transceiver 301 may include independent receiver and transmitter circuits, or a receiver circuit and a transmitter circuit may be integrated into a same circuit to implement receiving and sending functions.

The processor 304 may be a modem processor. The processor 304 may include a baseband processor (BBP). The baseband processor processes a received digitalized signal to extract information or a data bit carried in the signal. To achieve such an objective, the BBP is generally implemented by using one or more digital signal processors (DSP) in the processor 304 or by using separate integrated circuits (IC).

For example, as shown in FIG. 3, in an embodiment of the processor 304, the processor 304 may include an encoder 3041, a modulator 3042, a decoder 3043, and a demodulator 3044. The encoder 3041 is configured to encode a to-be-sent signal. For example, the encoder 3041 may be configured to: receive the service data and/or the signaling message that are/is to be sent on the uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and may provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling).

The processor 304 receives digital data that may represent voice, data, or control information, and processes the digital data for transmission. The processor 304 may support one or more of a plurality of wireless communications protocols of a plurality of communications systems, for example, a long term evolution (LTE) communications system, new radio (NR), a universal mobile telecommunications system (UMTS), and high speed packet access (HSPA). Optionally, the processor 304 may also include one or more memories.

The terminal device may further include an application processor 302 that is configured to generate the foregoing digital data that may represent voice, data, or control information.

The processor 304 and the application processor 302 may be integrated into one processor chip.

The memory 303 is configured to store program code (sometimes referred to as a program, instructions, software, or the like) and/or data that are/is used to support the terminal device in communication.

A memory in the embodiments of this application may be a storage unit. Details are not described below again.

It should be noted that, the memory 203 or the memory 303 may include one or more storage units, for example, may be a storage unit that is inside the processor 201 or the processor 304 or the application processor 302 and that is used to store program code, or may be an external storage unit independent of the processor 201 or the processor 304 or the application processor 302, or may be a component including a storage unit that is inside the processor 201 or the processor 304 or the application processor 302 and an external storage unit that is independent of the processor 201 or the processor 304 or the application processor 302.

The processor 201 and the processor 304 may be processors of a same type, or may be processors of different types. For example, the processor 201 and modem processor 301 may be implemented as central processing units (CPU), general-purpose processors, digital signal processors (DSP), application-specific integrated circuits (ASIC), field programmable gate arrays (FPGA) or other programmable logic devices, transistor logic devices, hardware components, other integrated circuits, or any combination thereof. The processor 201 and the processor 304 may implement or execute various example logical blocks, modules, and circuits described with reference to content disclosed in the embodiments of the present invention. The processor may be a combination of components implementing computing functions, for example, a combination of one or more microprocessors, a combination of a DSP and a microprocessor, or a system-on-a-chip (system-on-a-chip, SOC).

A person skilled in the art can understand that various explanatory logic blocks, modules, circuits, and algorithms described with reference to the various aspects disclosed in this application may be implemented as electronic hardware, instructions that are stored in a memory or another computer-readable medium and that is executed by a processor or another processing device, or a combination thereof. As an example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functionality for each particular application, but it should not be considered that such implementation goes beyond the scope of the present invention.

Before the technical solutions in the embodiments of this application are described, related technical terms and application scenarios in the embodiments of this application are explained and described first.

1. Control Resource Set (CORESET)

CORESET: To improve efficiency of performing blind detection on a control channel by a terminal, a concept of a control resource set is proposed during formulation of an NR standard. A network device may configure one or more resource sets for UE, to send a physical downlink control channel (PDCCH). The network device may send the control channel to the terminal on any control resource set corresponding to the terminal. In addition, the network device further needs to notify the terminal of another configuration associated with the control resource set, for example, a search space set. Configuration information of all control resource sets varies. For example, frequency-domain widths vary, or time-domain lengths vary.

Optionally, the control resource set in this application may be a CORESET, a control region, or an ePDCCH set defined in a 5G mobile communications system.

2. Quasi-Colocation (QCL) Information

QCL information: Quasi-co-site or quasi-colocation QCL assumption information may also be referred to as QCL information. The QCL information is used to assist in describing beamforming information and a reception procedure on a receive side of a terminal.

Further, the QCL information is used to indicate a QCL relationship between two reference signals: a source reference signal and a target reference signal. The target reference signal may be generally a demodulation reference signal (DMRS), a channel state information reference signal (CSI-RS), or the like. A referenced reference signal or the source reference signal may be generally a CSI-RS, a tracking reference signal (TRS), a synchronization signal/PBCH block (SSB), or the like. It should be understood that spatial characteristic parameters of two reference signals or channels that meet a QCL relationship are the same or similar, so that a spatial characteristic parameter of the target reference signal may be inferred based on a resource index of the source reference signal. The spatial characteristic parameter includes one or more of the following parameters:

an angle of arrival (angle of arrival, AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average channel delay (average delay), a delay spread, a Doppler spread, a Doppler shift, a spatial receive parameter (spatial Rx parameters), and the like.

These spatial characteristic parameters describe characteristics of a spatial channel between antenna ports of the source reference signal and the target reference signal, so that the terminal can perform a beamforming or reception processing process on the receive side based on the QCL information. It should be understood that the terminal may receive the target reference signal based on source reference signal reception information indicated by the QCL information.

To reduce overheads of indicating the QCL information by a network device side to the terminal side, in an optional implementation, the network device side may indicate that a demodulation reference signal of a physical downlink control channel (PDCCH) or a physical downlink shared channel (PDSCH) and one or more of a plurality of reference signal resources previously reported by the terminal meet a QCL relationship. For example, the reference signal may be a CSI-RS. Herein, an index of each reported CSI-RS resource corresponds to one transmit-receive beam pair previously established during measurement performed based on the CSI-RS resource. It should be understood that receive beam information of two reference signals or channels that meet a QCL relationship is the same, so that the UE may infer, based on the reference signal resource index, receive beam information for receiving the PDCCH or the PDSCH.

Four QCL types are defined in an existing standard. A base station may configure one or more QCL types for the UE, for example, a QCL type A and a QCL type D, or a QCL type C and a QCL type D:

QCL type A: a Doppler shift, a Doppler spread, an average channel delay, and a delay spread;

QCL type B: a Doppler shift and a Doppler spread;

QCL type C: an average channel delay and a Doppler shift; and

QCL type D: a spatial receive parameter (spatial RX parameter).

It can be understood that the QCL information in this application includes one or more of the QCL type A, the QCL type B, the QCL type C, and the QCL type D.

3. Spatial Relation Information

The spatial relation information is used to assist in describing beamforming information or a transmission procedure on a transmit side of a terminal. Specifically, the spatial relation information is used to indicate a relationship between spatial receive parameters of two reference signals. A target reference signal may be generally a DMRS, a sounding reference signal (SRS), or the like. A referenced reference signal or a source reference signal may be generally a CSI-RS, an SRS, an SSB, or the like. It should be understood that spatial characteristic parameters of two reference signals or channels that meet spatial relation information are the same, so that a spatial characteristic parameter of the target reference signal may be inferred based on a resource index of the source reference signal. The spatial characteristic parameter is the same as the foregoing spatial characteristic parameter, for example, the angle of arrival (AoA), the dominant angle of arrival AoA, the average angle of arrival, . . . , or the spatial receive parameter (spatial Rx parameters). Examples are not described in detail herein. These spatial characteristic parameters describe characteristics of a spatial channel between antenna ports of the source reference signal and the target reference signal, so that the terminal can perform a beamforming or transmission processing process on the transmit side based on the spatial relation information. It should be understood that the terminal may transmit the target reference signal based on source reference signal transmission information indicated by the spatial relation information.

4. Transmission Configuration Indicator (TCI)

TCI information is used to indicate QCL information of a PDCCH/CORESET or a PDSCH. Further, the TCI information indicates that a reference signal included in a TCI and a DMRS of a PDCCH/PDSCH meet a QCL relationship, and is mainly used to indicate that during reception of the PDCCH/PDSCH, information such as a spatial characteristic parameter of the PDCCH/PDSCH is the same as, similar to, or approximate to information such as a spatial characteristic parameter of the reference signal included in the TCI.

5. Synchronization Signal/PBCH Block (SS/PBCH Block)

The SS/PBCH block may also be referred to as an SSB. A physical broadcast channel (PBCH). The SSB includes at least one of a primary synchronization signal (PSS), a secondary synchronization signal (SSS), and a PBCH. The SSB is a signal mainly used for cell searching, cell synchronization, and carrying broadcast information.

6. Beam

A beam is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources, and same information or different information may be sent by using different beams.

Optionally, a plurality of beams with a same communication feature or similar communication features may be considered as one beam. One beam may include one or more antenna ports, configured to transmit a data channel, a control channel, a sounding signal, and the like. For example, a transmit beam may be a distribution of signal strengths formed in different directions in space after a signal is transmitted by an antenna, and a receive beam may be a distribution of signal strengths, in different directions in space, of a radio signal received by an antenna. It can be understood that the one or more antenna ports forming the beam may alternatively be considered as one antenna port set.

Beams may be classified into a transmit beam and a receive beam of a network device and a transmit beam and a receive beam of a terminal. The transmit beam of the network device, such as a base station, is used to describe beamforming information on a transmit side of the network device, and the receive beam of the base station is used to describe beamforming information on a receive side of the network device. Similarly, the transmit beam of the terminal is used to describe beamforming information on a transmit side of the terminal, and the receive beam of the terminal is used to describe beamforming information on a receive side of the terminal. Therefore, it is generally understood that a beam may be used to describe beamforming information.

In addition, a beam may correspond to one or more of a time resource, a space resource, and a frequency domain resource.

Optionally, a correspondence may further be generated between a beam and a reference signal resource (for example, a beamforming reference signal resource) or beamforming information.

Optionally, a beam may alternatively correspond to information associated with a reference signal resource of a network device. A reference signal may be a CSI-RS, an SSB, a DMRS, a phase tracking signal (PTRS), a TRS, or the like. The information associated with the reference signal resource may be a reference signal resource identifier, QCL information (particularly a QCL type D), TCI information, or the like. The reference signal resource identifier corresponds to a transmit/receive beam pair established during previous measurement based on the reference signal resource. The terminal may infer beam information by using the reference signal resource index.

Optionally, a beam may alternatively correspond to a spatial domain filter (spatial filter/spatial domain filter), a spatial domain transmission filter, a spatial filter, or a spatial transmission filter. The receive beam is equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. Information about a spatial relation parameter is equivalent to a spatial filter (spatial domain transmission/receive filter).

Further, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. Optionally, a receive beam on the terminal side and a transmit beam on the network device side may serve as downlink spatial filters, and a transmit beam on the terminal side and a receive beam on the network device side may serve as uplink spatial filters.

7. Initial Bandwidth Part (Initial BWP)

When a terminal in an RRC idle state accesses a cell or a wideband carrier, a BWP used during initial access of the terminal is referred to as an initial BWP, or this may be understood as that the terminal performs random access on the initial BWP.

8. Active BWP

When a service arrives at a terminal, a network device schedules the terminal from an initial BWP to a BWP whose bandwidth matches the service of the terminal, and may indicate, by using higher layer signaling or layer 1 signaling, a BWP on which the terminal device currently operates. The network device and the terminal may send and receive data and/or reference signals on the BWP. The BWP is referred to as an active BWP. When there is one carrier or one serving cell, one terminal has only one active BWP at one moment, and the terminal can receive or send data/reference signals only on the active BWP.

Dynamic switching of the BWPs is supported in a current communications system. A network device indicates, by using downlink control information (downlink control information, DCI) or radio resource control (radio resource control, RRC) signaling, a terminal device to perform BWP switching. The DCI is located on a current BWP, and a size of a frequency domain resource allocation information field of the DCI is determined by bandwidth of the current BWP. The DCI includes a bandwidth part indicator (bandwidth part indicator) information field, used to indicate an ID number of a BWP activated by the terminal. When a BWP ID number indicated by the information field is different from an ID number of a BWP currently activated by the terminal (namely, the current BWP used for transmitting the DCI), the terminal needs to switch from the current BWP to a BWP indicated in the DCI.

Currently, different types of reference signals are usually used in a communications system. One type of reference signal is used for channel estimation, for example, a DMRS, to perform coherent demodulation on a received signal that includes control information or data. Another type is used for channel state or channel quality measurement, for example, a CSI-RS, to schedule UE. The UE obtains channel state information (CSI) by performing channel quality measurement by using the CSI-RS. The CSI includes at least one of a rank indicator (RI), a precoding matrix indicator (PMI), a channel quality indicator (CQI), and the like. The CSI information may be sent by the UE to a base station through a physical uplink control channel (PUCCH) or a physical uplink shared channel (PUSCH).

An existing method for indicating spatial relation parameter information of a PDSCH or a PUSCH is as follows:

An indication of a spatial relation parameter/spatial characteristic parameter of the PDSCH is mainly implemented by using TCI information. For example, joint indication is performed by using radio resource control (RRC) signaling, medium access control (MAC-CE) signaling, and downlink control information (DCI); or joint indication may be performed by using RRC signaling and DCI.

Specifically, a dynamic indication method includes:

Step 1: The network device configures M candidate transmission configuration indicator (TCI) states of the PDSCH by using RRC signaling, where an RRC message includes M pieces of candidate TCI state configuration information, each candidate TCI state includes one piece of QCL information, each piece of TCI state configuration information includes one TCI ID, and further, a QCL type 1 and/or a QCL type 2 may further be included.

Step 2: The network device activates $2^N$ TCI states (a subset of the M TCI states) from the M TCI states by using a MAC-CE.

Table 1 shows a schematic diagram of a MAC CE format of a MAC-CE used to indicate an activated or deactivated state of a TCI state field.

TABLE 1

| R | Serving cell identity/Serving cell ID | | | | | Bandwidth part identifier/BWP ID | |
|---|---|---|---|---|---|---|---|
| T7 | T6 | T5 | T4 | T3 | T2 | T1 | T0 |
| T15 | T14 | T13 | T12 | T11 | T10 | T9 | T8 |
| ... | ... | ... | ... | ... | ... | ... | ... |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ |

The bandwidth part (Bandwidth part, BWP) ID occupies 2 bits and is used to indicate a downlink bandwidth part applied to the MAC-CE.

The serving cell identity (serving cell ID) occupies 5 bits and is used to indicate an ID of a serving cell to which a TCI indicated by the MAC-CE belongs.

A Ti field is used to indicate activation/deactivation of a TCI state whose TCI state identifier is i. Further, the Ti field being "1" indicates that the TCI whose TCI state identifier is i is activated, and is mapped to a TCI field in DCI. The Ti field being "0" indicates that the TCI state whose TCI state identifier is i is deactivated, and is not mapped to the TCI field in the DCI.

"R" indicates a reserved bit, and is usually set to "0".

In the MAC CE, all TCI state fields set to 1 are mapped to codepoints in sequence. To be specific, a first TCI state field set to 1 is mapped to a point value 0, a second TCI state field set to 1 is mapped to a point value 1, and the like. In the NR Rel-15 protocol, a maximum of eight TCI states can be activated.

The TCI field in the DCI has N bits used to indicate that one of the $2^N$ TCI states is used to receive the PDSCH. In the NR Release 15 (Release 15, Rel-15) protocol, N=3. DCI shown in Table 2 may be used to indicate one of the TCI states.

TABLE 2

| State value of a TCI field/ Value of TCI field | TCI state/TCI state |
|---|---|
| 000 | TCI state ID a1 |
| 001 | TCI state ID a2 |
| 010 | TCI state ID a3 |
| 011 | TCI state ID a4 |
| 100 | TCI state ID a5 |
| 101 | TCI state ID a6 |
| 110 | TCI state ID a7 |
| 111 | TCI state ID a8 |

For example, the network device indicates 64 TCI states for receiving the PDSCH by using the RRC signaling, and activates eight TCI states in the 64 TCI states by using MAC-CE signaling. IDs of the eight TCI states are a1 to a8. If a state value in the DCI is 000, the terminal device determines that an identifier (TCI state ID) of a corresponding TCI state is a1, and the terminal device receives the PDSCH based on the TCI state indicated by the TCI state ID a1.

Whether the DCI includes a TCI field for the PDSCH may be indicated by using higher layer signaling, for example, a TCI-PresentInDCI field in the RRC signaling. This field may be configured for each CORESET. When this field is configured for a CORESET and is enabled, a TCI field exists in DCI detected in the CORESET. When this field is not configured for a CORESET, no TCI field exists in DCI detected in the CORESET. In this case, optionally, a TCI state of the PDSCH is a TCI state configured for a PDCCH.

When a scheduling offset value is less than a threshold k, UE receives the PDSCH by using a default TCI state. When the scheduling offset value is greater than the threshold k, the UE receives the PDSCH by using a TCI state indicated in the DCI. It is specified that, in an initial RRC and MAC-CE stage, the UE assumes that DMRSs of the PDCCH and the PDSCH and a synchronization signal/PBCH block (synchronous signal/PBCH block, SSB) determined during initial access are QCL-based.

A procedure in which beam information is indicated by using a spatial relation parameter/spatial characteristic parameter of a PUSCH is similar to a beam indication procedure of the PDSCH, and the beam information may jointly be indicated by using RRC signaling, a MAC-CE, and DCI, or by using RRC signaling and DCI. The DCI includes a sounding reference signal resource indicator (SRI) field, and is used to indicate spatial relation parameter/spatial characteristic parameter information (spatial relation information) of the PUSCH.

As shown in the background, in a current beam indication method, only a transmission mode in which a single transmission reception point (TRP) communicates with a terminal at a specific moment by using one beam is considered. However, a next-generation communications system such as new radio (NR) can support the network device in communicating with one terminal by simultaneously using different beams, that is, multi-beam transmission, or can support a plurality of TRPs in serving the terminal. That a plurality of TRPs communicate with one terminal includes: The plurality of TRPs simultaneously communicate with the terminal, or the plurality of TRPs dynamically select a node in a dynamic point selection (DPS) transmission mode to communicate with the terminal. A scenario in which a plurality of TRPs simultaneously communicate with one terminal may also be referred to as a non-coherent joint transmission (NCJT) scenario or an NCJT transmission mode.

An existing protocol cannot support beam indication in a multi-beam transmission mode. The plurality of beams may come from one network device or a plurality of network devices, or may come from one TRP or a plurality of TRPs. In a multi-beam or multi-TRP transmission scenario, a corresponding mechanism needs to be introduced to indicate a beam of a data channel. To be specific, in a multi-network device/multi-beam/multi-link/multi-layer/multi-TRP transmission scenario, a corresponding mechanism needs to be introduced to indicate QCL information of a physical channel.

To solve the foregoing problem, this application provides the following technical solutions.

Figure 4:
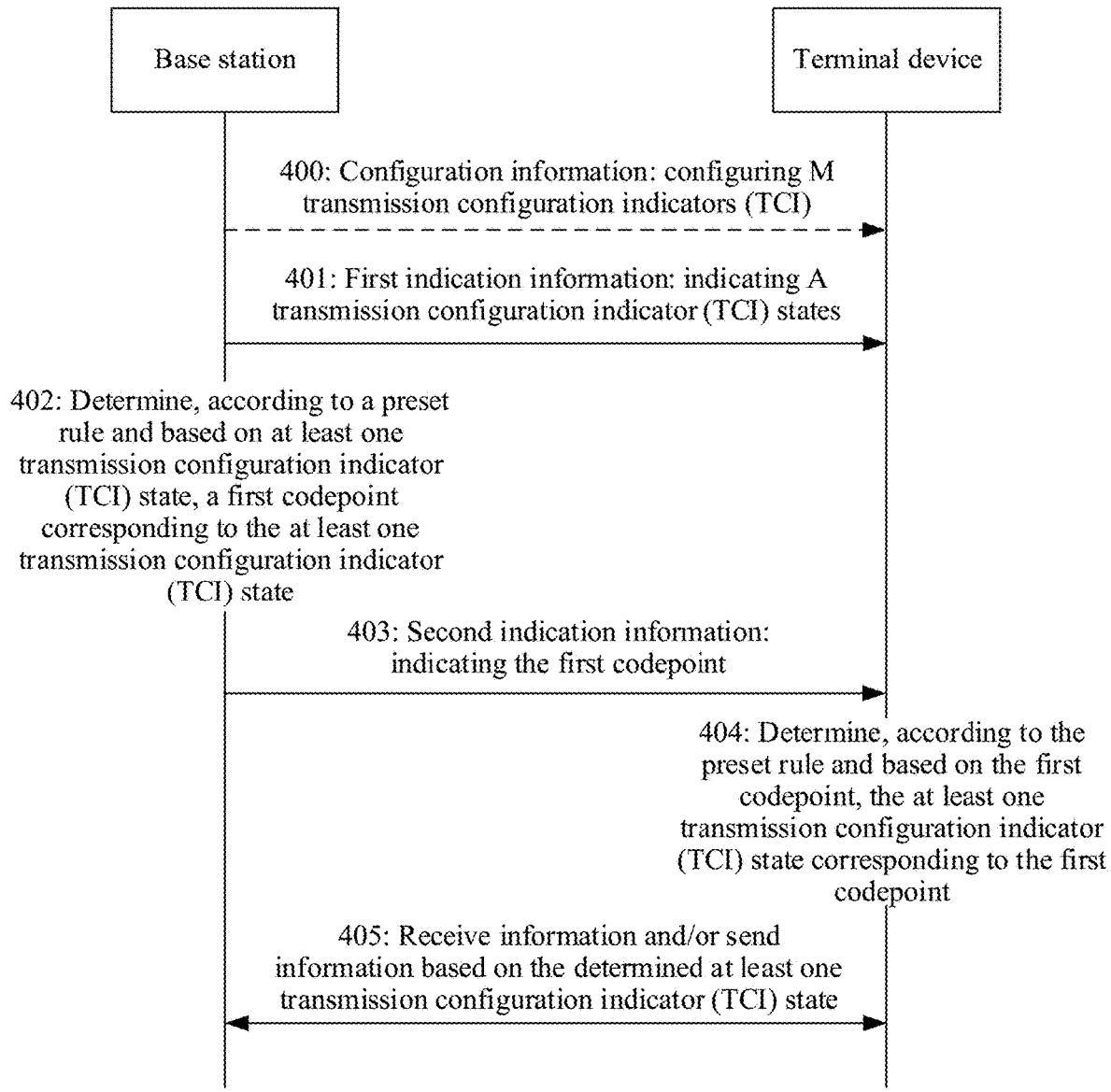
FIG. 4 is a signaling flowchart of an information indication method according to an embodiment of this application.

FIG. 4 is a schematic flowchart of an information indication method. The following steps are included.

Step 400: A network device 101 sends configuration information to a terminal device 111, where the configuration information includes M pieces of TCI state configuration information, and M is a positive integer greater than 1. Correspondingly, the terminal device 111 receives the configuration information.

Specifically, a value of M depends on a capability of UE.

Each TCI state may include one piece of QCL information. Each piece of TCI state configuration information includes one TCI ID. Further, a QCL type 1 and/or a QCL type 2 may further be included. It may be understood that one TCI ID may correspond to one or more QCLs of a same type, or QCLs of a same type that correspond to one TCI ID include one reference signal (manner 1) or a plurality of reference signals (manner 2). This is not limited in the embodiments of this application.

For example, each piece of TCI state configuration information includes the following information:

```
TCI-State ::=      SEQUENCE {
    tci-StateId    TCI-StateId,
    qcl-Type1      QCL-Info,
    qcl-Type2      QCL-Info       OPTIONAL,  -- Need R
    ...
}
QCL-Info ::=       EQUENCE {
    Cell           ServCellIndex  OPTIONAL,  -- Need R
    bwp-Id         BWP-Id         OPTIONAL, -- Cond CSI-RS-
Indicated
```

```
    referenceSignal        CHOICE {
    csi-rs                 NZP-CSI-RS-ResourceId,
    ssb                    SSB-Index
    },
    qcl-Type               ENUMERATED {typeA, typeB, typeC, typeD},
    ...
}
```

Specifically, the M TCI states may be grouped into at least two sets, and a network device/beam/link/transport layer/TRP corresponding to each TCI state set may be different.

Specifically, a manner of grouping the M TCI states into one or more sets includes at least one of the following:

Manner 1 of grouping the M TCI states into one or more sets: grouping the M TCI states into one or more sets based on TCI state identifiers. In a first TCI state set, a TCI state identifier belongs to a first range. For example, the first range is a range of a TCI 0 to a TCI 63. In a second TCI state set, a TCI state identifier belongs to a second range. For example, the second range is a TCI 64 to a TCI 127. In a third TCI state set, a TCI state identifier belongs to a third range. For example, the third range is a TCI 28 to a TCI 191. It may be understood that TCI state identifiers included in the first range, the second range, the third range, and the like may be consecutive or nonconsecutive. One or more of the first range, the second range, the third range, and the like may be specified in a protocol, or configured by the network device to the terminal device by using signaling information. The signaling information may be included in the configuration information, or may be separate information. This is not limited in the embodiments of this application.

Manner 2 of grouping the M TCI states into one or more sets: grouping the M TCI states into one or more sets based on a quantity of Ti fields whose values are 1 or a quantity of activated TCI states in first indication information in step 401. Specifically, in an order of the Ti fields whose values are 1, a first TCI state set includes TCI states corresponding to a first Ti field whose value is 1 to an $H1^{th}$ Ti field whose value is 1; a second TCI state set includes TCI states corresponding to an $(H1+1)^{th}$ Ti field whose value is 1 to an $H2^{th}$ Ti field whose value is 1; and a third TCI state set includes TCI states corresponding to an $(H2+1)^{th}$ Ti field whose value is 1 to an $H3^{th}$ Ti field whose value is 1. For example, H1=8, H2=16, H3=24, and the like. Specific values of H1, H2, H3, and the like are not limited in the embodiments of this application. H1, H2, H3, and the like may be all the same, or all or some of H1, H2, H3, and the like may be different. One or more of H1, H2, H3, and the like may be specified in a protocol, or configured by the network device to the terminal device by using signaling information. The signaling information may be included in the configuration information, or may be separate information. This is not limited in the embodiments of this application. When the quantity of the Ti fields that are indicated by the first indication information in step 401 and whose values are 1 is less than or equal to H1, the Ti fields are grouped into only one set; when the quantity of the Ti fields whose values are 1 is greater than H1 but less than or equal to H2, first H1 Ti fields are the first TCI state set, and the following Ti fields are the second TCI state set; and the like.

Alternatively, TCI states corresponding to a first half of Tis in the Ti fields that are indicated by the first indication information in step 401 and whose values are 1 are grouped into the first TCI state set, TCI states corresponding to a second half of Tis are the second TCI state set, and the like.

Alternatively, according to an order of the activated TCI states indicated by the first indication information, the first TCI state set includes a first activated TCI state to an $H1^{th}$ activated TCI state, and the second TCI state set includes an $(H1+1)^{th}$ activated TCI state to an $H2^{th}$ activated TCI state.

Manner 3 of grouping the M TCI states into one or more sets: grouping the M TCI states into one or more sets based on indication information associated with first indication information in step 401. Specifically, the indication information may indicate information such as the range in the manner 1 of grouping the M TCI states into one or more sets or information such as Hi in the manner 2 of grouping the M TCI states into one or more sets. The association with the first indication information means that the first indication information may include the indication information or the indication information has a mapping relationship with the first indication information.

Example 4-1: For example, it is assumed that the M TCI states are grouped into two sets. A first TCI state set includes M1 TCI states, and may correspond to one network device/beam/link/transport layer/TRP. The M1 TCI states may be denoted as M1 first TCI states, and one first TCI state includes one TCI state. A second TCI state set includes M2 TCI states, and may correspond to another network device/beam/link/transport layer/TRP. The M2 TCI states may be denoted as M2 second TCI states, and one second TCI state includes one TCI state. M1+M2=M.

Example 4-2: For another example, it is assumed that the M TCI states are grouped into two TCI state sets. A first TCI state set includes M1 TCI states, and may correspond to one network device/beam/link/transport layer/TRP. The M1 TCI states may be denoted as M1 first TCI states, and one first TCI state includes one TCI state. The second TCI state set includes M2 TCI states, and M2 is a positive integer. To be specific, in the M2 TCI states, some TCI states may correspond to one network device/beam/link/transport layer/TRP, and some other TCI states may correspond to another network device/beam/link/transport layer/TRP. Generally, TCI states corresponding to different network devices/beams/links/transport layers/TRPs in the M2 TCI states may appear in pairs. When there are two network devices/beams/links/transport layers/TRPs, M2' second TCI states may be denoted, where at least one second TCI state includes two TCI states, and M2'≤M2. Further, optionally, M2/2≤M2'≤M2. It is assumed that M2=16, a TCI state identifier 64 (TCI 64 for short) and a TCI state 120 (TCI 120 for short) are a pair, a TCI 65 and a TCI 121 are a pair, a TCI 66 and a TCI 122 are a pair, and the like. It should be understood that, corresponding to a plurality of network devices/beams/links/transport layers/TRPs means that the plurality of network devices/beams/links/transport layers/TRPs may be used for joint data sending or joint data receiving. For ease of description, in the embodiments of this application, a plurality of TCI states corresponding to a plurality of network devices/TRPs/beams/links/transport layers may alternatively be referred to as a TCI state group. For example, in the foregoing example, the TCI 64 and the TCI 120 are referred to as a TCI state group, the TCI 65 and the TCI 121 are referred to as a TCI state group, and the like. Therefore, in the embodiments of this application, one first TCI state may be a TCI state group, and one second TCI state may also be a TCI state group. A quantity of TCI states included in one TCI state group is not limited in the embodiments of this application. In an extreme case, a TCI state group may include only one TCI state.

Example 4-3: For another example, it is assumed that the M TCI states are grouped into three TCI state sets. A first TCI state set includes M1 TCI states, and corresponds to one network device/beam/link/transport layer/TRP. The M1 TCI states may be denoted as M1 first TCI states, and one first TCI state includes one TCI state. A second TCI state set includes M2 TCI states, and may correspond to one network device/beam/link/transport layer/TRP. The M2 TCI states may be denoted as M2 second TCI states, and one second TCI state includes one TCI state. A third TCI state set includes M3 TCI states. Some TCI states may correspond to one network device/beam/link/transport layer/TRP, and some other TCI states may correspond to another network device/beam/link/transport layer/TRP. Generally, TCI states corresponding to different network devices/beams/links/transport layers/TRPs in the M3 TCI states may appear in pairs. When there are two network devices/beams/links/transport layers/TRPs, M3' third TCI states may be denoted, where at least one third TCI state includes two TCI states. $M1+M2+M3 \leq M$. M1, M2, and M3 are positive integers, $M3' \leq M3$, and further optionally, $M3/2 \leq M3'$. A specific meaning is the same as that in the foregoing example, and details are not described herein again.

Table 3 shows an example of a correspondence between a TCI state and a network/device/beam/link/transport layer/TRP. The first column and the second column indicate 64 TCI states that are configured by using the configuration information and that correspond to a first network device/beam/link/transport layer/TRP, and TCI state identifiers are respectively a TCI 0 to a TCI 63. The third column and the fourth column indicate 64 TCI states that are configured by using the configuration information and that correspond to a second network device/beam/link/transport layer/TRP, and TCI state identifiers are respectively a TCI 64 to a TCI 127. The fifth column and the sixth column indicate TCI states that are configured by using the configuration information and that correspond to the first and second network devices/beams/links/transport layers/TRPs. The TCI states are used by the two network devices/beams/links/transport layers/TRPs to jointly send and receive data, and TCI state identifiers are in pairs. Optionally, a TCI state identifier before a comma corresponds to the first network device/beam/link/transport layer/TRP, and a TCI state identifier after the comma corresponds to the second network device/beam/link/transport layer/TRP. For example, (0, 64) indicates that the TCI 0 corresponding to the first network device/beam/link/transport layer/TRP and the TCI 64 corresponding to the second network device/beam/link/transport layer/TRP may be used to jointly send and receive data; and (10, 80) indicates that the TCI 10 corresponding to the first network device/beam/link/transport layer/TRP and the TCI 80 corresponding to the second network device/beam/link/transport layer/TRP may be used to jointly send and receive data, and the like. When the first network device/beam/link/transport layer/TRP and the second network device/beam/link/transport layer/TRP jointly send and receive data, the TCI IDs may alternatively not appear in pairs.

Optionally, any two of M1 TCI state identifiers are different, and any two of M2 TCI state identifiers are different. Optionally, any one of M1 TCI state identifiers may be different from each of M2 TCI state identifiers. For example, any one of the M1 TCI state identifiers is less than each of the M2 TCI state identifiers. Alternatively, optionally, at least one of the M1 TCI state identifiers is the same as one of the M2 TCI state identifiers. This is not limited in the present invention.

TABLE 3

| | TCI state identifier |
|---|---|
| First network device/ beam/link/transport layer/TRP | 0 |
| | 1 |
| | 2 |
| | 3 |
| | ... |
| | 61 |
| | 62 |
| | 63 |
| Second network device/ beam/link/transport layer/TRP | 64 |
| | 65 |
| | 66 |
| | 67 |
| | ... |
| | 125 |
| | 126 |
| | 127 |
| First and second network devices/beams/links/ transport layers/TRPs | 0, 64 |
| | 10, 80 |
| | 11, 81 |
| | 12, 82 |
| | ... |
| | 14, 84 |
| | 15, 85 |
| | 16 |

It may be understood that when there is a plurality of network devices/beams/links/transport layers/TRPs, for an embodiment method, refer to a method for two TRPs. A quantity of TRPs (or a quantity of sets of M TCI states) is not limited in the embodiments of this application.

It should be noted that the foregoing description about grouping the M TCI states into one or more sets is only for ease of understanding. In a an embodiment, the configuration information may include information related to the one or more sets, or may not include the information related to the one or more sets. To be specific, when receiving the configuration information, the terminal device may directly obtain, by using the configuration information, the information related to the one or more sets; or may obtain, with reference to the first indication information in step 401 or the indication information associated with the first indication information, the information related to the one or more sets, or may obtain, with reference to other signaling information or a protocol specification, the information related to the one or more sets.

It may be understood that any one of the plurality of TCI state sets may be associated with one network device/beam/link/transport layer/TRP, or may be associated with a plurality of network devices/beams/links/transport layers/TRPs. For example, in the foregoing example, the first TCI state set may alternatively be associated with a plurality of network devices/beams/links/transport layers/TRPs. This is not limited in the present invention.

The configuration information may be included in higher layer signaling. This is not limited in the present invention.

The configuration information may be included in one piece of signaling, or may be included in a plurality of pieces of signaling. When the configuration information is included in the plurality of pieces of signaling, each piece of signaling is for one network device/beam/link/transport layer/TRP.

For example, a configuration of a TRP 1, a configuration of a TRP 2, or a configuration of both a TRP 1 and a TRP 2 may be carried by using different signaling, for example, different RRC messages; or two configurations are carried by using a same piece of signaling, for example, a same RRC message, and the other configuration is carried by using another different piece of signaling. This is not limited in the present invention.

The operation of the network device 101 in step 400 may be performed by the transceiver 202, or may be performed by the processor 201 through the transceiver 202. The operation of the terminal device 111 in step 400 may be performed by the transceiver 301, or may be performed by the processor 304 through the transceiver 301.

This step is optional. Without this step, the configuration information may be specified in a protocol, and the network device 101 and the terminal device 111 may obtain configurations of the M TCI states based on the specified configuration information in the protocol. Alternatively, the configuration information is indicated by using the first indication information in step 401. In other words, the first indication information is used to configure the M TCI states, and is also used to activate the M TCI states.

Step 401: The network device 111 sends the first indication information to the terminal device 111, where the first indication information indicates A TCI states, and A is a positive integer. Correspondingly, the terminal device 111 receives the first indication information.

Specifically, the first indication information may be used to activate the A TCI states. Optionally, the A TCI states are a subset of the M TCI states.

Alternatively, the first indication information may be used to configure the A TCI states, where A=M. At the same time, the first indication information is used to activate the A TCI states. As described in step 400, in this case, step 400 does not exist, or step 400 and step 401 are combined into one step.

The A TCI states include K1 first TCI states and K2 second TCI states, and may further include K3 third TCI states, Kx $x^{th}$ TCI states, and the like, where x is a positive integer greater than 1, Kx is a positive integer, and K1+K2+ . . . +Kx≤A. It may be understood that a value of x is equal to a quantity of sets into which the M TCI states are grouped. For example, if the M TCI states are grouped into two sets, x=2; or if the M TCI states are grouped into three sets, x=3. An $x^{th}$ TCI state may include one TCI state, or may include one TCI state group (in other words, a plurality of TCI states).

The following uses an example in which the A TCI states include K1 first TCI states and K2 second TCI states for description. In other words, x=2, and K1+K2≤A. When x is another value, a solution is similar, and details are not described herein again. It may be understood that, in the embodiments of this application, the A TCI states may alternatively include only the first TCI states or the second TCI states. A solution is similar, and details are not described herein again. It may be understood that the first indication information may be included in higher layer signaling, or the first indication information may be included in physical layer signaling. Specific signaling is not limited in the embodiments of the present invention.

The following describes implementations of the first indication information by using an example in which the first indication information is included in MAC layer signaling, that is, the first indication information is a MAC CE.

MAC CE implementation A: By using one MAC CE, one TCI state set or a plurality of TCI state sets in the M TCI states may be activated.

For a specific format of using one MAC CE, refer to Table 1. Each Ti field corresponds to at least one TCI state in the M TCI states. The MAC CE includes M' bits, where each bit corresponds to one Ti field, the MAC CE includes M' Ti fields in total, and M' is a positive integer. Optionally, M' is a multiple of 8. Optionally, the MAC CE may further include a serving cell identity, a bandwidth part identifier, and the like shown in Table 1, and may further include other information. This is not limited in the embodiments of this application.

In the embodiments of this application, for ease of description, a plurality of Ti fields included in one MAC CE may also be grouped into one or more sets, and a quantity of the sets of the Ti fields is the same as a quantity of sets into which the M TCI states are grouped as described in step 401. For example, the M TCI states are grouped into x sets, and the plurality of Ti fields are also grouped into x sets. A Ti field in each set may be separately used to activate the K1 first TCI states (where the K1 first TCI states form a first TCI state set), K2 second TCI states (where the K2 second TCI states form a second TCI state set), . . . , or Kx $x^{th}$ TCI states (where the Kx $x^{th}$ TCI states form an $x^{th}$ TCI state set). Any $x^{th}$ TCI state may correspond to one TCI state in the M TCI states, or may correspond to a plurality of TCI states (namely, a TCI state group) in the M TCI states. This is not limited in the present invention. The first TCI state, the second TCI state, . . . , and the $x^{th}$ TCI state separately correspond to TCI states in different sets in the M TCI states. It should be noted that, related descriptions of grouping the Ti fields into one or more sets in this step 401 and/or grouping the TCI states into one or more sets in step 400 are merely for ease of understanding. In an actual implementation, there may be no action for grouping into sets. In addition, there is no fixed order or fixed cause-effect relationship between grouping the Ti fields into one or more sets in this step 401 and grouping the TCI states into one or more sets in step 400. For example, the TCI states may be first grouped into one or more sets in step 400, and for details about grouping the Ti fields into one or more sets in step 401, refer to grouping the TCI states into one or more sets in step 400. Alternatively, by determining that the Ti fields are grouped into one or more sets in step 401, it is determined that the TCI states are grouped into one or more sets in step 400. Alternatively, the Ti fields are grouped into one or more sets in this step 401, and the TCI states are not grouped into sets in step 400.

Example 4-1-1A: For example, based on the example 4-1 and the manner 1 of grouping the M TCI states into one or more sets, correspondingly, the plurality of Ti fields are grouped into two sets. M1 Ti fields in a first set may correspond to the M1 TCI states, and the M1 TCI states are denoted as the M1 first TCI states. M2 Tis in a second set may correspond to the M2 TCI states, and the M2 TCI states are denoted as the M2 second TCI states.

Example 4-2-1A: For another example, based on the example 4-2, correspondingly, the plurality of Ti fields are grouped into two sets. M1 Ti fields in a first set may correspond to the M1 TCI states, and the M1 TCI states are denoted as the M1 first TCI states. M2 Tis in a second set may correspond to the M2 TCI states, and the M2 TCI states are denoted as the M2' second TCI states. At least one second TCI state in the M2' second TCI states includes two TCI states, and M2'≤M2. Further optionally, M2/2≤M2'≤M2.

Example 4-2-2A: For another example, based on the example 4-2 and the manner 1 of grouping the M TCI states into one or more sets, correspondingly, the plurality of Ti fields are grouped into two sets. M1 Ti fields in a first set may correspond to the M1 TCI states, and the M1 TCI states are denoted as the M1 first TCI states. M2' Tis in a second set may correspond to the M2 TCI states, and the M2 TCI states are denoted as the M2' second TCI states. At least one second TCI states in the M2' second TCI states include two TCI states.

Example 4-3-1A: For another example, based on the example 4-3 and the manner 1 of grouping the M TCI states into one or more sets, correspondingly, the plurality of Ti fields are grouped into three sets. M1 Ti fields in a first set may correspond to the M1 TCI states, and the M1 TCI states are denoted as the M1 first TCI states. M2 Ti fields in a second set may correspond to the M2 TCI states, and the M2 TCI states are denoted as the M2 second TCI states. M3 Tis in a third set may correspond to the M3 TCI states, and the M3 TCI states are denoted as the M3' third TCI states. At least one third TCI state in the M3' third TCI states includes two TCI states.

Example 4-3-2A: For another example, based on the example 4-3 and the manner 1 of grouping the M TCI states into one or more sets, correspondingly, the plurality of Ti fields are grouped into three sets. M1 Ti fields in a first set may correspond to the M1 TCI states, and the M1 TCI states are denoted as the M1 first TCI states. M2 Ti fields in a second set may correspond to the M2 TCI states, and the M2 TCI states are denoted as the M2 second TCI states. M3' Tis in a third set may correspond to the M3 TCI states, and the M3 TCI states are denoted as the M3' third TCI states. At least one third TCI state in the M3' third TCI states includes two TCI states.

Specifically, in the embodiments of this application, it is assumed that a total quantity of Ti fields in the MAC CE is 128. Methods for mapping the M TCI states to the Ti fields in the MAC CE include the following methods.

Mapping method 1: mapping M TCI state identifiers to M Ti fields in a one-to-one manner.

Specifically, a TCI state configured in step 400 and whose TCI state identifier is i may be mapped to a Ti field. For example, a TCI state whose identifier is 0 is mapped to T0, a TCI state whose identifier is 1 is mapped to Ti, and the like. For details, refer to Table 1. Based on the example 4-1-1A, the M TCI state identifiers are mapped to the M Ti fields in a one-to-one manner, and Manner 1 of grouping the M TCI states into one or more sets is used. A value range of TCI state identifiers of the M1 TCI states in the first set may be some of 0 to 127 in the MAC CE. For example, M1=64, and the value range of the TCI state identifiers of the M1 TCI states is a TCI 0 to a TCI 63. M2=64, and a value range of TCI state identifiers of the M2 TCI states may be some of 0 to 127 in the MAC CE. For example, the value range of the TCI state identifiers of the M2 TCI states is a TCI 64 to a TCI 127, or the like.

Table 4 shows an example of activating the A TCI states.

TABLE 4

| T7(1) | T6(1) | T5 | T4(1) | T3 | T2(1) | T1 | T0(1) |
|---|---|---|---|---|---|---|---|
| T15 | T14 | T13 | T12(1) | T11 | T10(1) | T9 | T8(1) |
| ... | ... | ... | ... | ... | ... | ... | ... |
| T71(1) | T70(1) | T69(1) | T68(1) | T67(1) | T66(1) | T65(1) | T64(1) |
| ... | ... | ... | ... | ... | ... | ... | ... |
| T127 | T126 | T125 | T124 | T123 | T122 | T121 | T120 |

As shown in Table 4, values of fields T0, T2, T4, T6, T7, T8, T10, and T12 in the MAC CE are 1, and these fields are used to activate eight TCI states corresponding to the first set (namely, the TCI states whose TCI state identifiers are a TCI 0 to a TCI 63). TCI state identifiers corresponding to the eight TCI states are respectively the TCI 0, the TCI 2, the TCI 4, the TCI 6, the TCI 7, the TCI 8, the TCI 10, and the TCI 12. Values of fields T64 to T71 in the MAC CE are 1, and these fields are used to activate eight TCI states corresponding to the second set (namely, the TCI states whose TCI state identifiers are a TCI 64 to a TCI 127). TCI state identifiers corresponding to the eight TCI states are the TCI 64 to the TCI 71. Ti(1) in Table 4 indicates that the Ti field is set to 1. Another Ti field is set to 0.

The terminal device may determine, based on the MAC CE shown in Table 4, the eight activated TCI states (or K1 first TCI states, where K1=8) corresponding to the first set and the eight activated TCI states (or K2 second TCI states, where K2=8) corresponding to the second set. A=8+8=16.

Alternatively, based on 4-1-1A, the M TCI state identifiers are mapped to the M Ti fields in a one-to-one manner, and the manner 2 of grouping the M TCI states into sets is used. It is assumed that H1=8. To be specific, first eight Ti fields whose values are 1 are used to activate the TCI states corresponding to the first set, and the remaining Ti fields whose values are 1 are used to activate the TCI states corresponding to the second set. Table 5 shows an example of activating the A TCI states.

TABLE 5

| T7 | T6 | T5 | T4 | T3 | T2 | T1 | T0(1) |
|---|---|---|---|---|---|---|---|
| T15 | T14 | T13 | T12(1) | T11 | T10(1) | T9 | T8(1) |
| ... | ... | ... | ... | ... | ... | ... | ... |
| T71(1) | T70(1) | T69(1) | T68(1) | T67(1) | T66(1) | T65(1) | T64(1) |
| ... | ... | ... | ... | ... | ... | ... | ... |
| T127(1) | T126(1) | T125 | T124(1) | T123(1) | T122 | T121 | T120 |

As shown in Table 5, the first eight Ti fields whose values are 1 in the MAC CE are fields T0, T8, T10, T12, T64, T65, T66, and T67, and are used to activate eight TCI states corresponding to the first set (irrelevant to a value range of the TCI state identifiers). TCI state identifiers corresponding to the eight TCI states are respectively a TCI 0, a TCI 8, a TCI 10, a TCI 12, a TCI 64, a TCI 65, a TCI 66, and a TCI 67. Values of fields T68, T69, T70, T71, T123, T124, T126, and T127 in the MAC CE are 1, and these fields are used to activate eight TCI states corresponding to the second set. TCI state identifiers corresponding to the eight TCI states are the TCI 64 to a TCI 71. Ti(1) in Table 4 indicates that the Ti field is set to 1. Another Ti field is set to 0.

The terminal device may determine, based on the MAC CE shown in Table 5, the eight activated TCI states (or K1 first TCI states, where K1=8) corresponding to the first set and the eight activated TCI states (or K2 second TCI states, where K2=8) corresponding to the second set. A=8+8=16.

Based on the example 4-2-1A, the M TCI state identifiers are mapped to the M Ti fields in a one-to-one manner, and the manner 1 of grouping the M TCI states into one or more sets is used. A value range of TCI state identifiers of the M1 TCI states in the first set may be some of 0 to 127 in the MAC CE. For example, M1=64, and the value range of the TCI state identifiers of the M1 TCI states is TCI 0 to TCI 63. M2=64, and a value range of TCI state identifiers of the M2 TCI states may be some of 0 to 127 in the MAC CE. For example, the value range of the TCI state identifiers of the M2 TCI states is the TCI 64 to the TCI 127, or the like. Table 6 shows an example of activating the A TCI states.

TABLE 6

| T7(1) | T6(1) | T5(1) | T4(1) | T3(1) | T2(1) | T1(1) | T0(1) |
|---|---|---|---|---|---|---|---|
| T15 | T14 | T13 | T12 | T11 | T10 | T9 | T8 |
| ... | ... | ... | ... | ... | ... | ... | ... |
| T71 | T70 | T69 | T68 | T67 | T66(1) | T65(1) | T64(1) |
| ... | ... | ... | ... | ... | ... | ... | ... |
| T127 | T126 | T125 | T124 | T123 | T122(1) | T121(1) | T120(1) |

As shown in Table 6, values of fields T0 to T7 in the MAC CE are 1, and these fields are used to activate eight TCI states corresponding to the first set. TCI state identifiers corresponding to the eight TCI states are a TCI 0 to a TCI 7. Values of fields T64 to T66 and T120 to T122 in the MAC CE are 1, and these fields are used to activate eight TCI states corresponding to the second set. TCI state identifiers corresponding to the eight TCI states are a TCI 64 to a TCI 66 and a TCI 120 to a TCI 122. Ti(1) in Table 5 indicates that the Ti field is set to 1. Another Ti field is set to 0.

The terminal device may determine, based on the MAC CE shown in Table 6, the eight activated TCI states (or K1 first TCI states, where K1=8) corresponding to the first set and the eight activated TCI states (or K2 TCI states, or K2 second TCI states, where in this case, one second TCI state includes two TCI states, and K2=4) corresponding to the second set. A=8+8=16.

Alternatively, based on 4-2-1A, the M TCI state identifiers are mapped to the M Ti fields in a one-to-one manner, and an example implementation of the manner 2 of grouping the M TCI states into one or more sets is similar. Details are not described again.

Mapping method 2: One Ti field may be mapped to one or more TCI states. To be specific, some Ti fields are mapped to one TCI state, and some Ti fields are mapped to a plurality of TCI states (or mapped to one TCI state group).

In this case, a quantity of the Ti fields (for example, N×8) in the MAC CE may be less than a quantity M of the TCI states.

Based on the example 4-2-2A, a value range of the TCI state identifiers of the M TCI states may be some of 0 to 127 in the MAC CE. In addition, in the M TCI states, the M1 first TCI states are mapped to the M1 Ti fields in a one-to-one manner, and the M2/2 second TCI states are mapped to the M2/2 Ti fields in a one-to-one manner. In other words, one TCI state group is mapped to one Ti field. As shown in Table 6, T64 is mapped to a $1^{st}$ second TCI state, that is, mapped to a TCI state group including the TCI 64 and the TCI 120; T65 is mapped to a $2^{nd}$ second TCI state, that is, mapped to a TCI state group including the TCI 65 and the TCI 121; and the like. Table 7 shows an example of activating the A TCI states.

TABLE 7

| T7(1) | T6(1) | T5(1) | T4(1) | T3(1) | T2(1) | T1(1) | T0(1) |
|---|---|---|---|---|---|---|---|
| T15 | T14 | T13 | T12 | T11 | T10 | T9 | T8 |
| ... | ... | ... | ... | ... | ... | ... | ... |
| T71 | T70 | T69 | T68 | T67 | T66(1) | T65(1) | T64(1) |
| ... | ... | ... | ... | ... | ... | ... | ... |
| T127 | T126 | T125 | T124 | T123 | T122 | T121 | T120 |

As shown in Table 7, values of fields T0 to T7 in the MAC CE are 1, and these fields are used to activate eight TCI states corresponding to the first set. TCI state identifiers corresponding to the eight TCI states are a TCI 0 to a TCI 7. Values of fields T64 to T66 in the MAC CE are 1, and these fields are used to activate eight TCI states corresponding to the second set. TCI state identifiers corresponding to the eight TCI states are a TCI 64 to a TCI 66 and a TCI 120 to a TCI 122. Ti(1) in Table 6 indicates that the Ti field is set to 1. Another Ti field is set to 0. It should be noted that, in the example in Table 7, Ti and TCIi are not in a one-to-one correspondence. For example, T64 does not necessarily correspond to the TCI 64.

The terminal device may determine, based on the MAC CE shown in Table 7, the eight activated TCI states (or K1 first TCI states, where K1=8) of the first set and the eight TCI states (or K2 TCI states, or K2 second TCI states, where in this case, one second TCI state includes two TCI states, and K2=4) of the second set. A=8+8=16.

It may be understood that a specific mapping rule from a TCI state to a Ti field is not limited in the embodiments of this application, and a manner of obtaining the mapping rule is not limited. For example, the mapping rule may be specified in a protocol, or the network device notifies the terminal device of the mapping rule.

In an embodiment, the K1 first TCI states are located before the K2 second TCI states. To be specific, in the first indication information, K1 least significant bits (LSB) whose values are 1 correspond to the K1 first TCI states, and the following K2 bits whose values are 1 correspond to the K2 second TCI states. Alternatively, the K1 first TCI states and the K2 second TCI states are in a reverse order. This is not limited in the embodiments of this application. For example, in the order of the activated TCI states indicated by the first indication information, the K1 first TCI states indicated by the first indication information are before the K2 second TCI states indicated by the first indication information. For another example, in the activated TCI states indicated by the first indication information, the first (activated) TCI state to the $K1^{th}$ (activated) TCI state indicated by the first indication information are the first TCI states, and the $(K1+1)^{th}$ (activated) TCI state to the $(K1+K2)^{th}$ TCI state indicated by the first indication information are the second TCI states. For another example, in the (activated) TCI states indicated by the first indication information, the $\{1, 3, 5, \ldots, 2 \times K1-1\}^{th}$ (activated) TCI states indicated by the first indication information are the first TCI states, and the $\{2, 4, 6, \ldots, 2 \times K2\}^{th}$ (activated) TCI states indicated by the first indication information are the second TCI states.

In an embodiment, in the (activated) TCI states indicated by the first indication information, which are the first TCI states and which are the second TCI states may be indicated by using other information.

MAC CE implementation B: A plurality of MAC CEs are used to activate one TCI state set or a plurality of TCI state sets.

For a specific format of using the plurality of MAC CEs, refer to Table 1. Specifically, each MAC CE corresponds to one TCI state set in the M TCI states, and each MAC CE includes a plurality of Ti fields. Each Ti field corresponds to at least one TCI state in one TCI state set in the M TCI states, and is used to activate the corresponding at least one TCI state. For example, a first MAC CE corresponds to M1 TCI states (first TCI states) in the first set, a second MAC CE corresponds to M2 TCI states (second TCI states) in the second set, and the like. The MAC CE includes M' bits, each bit corresponds to one Ti field, and a total of M' Ti fields are included. Different MAC CEs may include a same quantity or different quantities of Ti fields. Optionally, M' is a multiple of 8, that is, an integer multiple of a byte. This is not limited in the embodiments of this application.

Example 4-1-1B: For example, based on the example 4-1, correspondingly, there are two MAC CEs. A first MAC CE corresponds to the first TCI state set. To be specific, M1 Ti fields in the first MAC CE may correspond to the M1 TCI states, and the M1 TCI states are denoted as the M1 first TCI states. A second MAC CE corresponds to the second TCI state set. To be specific, M2 Tis in the second MAC CE may correspond to the M2 TCI states, and the M2 TCI states are denoted as the M2 second TCI states.

Example 4-2-1B: For another example, based on the example 4-2, correspondingly, there are two MAC CEs. A first MAC CE corresponds to the first TCI state set. To be specific, M1 Ti fields in the first MAC CE may correspond to the M1 TCI states, and the M1 TCI states are denoted as the M1 first TCI states. A second MAC CE corresponds to the second TCI state set. To be specific, M2 Ti fields in the second MAC CE may correspond to the M2 TCI states, and the M2 TCI states are denoted as the M2' second TCI states. At least one second TCI state in the M2' second TCI states includes two TCI states.

Example 4-2-2B: For another example, based on the example 4-2, correspondingly, there are two MAC CEs. A first MAC CE corresponds to the first TCI state set. To be specific, M1 Ti fields in the first MAC CE may correspond to the M1 TCI states, and the M1 TCI states are denoted as the M1 first TCI states. A second MAC CE corresponds to the second TCI state set. To be specific, M2 Ti fields in the second MAC CE may correspond to the M2 TCI states, and the M2 TCI states are denoted as the M2' second TCI states. At least one second TCI state in the M2' second TCI states includes two TCI states. In other words, one Ti field corresponds to two TCI states or one TCI state.

Example 4-3-1B: For another example, based on the example 4-3, correspondingly, there are three MAC CEs. A first MAC CE corresponds to the first TCI state set. To be specific, M1 Ti fields in the first MAC CE may correspond to the M1 TCI states, and the M1 TCI states are denoted as the M1 first TCI states. A second MAC CE corresponds to the second TCI state set. To be specific, M2 Ti fields in the second MAC CE may correspond to the M2 TCI states, and the M2 TCI states are denoted as the M2 second TCI states. A third MAC CE corresponds to the third TCI state set. To be specific, M3 Tis in the third MAC CE may correspond to the M3 TCI states, and the M3 TCI states are denoted as the M3' third TCI states. Each of the M3' third TCI states includes two TCI states.

Example 4-3-2B: For another example, based on the example 4-3, correspondingly, there are three MAC CEs. A first MAC CE corresponds to the first TCI state set. To be specific, M1 Ti fields in the first MAC CE may correspond to the M1 TCI states, and the M1 TCI states are denoted as the M1 first TCI states. A second MAC CE corresponds to the second TCI state set. To be specific, M2 Ti fields in the second MAC CE may correspond to the M2 TCI states, and the M2 TCI states are denoted as the M2 second TCI states. A third MAC CE corresponds to the third TCI state set. To be specific, M3' Tis in the third MAC CE may correspond to the M3 TCI states, and the M3 TCI states are denoted as the M3' third TCI states. At least one third TCI state in the M3/2 third TCI states includes two TCI states. In other words, one Ti field may correspond to two TCI states or one TCI state.

In this implementation B, a manner of mapping a plurality of Ti fields in each MAC CE to one TCI state set is similar to the mapping manner in the implementation A, except that one MAC CE is replaced with a plurality of MAC CEs. Details are not described herein again.

MAC CE implementation C: The implementation C is a combination of the implementation A and the implementation B. To be specific, there are a plurality of MAC CEs, where at least one MAC CE corresponds to only one TCI state set in the M TCI states, and at least one MAC CE corresponds to a plurality of TCI state sets. For a specific mapping manner, refer to implementation A and implementation B. Details are not described herein again.

For the MAC CE implementation B or implementation C, a TCI state set or TCI state sets to which a MAC CE is mapped may be specified in a protocol, or may be notified by the network device to the terminal device. For example, indication information is carried in a MAC CE header, to indicate which TCI state set or TCI state sets the MAC CE is used to activate. Specifically, in the conventional technology, a reserved bit (referring to Table 1) in the MAC CE header may be used to indicate which TCI state set or TCI state sets the MAC CE is used to activate. For example, R being 1 indicates that the first TCI state set is activated, that is, the K1 first TCI states are activated, and R being 0 indicates that the second TCI state set is activated, that is, the K2 second TCI states are activated. Alternatively, R being 0 indicates that the first TCI state set is activated, that is, the K1 first TCI states are activated, and R being 1 indicates that the second TCI state set and/or the third TCI state set are activated, that is, the K1 first TCI states and/or the K2 second TCI states are activated, or the like. For another example, a new field is added to a MAC CE header to indicate which TCI state set or TCI state sets the MAC CE is used to activate. For example, the field is represented by using 2 bits, where 00 indicates that the first TCI state set is activated, 01 indicates that the second TCI state set is activated, or the like. For another example, the MAC CE carries TRP identifier information or virtual identifier information, such as a list identifier, an antenna panel (Panel) identifier, a panel virtual identifier, and a reference signal identifier such as an SRI and a CSI-RS resource indicator (CRI). For another example, which TCI state command or TCI state sets to be activated by the MAC CE is/are determined based on downlink control information DCI for scheduling the MAC CE, for example, a format of the DCI, CRC scrambling information of the DCI, information (for example, an index number) of search space in which the DCI is located, information (for example, an index number) of a control channel set in which the DCI is located, antenna port information carried in the DCI, transport block TB information or codeword information carried in the DCI, or other information in the DCI. A specific notification manner is not limited in the embodiments of this application. According to this method, problems of how the MAC-CE updates the TCI state sets, how to update each TCI state set, and which TCI state set to be updated can be resolved.

In another manner of activating the A TCI states, the second indication information carries a TCI state identifier of a to-be-activated TCI state. For example, the second indication information carries a TCI 1, a TCI 2, a TCI 5, a TCI 6, a TCI 9, a TCI 15, a TCI 16, and a TCI 19, and is used to indicate to activate the TCI 1, the TCI 2, the TCI 5, the TCI 6, the TCI 9, the TCI 15, the TCI 16, and the TCI 19.

Optionally, the first indication information may not be in a bitmap manner, but in a manner of indicating a TCI state identifier of a specific activated TCI state. For example, the first indication information explicitly indicates to activate the TCI 1 to the TCI 8. When the first indication information is a MAC CE, indication information may alternatively be carried in a MAC CE header to indicate which TCI state set or TCI state sets the MAC CE is used to activate. For details, refer to the foregoing description. Details are not described again. For example, the first indication information indicates the K1 activated first TCI states and the K2 activated second TCI states in a bitmap manner. For another example, the first indication information indicates the K1 activated first TCI states and the K2 activated second TCI states in a manner of indicating a specific TCI state identifier or index. For another example, the first indication information indicates the K1 activated first TCI states in a bitmap manner, and indicates the K2 activated second TCI states in a manner of indicating a specific TCI state identifier or index.

In an embodiment, K1 is a value predefined in a protocol, or a value notified by the network device to the terminal device by using signaling information, or a value reported by the terminal device to the network device, or a value determined based on other information, or a value calculated based on a value of K2. K2 may be a value predefined in a protocol, or a value notified to the terminal device by using signaling information, or a value reported by the terminal device to the network device, or a value determined based on other information, or a value calculated based on a value of K1.

Optionally, the value of K1 is indicated by using a MAC CE, and the MAC CE may be the first indication information.

Optionally, the value of K2 is indicated by using a MAC CE, and the MAC CE may be the first indication information.

Optionally, both the value of K1 and the value of K2 are indicated by using a MAC CE, and the MAC CE may be the first indication information.

Optionally, K1=P, and P is a quantity of codepoints. For details, refer to step 402. Details are not described herein. K2=A−K1.

Optionally, K1=W, W is a positive integer, 0≤W≤P, and K2=A−K1.

Optionally, a value of K1 or W may be a multiple of 2 or $2^N$. For example, if N=3, K1=8. If A=12, it can be learned that K2=A−K1=4.

Optionally, N is a quantity of bytes of the Ti field included in the MAC CE, and a value of K1 is one of $\{0, 2, \ldots, 2^{i-1}, \ldots, 2^{N-1}, 2^N\}$. The operation of the network device 101 in step 401 may be performed by the transceiver 202, or may be performed by the processor 201 through the transceiver 202. The operation of the terminal device 111 in step 401 may be performed by the transceiver 301, or may be performed by the processor 304 through the transceiver 301.

Step 402: The network device 101 determines, according to a preset rule and based on at least one TCI state, a first codepoint corresponding to the at least one TCI state.

Specifically, the preset rule includes a rule for mapping the A activated TCI states to P codepoints. Alternatively, the preset rule includes a rule for mapping the K1 first TCI states to P codepoints, a rule for mapping the K2 second TCI states to the P codepoints, ..., and a rule for mapping the Kx $x^{th}$ TCI states to the P codepoints.

In an embodiment, after the rule is applied, at least one codepoint in the P codepoints corresponds to at least two TCI states in the A TCI states. In other words, at least two TCI states in the A TCI states may be mapped to a same codepoint. For example, at least one TCI state in the K1 first TCI states and one TCI state in the K2 second TCI states may be mapped to a same codepoint. For another example, it is assumed that each second TCI state includes two TCI states. In this case, the two TCI states may be mapped to a same codepoint.

It may be understood that K1≤P, K2≤P, ..., and Kx≤P in step 401.

For ease of description, in the embodiments of this application, an example in which the preset rule includes a first TCI state mapping rule and a second TCI state mapping rule is used for description. The first TCI state mapping rule and the second TCI state mapping rule may be implemented separately, or may be implemented together. This is not limited in the embodiments of this application. The first TCI state mapping rule and the second TCI state mapping rule may be the same or different. This is not limited in the embodiments of this application.

The first TCI state mapping rule includes a rule for mapping the K1 first TCI states to L1 codepoints in the P codepoints. The second TCI state mapping rule includes a rule for mapping the K2 second TCI states to L2 codepoints in the P codepoints. L1 and L2 are positive integers, L1≤P, and L2≤P.

In an embodiment, K1≤L1.

In an embodiment, K2≤L2.

In an embodiment, L1≤K1. In this case, each of the L1 codepoints corresponds to at least one first TCI state.

In an embodiment, L2≤K2. In this case, each of the L2 codepoints corresponds to at least one second TCI state.

In an embodiment, the L1 codepoints and the L2 codepoints include at least one same codepoint. In other words, at least one codepoint corresponds to at least one first TCI state and at least one second TCI state.

In an embodiment, the first TCI state mapping rule includes: the K1 first TCI states arranged in a first order are sequentially mapped to K1 codepoints in the L1 codepoints arranged in a second order (where this mapping rule is denoted as a first TCI state mapping rule A), where K1≤L1. The first order may be:
- a first order A: an ascending order of TCI state identifiers, or
- a first order B: a descending order of TCI state identifiers, or
- a first order C: an order obtained by transforming a vector including the K1 first TCI states arranged in ascending order of TCI state identifiers, or
- a first order D: an order obtained by transforming a vector including the K1 first TCI states arranged in descending order of TCI state identifiers, or
- a first order E: an order that is of the K1 first TCI states and that is indicated by the first indication information, or
- a first order F: an order obtained by transforming a vector including the K1 first TCI states arranged in an order that is of the K1 first TCI states and that is indicated by the first indication information, or
- a first order G: an order of the first TCI states arranged in a predefined or configured order.

The second order is:
a second order A: an ascending order of codepoint values, or
a second order B: a descending order of codepoint values.

It may be understood that, in the foregoing first orders, the TCI state identifiers may be consecutive or nonconsecutive. This depends on a TCI state identifier of an actually activated TCI state.

The first order C, D, or F may be specifically an order of a column vector obtained by left-multiplying a column vector including the K1 first TCI states by a transformation matrix, or an order of a row vector obtained by right-multiplying a row vector including the K1 first TCI states by a transformation matrix. For example, the first order C is used as an example. A formula 1 provides an example of a transformed vector. Transformation manners of other orders are similar, and details are not described herein. It may be understood that mapping may be completed first, and then transformation is performed. The order is not limited in the present invention.

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \cdot \begin{bmatrix} TCI\ 0 \\ TCI\ 2 \\ TCI\ 4 \\ TCI\ 6 \\ TCI\ 7 \\ TCI\ 8 \\ TCI\ 10 \\ TCI\ 12 \end{bmatrix} = \begin{bmatrix} TCI\ 0 \\ TCI\ 2 \\ TCI\ 4 \\ TCI\ 6 \\ TCI\ 7 \\ TCI\ 8 \\ TCI\ 12 \\ TCI\ 10 \end{bmatrix} \quad \text{(Formula 1)}$$

It may be understood that the transformation matrix may be specified in a protocol, or may be notified by the network device to the terminal device, for example, notified to the terminal device together with the first indication information or the second indication information. The second indication information is described in detail in subsequent steps. A manner of obtaining the transformation matrix is not limited in the embodiments of this application.

In the first order E or F, the order that is of the K1 first TCI states and that is indicated by the first indication information may be consistent or inconsistent with the ascending order or the descending order of the TCI state identifiers. This is specifically related to a mapping relationship between the M TCI states and the Ti fields. This is not limited in the embodiments of this application.

It is assumed that P=8, L1=8, L2=8, and corresponding codepoint values are respectively 0 to 7. Table 8 below uses an example based on the example 4-2-1A and in which the MAC CE implementation A and the method 1 for mapping the TCI states to the M Ti fields are used, and the second order is the ascending order of the codepoint values, to separately show examples in which the K1 first TCI states are mapped to the L1 codepoints in the first orders A to C. Examples of other orders are similar, and details are not described again.

TABLE 8

| Codepoint value | First order A | First order B | First order C (formula 1) |
|---|---|---|---|
| 000 | TCI 0 | TCI 12 | TCI 0 |
| 001 | TCI 2 | TCI 10 | TCI 2 |
| 010 | TCI 4 | TCI 8 | TCI 4 |
| 011 | TCI 6 | TCI 7 | TCI 6 |
| 100 | TCI 7 | TCI 6 | TCI 7 |
| 101 | TCI 8 | TCI 4 | TCI 8 |

TABLE 8-continued

| Codepoint value | First order A | First order B | First order C (formula 1) |
|---|---|---|---|
| 110 | TCI 10 | TCI 2 | TCI 12 |
| 111 | TCI 12 | TCI 0 | TCI 10 |

It may be understood that, in the foregoing implementation, the K1 codepoints may be first K1 codepoints in the L1 codepoints, or may be last K1 codepoints in the L1 codepoints, or pre-fixed or pre-configured K1 codepoints. This is not limited in the embodiments of this application. Alternatively, K1 may be equal to L1, that is, K1 codepoints are L1 codepoints. In an embodiment, the second TCI state mapping rule includes: the K2 second TCI states arranged in a third order are sequentially mapped to K2 codepoints in the L2 codepoints arranged in a fourth order (where this mapping rule is denoted as a second TCI state mapping rule A), where K2≤L2. The third order may be:
a third order A: an ascending order of TCI state identifiers, or
a third order B: a descending order of TCI state identifiers, or
a third order C: an order obtained by transforming a vector including the K2 second TCI states arranged in ascending order of TCI state identifiers, or
a third order D: an order obtained by transforming a vector including the K2 second TCI states arranged in descending order of TCI state identifiers, or
a third order E: an order that is of the K2 second TCI states and that is indicated by the first indication information, or
a third order F: an order obtained by transforming a vector including the K2 second TCI states arranged in an order that is of the K2 second TCI states and that is indicated by the first indication information, or
a first order G: an order of the first TCI states arranged in a predefined or configured order.

The fourth order may be:
a fourth order A: an ascending order of codepoint values, or
a fourth order B: a descending order of codepoint values.

It may be understood that the third order is similar to the first order, and the fourth order is similar to the second order. Details are not described herein.

It may be understood that, in the foregoing third orders, the TCI state identifiers may be consecutive or nonconsecutive. This depends on a TCI state identifier of an actually activated TCI state.

The third order C, D, or F may be specifically an order of a column vector obtained by left-multiplying a column vector including the K2 second TCI states by a transformation matrix, or an order of a row vector obtained by right-multiplying a row vector including the K2 first TCI states by a transformation matrix. For example, the third order C is used as an example. A formula 2 and a formula 3 provide examples of transformed vectors. It may be understood that a specific transformation formula is not limited in the embodiments of this application. It may be understood that transformation manners of other orders are similar, and details are not described herein. It may be understood that mapping may be completed first, and then transformation is performed. The order is not limited in the present invention.

$$\begin{bmatrix} 1 & 0 & 0 \\ 0 & 0 & 1 \\ 0 & 1 & 0 \end{bmatrix} \cdot \begin{bmatrix} (TCI\ 64, TCI\ 120) \\ (TCI\ 65, TCI\ 121) \\ (TCI\ 66, TCI\ 122) \end{bmatrix} = \begin{bmatrix} (TCI\ 64, TCI\ 120) \\ (TCI\ 66, TCI\ 122) \\ (TCI\ 65, TCI\ 121) \end{bmatrix} \quad \text{(Formula 2)}$$

$$\begin{bmatrix} 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{bmatrix} \cdot \begin{bmatrix} (TCI\ 64, TCI\ 120) \\ (TCI\ 65, TCI\ 121) \\ (TCI\ 66, TCI\ 122) \\ 0 \\ 0 \\ 0 \\ 0 \\ 0 \end{bmatrix} = \begin{bmatrix} 0 \\ 0 \\ 0 \\ 0 \\ 0 \\ (TCI\ 66, TCI\ 122) \\ (TCI\ 65, TCI\ 121) \\ (TCI\ 64, TCI\ 120) \end{bmatrix} \quad \text{(Formula 3)}$$

It may be understood that if the mapping manner 1 is used, and the second TCI state includes two TCI states, in the foregoing first orders, the TCI state identifier may be replaced with a first TCI state included in each second TCI state, or the TCI state identifier may be replaced with a second TCI state included in each second TCI state. For example, if the K1 activated second TCI states are respectively (0, 64), (10, 80), (11, 81), (15, 85), and (16, 87), these TCI states may be sorted by 0, 10, 11, 15, or 16, or sorted by 64, 80, 81, 85, 87. This is not limited in the present invention.

Table 8 below shows a schematic diagram of mapping between an activated TCI state and a codepoint when one second TCI state includes two TCI states, and one Ti field in the MAC CE corresponds to one TCI state (that is, the method 1 for mapping the TCI states to the M Ti fields is used). It is assumed that P=8, L1=8, L2=8, and corresponding codepoint values are respectively 0 to 7. When the MAC CE implementation method A is used, and the fourth order is the ascending order of the codepoint values, based on the example 4-2-1A and Table 5, examples in which the K2 second TCI states are mapped to the L2 codepoints in the third orders A to C are shown in Table 9. Examples of other orders are similar, and details are not described again.

points, or pre-fixed or pre-configured K2 codepoints. This is not limited in the embodiments of this application. Alternatively, K2 may be equal to L2, that is, K2 codepoints are L2 codepoints.

It may be understood that, for a mapping relationship between the K1 first TCI states and the codepoints based on the MAC CE implementation method B or the MAC CE implementation method C, refer to the foregoing mapping relationship that is based on the MAC CE implementation method A. Similarly, for a mapping relationship between the K2 second TCI states and the codepoints, refer to the foregoing mapping relationship that is based on the MAC CE implementation method A. This is not limited in the present invention.

It may be understood that the first TCI state and the second TCI state are merely introduced for ease of description. Although the foregoing embodiments are described by using an example in which the first TCI state includes one TCI state and the second TCI state includes two TCI states, this is not limited in the present invention. For example, the first TCI state may alternatively include two or more TCI states, and the second TCI state may alternatively include one or more TCI states, or the like.

It may be understood that the first TCI state mapping rule may be consistent or inconsistent with the second TCI state mapping rule. For example, the first TCI state mapping rule includes the first order A and the second order A, and the second TCI state mapping rule includes the third order A and the fourth order A. Alternatively, the first TCI state mapping rule includes the first order A and the second order A, and the second TCI state mapping rule includes the third order B and the second order A. This is not limited in the present invention.

It may be understood that L1 and L2 may be less than P. To be specific, a quantity L1 of codepoints to which the K1 first TCI states can be mapped may be less than P, and a quantity L2 of codepoints to which the K2 second TCI states can be mapped may be less than P. For example, P=8 and L1=4. In this case, the K1 first TCI states can be mapped to only four codepoints, for example, first four codepoints with smallest values.

In an embodiment, the first TCI state mapping rule includes: The K1 first TCI states arranged in a first order are mapped to the L1 codepoints arranged in a second order. An $i^{th}$ first TCI state is mapped to an $\lceil i/w1 \rceil^{th}$ codepoint in the

TABLE 9

| Codepoint value | Third order A | Third order B | Third order C (formula 2) | Third order C (formula 3) |
|---|---|---|---|---|
| 000 | TCI 64, TCI 120 | TCI 66, TCI 122 | TCI 64, TCI 120 | |
| 001 | TCI 65, TCI 121 | TCI 65, TCI 121 | TCI 66, TCI 122 | |
| 010 | TCI 66, TCI 122 | TCI 64, TCI 120 | TCI 65, TCI 121 | |
| 011 | | | | |
| 100 | | | | |
| 101 | | | | TCI 66, TCI 122 |
| 110 | | | | TCI 65, TCI 121 |
| 111 | | | | TCI 64, TCI 120 |

It may be understood that, based on the example 4-2-2A, the example 4-3-1A, and the example 4-3-2A, a mapping relationship between the K2 second TCI states and the codepoint values is similar, and details are not described herein.

It may be understood that, in the foregoing implementation, the K2 codepoints may be first K2 codepoints in the L2 codepoints, or may be last K2 codepoints in the L2 code- L1 codepoints arranged in the second order. i is a positive integer, $\lceil\ \rceil$ represents rounding up, K1=w1×L1, and w1 is a positive integer. In other words, L1≤K1. (This is denoted as a first TCI state mapping rule B)

Based on the example 4-2-1A and Table 5, for example, w1=2, K1=8, and L1=4, and based on Table 4, eight TCI state identifiers arranged in the first order A are respectively the TCI 0, the TCI 2, the TCI 4, the TCI 6, the TCI 7, the TCI 8, the TCI 10, and the TCI 12. Four codepoints arranged in the second order A are respectively 000, 001, 010, and 011. Table 9 below shows a schematic diagram of mapping from a TCI state to a codepoint.

TABLE 10

| Codepoint value | TCI state mapped to the codepoint | TCI state mapped to the codepoint |
|---|---|---|
| 000 | TCI 0 | TCI 2 |
| 001 | TCI 4 | TCI 6 |
| 010 | TCI 7 | TCI 8 |
| 011 | TCI 10 | TCI 12 |
| 100 | | |
| 101 | | |
| 110 | | |
| 111 | | |

It can be learned from Table 10 that both the TCI 0 and the TCI 2 are mapped to a same code point value 000. Similarly, the TCI 4 and the TCI 6 are mapped to a same codepoint 001, the TCI 7 and the TCI 8 are mapped to a same codepoint 010, and the TCI 10 and the TCI 12 are mapped to a same codepoint 011.

In an embodiment, the second TCI state mapping rule includes: mapping the K2 second TCI states arranged in a third order to the L2 codepoints arranged in a fourth order. K2=w2×L2, and w2 is a positive integer. A $j^{th}$ second TCI state in the K2 second TCI states arranged in the third order is mapped to a $\lceil j/w2 \rceil^{th}$ codepoint in the L2 codepoints arranged in the fourth order, where j is a positive integer, and ⌈ ⌉ represents rounding up. (This denoted as a second TCI state mapping rule B). It may be understood that this implementation is similar to the foregoing implementation, and details are not described herein again.

It may be understood that w1 and w2 may be the same or different. w1 and w2 may be specified in a protocol, or may be notified by the network device to the terminal device. A specific notification manner is not limited in the embodiments of this application.

In an embodiment, the preset rule is that the A TCI states arranged in a fifth order are mapped to the P codepoints. The fifth order is similar to the first order or the third order, except that all the A TCI states are uniformly sorted in the fifth order. Details are not described herein. In this case, the preset rule includes: mapping an $i^{th}$ state in the A TCI states arranged in the fifth order to a codepoint value i % P or (i−1)% P, where % is a modulo operation, and i is an integer greater than or equal to 0.

Optionally, the network device may further send, to the terminal device, the indication information associated with the first indication information. When the indication information is a first value, the indication information is used to indicate the terminal device to sequentially map the A TCI states indicated by the first indication information to the P codepoints. Optionally, when A≤P, each codepoint is mapped to only one TCI state, and this rule is similar to that in the conventional technology. When the value is a second value, the A TCI states are mapped to the P codepoints according to the foregoing solution described in this application. Details are not described again. Specifically, the indication information may be a reserved bit in a MAC CE header corresponding to the first indication information, the first value may be that the reserved bit is 0, and the second value may be that the reserved bit is 1.

The following describes methods for determining the L1 codepoints by the terminal device.

Determining method 1: The L1 codepoints are specified in a protocol. For example, it is specified that codepoint values of the L1 codepoints are 000, 010, 011, and 100. This method can reduce signaling overheads.

Determining method 1A: It is specified in the protocol that the L1 codepoints are codepoints arranged in the second order. For example, it is assumed that P=8. It is specified in the protocol that L1=8, and the L1 codepoints are eight codepoints arranged in the second order; or L1=4, and the L1 codepoints are four codepoints arranged in the second order A; or L1=4, and the L1 codepoints are four codepoints arranged in the second order B, or the like.

Determining method 1B: It is specified in the protocol that a minimum value (or a start location) of the L1 codepoints is X based on the determining method 1, where 0≤X+L1≤P; or a maximum value of the L1 codepoints is X based on the determining method 1, where X≥L1. X is an integer. A value of X may be specified in the protocol, or may be notified by the network device to the terminal device. For example, the network device 101 sends fifth indication information to the terminal device. Alternatively, the value of X is reported by the terminal device to the network device.

Determining method 2: The network device sends third indication information to the terminal device, where the third indication information indicates the L1 codepoints.

Optionally, the third indication information may be carried on a MAC CE, and the MAC CE may be the first indication information.

Specifically, the third indication information may be a bitmap. The bitmap includes P bits, and each bit corresponds to 1 bit in the P codepoints. For example, P=8, a first bit (which may be a first bit from a most significant bit MSB or a first bit from a least significant bit LSB) corresponds to a codepoint value 000, a second bit corresponds to a codepoint 001, . . . , and an eighth bit corresponds to a codepoint value 111. Table 10 below shows an example.

TABLE 11

| | Third indication information (bitmap) | | | | | | | |
|---|---|---|---|---|---|---|---|---|
| Codepoint value | 0 | 1 | 1 | 0 | 0 | 1 | 0 | 1 |
| 000 | | | | | | | | |
| 001 | | 001 | | | | | | |
| 010 | | | 010 | | | | | |
| 011 | | | | | | | | |
| 100 | | | | | | 100 | | |
| 101 | | | | | | | | |
| 110 | | | | | | | | |
| 111 | | | | | | | | 111 |

It can be learned from Table 11 that when a value of the third indication information is 01100101, corresponding L1 codepoint values are separately 001, 010, 100, and 111.

It may be understood that the third indication information may alternatively be in another form. For example, in the third indication information, L1 codepoint values are directly notified, or a start location (for example, X) and a quantity L1 of L1 codepoint values are notified. Alternatively, L1 codepoint values may be indicated in a comb (comb) manner. For example, the L1 codepoints are codepoints whose values are odd numbers. This is not limited in the present invention.

In a manner of using the third indication information, flexibility of the L1 codepoints may be improved. For example, at different moments, L1 may be flexibly changed, and a used codepoint value may also be flexibly changed.

Determining method 3: The terminal device determines a quantity of the L1 codepoints based on a quantity A of the activated TCI states indicated by the first indication information and a pre-configured parameter z1. Specifically, L1=A/z1, and z1 is a positive integer. When A is not exactly divisible by z1, L1 may be rounded up or rounded down. For example, z1=2.

The following describes methods for determining the L2 codepoints by the terminal device.

Determining method 1: The L2 codepoints are specified in a protocol. For example, it is specified that codepoint values of the L2 codepoints are 000, 010, 011, and 100. This method can reduce signaling overheads.

Determining method 1A: It is specified in the protocol that the L2 codepoints are codepoints arranged in the fourth order. For example, it is assumed that P=8. It is specified in the protocol that L1=8, and the L2 codepoints are eight codepoints arranged in the fourth order; or L1=4, and the L2 codepoints are four codepoints arranged in the fourth order A; or L1=4, and the L2 codepoints are four codepoints arranged in the fourth order B, or the like.

Determining method 1B: It is specified in the protocol that a minimum value (or a start location) of the L2 codepoints is Y based on the determining method 1, where 0≤Y+L1≤P; or a maximum value of the L2 codepoints is Y based on the determining method 1, where Y≥L1. Y is an integer. A value of Y may be specified in the protocol, or may be notified by the network device to the terminal device. For example, the network device 101 sends sixth indication information to the terminal device. Alternatively, the value of Y is reported by the terminal device to the network device.

Determining method 2: The network device sends fourth indication information to the terminal device, where the fourth indication information indicates the L2 codepoints.

Optionally, the fourth indication information may be carried on a MAC CE, and the MAC CE may be the first indication information.

Optionally, the fourth indication information and the third indication information may be carried on one MAC CE, and the MAC CE signaling may be different from the MAC CE carrying the first indication information.

Specifically, the fourth indication information may be a bitmap. The bitmap includes P bits, and each bit corresponds to 1 bit in the P codepoints. For example, P=8, a first bit (which may be a first bit from a most significant bit MSB or a first bit from a least significant bit LSB) corresponds to a codepoint value 000, a second bit corresponds to a codepoint 001, . . . , and an eighth bit corresponds to a codepoint value 111. For a specific example, refer to Table 10. Details are not described herein.

It may be understood that the fourth indication information may alternatively be in another form. For example, in the fourth indication information, L2 codepoint values are directly notified, or a start location (for example, Y) and a quantity L2 of L2 codepoint values are notified. Alternatively, L2 codepoint values may be indicated in a comb (comb) manner. For example, the L2 codepoints are codepoints whose values are even numbers. This is not limited in the present invention.

In a manner of using the fourth indication information, flexibility of the L2 codepoints may be improved. For example, at different moments, L2 may be flexibly changed, and a used codepoint value may also be flexibly changed.

Determining method 3: The terminal device determines a quantity of the L2 codepoints based on a quantity A of the activated TCI states indicated by the first indication information and a pre-configured parameter z2. Specifically, L2=A/z2, and z2 is a positive integer. When A is not exactly divisible by z2, L2 may be rounded up. For example, z2=2.

It may be understood that the codepoint values of the L1 codepoints in the embodiments may be consecutive or nonconsecutive. Similarly, the codepoint values of the L2 codepoints may be consecutive or nonconsecutive. This is not limited in the embodiments of this application.

It may be understood that a method for determining L1 and a method for determining L2 may be the same or different. In other words, in the embodiments of this application, any method for determining the L1 codepoints may be combined with a method for determining the L2 codepoints. For example, the L1 codepoints are determined by using the determining method 1, and the L2 codepoints are determined by using the determining method 2. Even if a same method is used, values of parameters involved may be the same or different. For example, in the determining method 1B, X may be the same as Y, for example, X=Y=0; or X and Y may be different, for example, X>0, and Y=0. This is not limited in the embodiments of this application.

In an embodiment, the L1 codepoints are comb (Comb)-shaped, and/or the L2 codepoints are comb (Comb)-shaped. For example, the L1 codepoints are codepoints whose values are odd, and the L2 codepoints are codepoints whose values are even; or the like. A comb interval is not limited in the present invention.

Optionally, the L1 codepoints and the L2 codepoints may be exactly the same, or partially the same, or totally different. Alternatively, the L1 codepoints and the L2 codepoints form the P codepoints, that is, L1+L2≤P. This is not limited in the embodiments of this application.

It may be understood that the first TCI mapping rule

According to the foregoing preset rule (the first TCI state preset rule and/or the second TCI state mapping rule), Table X to Table X separately show mapping relationships between codepoint values and TCI states.

In a possible embodiment, the determining method 1B is used, where X=Y=0, and it is assumed that K1=P, and K2 is less than P. Alternatively, K1 is less than P, and K2=P. For example, TCI states that are indicated by the first indication information and whose values are 1 and an order thereof are as follows:

{TCI 1, TCI 2, TCI 4, TCI 5, TCI 6, TCI 15, TCI 16, TCI 19, TCI 64, TCI 66, TCI 68, TCI 71, TCI 72, TCI 73}, where the K1 first TCI states are {TCI 1, TCI 2, TCI 4, TCI 5, TCI 6, TCI 15, TCI 16, TCI 19}; the K2 first TCI states are {TCI 64, TCI 66, TCI 68, TCI 71, TCI 72, TCI 73}; the K1 first TCI states are arranged in the first order A; the K2 second TCI states are arranged in the third order A; the third order and the fourth order are the ascending orders of the codepoint values; and the following table shows a mapping relationship between the codepoint values and the TCI states.

TABLE 12

| Codepoint value | K1 first TCI states | K2 second TCI states |
| --- | --- | --- |
| 000 | TCI 1 | TCI 64 |
| 001 | TCI 2 | TCI 66 |
| 010 | TCI 4 | TCI 68 |
| 011 | TCI 5 | TCI 71 |
| 100 | TCI 6 | TCI 72 |
| 101 | TCI 15 | TCI 73 |
| 110 | TCI 16 | |
| 111 | TCI 19 | |

In another possible embodiment, the determining method 1B is used, X>0, and Y=0. It is assumed that K is less than P, and K2 is less than or equal to P. For example, X=2, and TCI states that are indicated by the first indication information and whose values are 1 and an order thereof are as follows:

{TCI 1, TCI 2, TCI 4, TCI 5, TCI 6, TCI 15, TCI 64, TCI 66, TCI 68, TCI 71, TCI 72, TCI 73}, where K1 TCI IDs are {TCI 1, TCI 2, TCI 4, TCI 5, TCI 6, TCI 15}; K2 TCI IDs are {TCI 64, TCI 66, TCI 68, TCI 71, TCI 72, TCI 73}; the K1 first TCI states are arranged in the first order A; the K2 second TCI states are arranged in the third order A; the third order and the fourth order are the ascending orders of the codepoint values; and the following table shows a mapping relationship between the codepoint values and the TCI states.

TABLE 13

| Codepoint value | K1 first TCI states | K2 second TCI states |
|---|---|---|
| 000 | — | TCI 64 |
| 001 | — | TCI 66 |
| 010 | TCI 1 | TCI 68 |
| 011 | TCI 2 | TCI 71 |
| 100 | TCI 4 | TCI 72 |
| 101 | TCI 5 | TCI 73 |
| 110 | TCI 6 | |
| 111 | TCI 15 | |

In another possible embodiment, the determining method 1B is used, X=0, and Y>0. It is assumed that K is less than or equal to P, and K2 is less than P. For example, Y=2, and TCI states that are indicated by the first indication information and whose values are 1 and an order thereof are as follows:

{TCI 1, TCI 2, TCI 4, TCI 5, TCI 6, TCI 15, TCI 16, TCI 19, TCI 64, TCI 66, TCI 68, TCI 71, TCI 72, TCI 73, TCI 126, TCI 127}, where K1 TCI IDs are {TCI 1, TCI 2, TCI 4, TCI 5, TCI 6, TCI 15, TCI 16, TCI 19}; K2 TCI IDs are {TCI 64, TCI 66, TCI 68, TCI 71, TCI 72, TCI 73}; the K1 first TCI states are arranged in the first order A; the K2 second TCI states are arranged in the third order A; the third order and the fourth order are the ascending orders of the codepoint values; and the following table shows a mapping relationship between the codepoint values and the TCI states.

TABLE 14

| Codepoint value | K1 first TCI states | K2 second TCI states |
|---|---|---|
| 000 | TCI 1 | |
| 001 | TCI 2 | |
| 010 | TCI 4 | TCI 64 |
| 011 | TCI 5 | TCI 66 |
| 100 | TCI 6 | TCI 68 |
| 101 | TCI 15 | TCI 71 |
| 110 | TCI 16 | TCI 72 |
| 111 | TCI 19 | TCI 73 |

In another possible embodiment, the bitmap manner in the determining method 2 is used for L1. The determining method 1B is used for L2, Y=0, and P=8.

TCI states that are indicated by the first indication information and whose values are 1 and an order thereof are as follows:

{TCI 1, TCI 2, TCI 4, TCI 5, TCI 6, TCI 15, TCI 64, TCI 66, TCI 68, TCI 71, TCI 72, TCI 73}, where K1 TCI IDs are {TCI 1, TCI 2, TCI 4, TCI 5, TCI 6, TCI 15}; K2 TCI IDs are {TCI 64, TCI 66, TCI 68, TCI 71, TCI 72, TCI 73}; a value indicated by a bitmap in the determining method 2 is 10101111; the K first TC states are arranged in the first order A; the K2 second TCI states are arranged in the third order A; the third order and the fourth order are the ascending orders of the codepoint values; and the following table shows a mapping relationship between the codepoint values and the TCI states.

TABLE 15

| Codepoint value | K1 first TCI states | K2 second TCI states |
|---|---|---|
| 000 | TCI 1 | TCI 64 |
| 001 | | TCI 66 |
| 010 | TCI 2 | TCI 68 |
| 011 | | TCI 71 |
| 100 | TCI 4 | TCI 72 |
| 101 | TCI 5 | TCI 73 |
| 110 | TCI 6 | |
| 111 | TCI 15 | |

In another possible embodiment, the comb manner in the determining method 2 is used for L1, and codepoints whose values are even numbers are used. The determining method 1B is used for L2, Y=0, and P=8.

TCI states that are indicated by the first indication information and whose values are 1 and an order thereof are as follows:

{TCI 1, TCI 2, TCI 4, TCI 5, TCI 6, TCI 15, TCI 64, TCI 66, TCI 68, TCI 71, TCI 72, TCI 73}, where the K1 first TCI states are {TCI 1, TCI 2, TCI 4, TCI 5}; the K2 second TCI states are {TCI 64, TCI 66, TCI 68, TCI 71, TCI 72, TCI 73}; the K1 first TCI states are arranged in the first order A; the K2 second TCI states are arranged in the third order A; the third order and the fourth order are the ascending orders of the codepoint values; and the following table shows a mapping relationship between the codepoint values and the TCI states.

TABLE 16

| Codepoint value | K1 first TCI states | K2 second TCI states |
|---|---|---|
| 000 | TCI 1 | TCI 64 |
| 001 | | TCI 66 |
| 010 | TCI 2 | TCI 68 |
| 011 | | TCI 71 |
| 100 | TCI 4 | TCI 72 |
| 101 | | TCI 73 |
| 110 | TCI 5 | |
| 111 | | |

In a possible embodiment, the determining method 1B is used, and X=Y=0. It is assumed that K1 is less than or equal to P, and K2 is less than or equal to P. Alternatively, K1 is less than or equal to P, and K2=P. For example, TCI states that are indicated by the first indication information and whose values are 1 and an order thereof are as follows:

{TCI 1, TCI 2, TCI 4, TCI 5, TCI 6, TCI 15, TCI 16, TCI 19, TCI 64, TCI 66, TCI 68, TCI 71, TCI 72, TCI 73}, where the K1 first TCI states are {TCI 1, TCI 2, TCI 4, TCI 5, TCI 6, TCI 15, TCI 16, TCI 19}; the K2 first TCI states are {TCI 64, TCI 66, TCI 68, TCI 71, TCI 72, TCI 73}; the K1 first TCI states are arranged in the first order A; the K2 second TCI states are arranged in the third order A; the third order is the ascending order of the codepoint values; the fourth order is the descending order of the codepoint values; and the following table shows a mapping relationship between the codepoint values and the TCI states.

TABLE 17

| Codepoint value | K1 first TCI states | K2 second TCI states |
|---|---|---|
| 000 | TCI 1 | |
| 001 | TCI 2 | |
| 010 | TCI 4 | TCI 73 |
| 011 | TCI 5 | TCI 72 |
| 100 | TCI 6 | TCI 71 |
| 101 | TCI 15 | TCI 68 |
| 110 | TCI 16 | TCI 66 |
| 111 | TCI 19 | TCI 64 |

In a possible embodiment, the first TCI mapping rule B is used, and w1=2. The determining method 1B is used, and X=Y=0. It is assumed that K1 is less than or equal to P, and K2 is less than or equal to P. Alternatively, K1 is less than or equal to P, and K2=P=8. For example, TCI states that are indicated by the first indication information and whose values are 1 and an order thereof are as follows: {TCI 1, TCI 2, TCI 4, TCI 5, TCI 6, TCI 15, TCI 64, TCI 66, TCI 68, TCI 71, TCI 72, TCI 73, TCI 126}. The codepoint values are in ascending order.

The following table shows a mapping relationship between the codepoint values and the TCI states.

TABLE 18

| Codepoint value | TCI state | |
|---|---|---|
| 000 | TCI 1 | TCI 2 |
| 001 | TCI 4 | TCI 5 |
| 010 | TCI 6 | TCI 15 |
| 011 | TCI 16 | TCI 19 |
| 100 | TCI 64 | TCI 66 |
| 101 | TCI 68 | TCI 71 |
| 110 | TCI 72 | TCI 73 |
| 111 | TCI 126 | |

It may be understood that, as shown in the table, when P≤A≤P×w, w=2, L1=P×w−A, and L2=A−P. Correspondingly, there are L1 codepoints corresponding to one TCI state, and there are L2 codepoints corresponding to w TCI states. For example, if A=12, L1=4, and L2=4.

In a possible embodiment, several implementations in which one MAC CE is used to indicate an activated TCI state are provided. The MAC CE may include one or more of the following:
a serving cell identity field, a bandwidth part identifier field, a TCI state identifier field, a reserved field, a C field, and an A field.

The serving cell identity field indicates an identifier of a serving cell to which the activated TCI state indicated by the MAC CE belongs. In other words, the serving cell ID field indicates an identifier of a serving cell to which the MAC CE belongs. The serving cell identity field may indicate the serving cell identity by using a status value. The serving cell identity field may also be referred to as a serving cell ID field.

For example, there may be a total of S (there may be a maximum of S) serving cells configured by the network device for a terminal device. In this case, the serving cell identity field is indicated by using ⌈log 2(S)⌉ bits.

For example, if S=32, an identifier of a serving cell for which the MAC CE applies may be indicated by using 5 bits (bit). For example, 00001 indicates a cell whose ID is 1, 00010 indicates a cell whose ID is 2, and so on.

The bandwidth part identifier field indicates a bandwidth part identifier for which the activated TCI state indicated by the MAC CE applies. In other words, the bandwidth part identifier field indicates an identifier of a bandwidth part for which the MAC CE applies. For example, the bandwidth part identifier field is a bandwidth part indicator (bandwidth part indicator) field in DCI. The bandwidth part identifier field may indicate the bandwidth part identifier by using a status value. The bandwidth part identifier field may also be referred to as a BWP ID field.

For example, there may be a total of B (there may be a maximum of B) bandwidth part identifiers configured by the network device for a cell of a terminal device. In this case, the bandwidth part identifier field is indicated by using ⌈log 2(B)⌉ bits.

For example, if B=4, an identifier of a bandwidth part for which the MAC CE applies may be indicated by using 2 bits (bit). For example, 00 indicates a cell whose BWP ID is 0, 01 indicates a cell whose ID is 1, . . . , and so on.

The TCI state identifier field is used to indicate an activated TCI state. Alternatively, the TCI state identifier field is used to indicate an activated/deactivated TCI state. The TCI state identifier field may indicate the activated TCI state by using a status value. Alternatively, the TCI state identifier field may indicate the activated/deactivated TCI state in a bitmap manner. The TCI state identifier field may also be referred to as a Ti field or a TCI state ID field or a TCI state field.

For example, there may be a total of T (there may be a maximum of T) TCI state identifiers configured by the network device for a cell of a terminal device, and one TCI state field is indicated by using ⌈log 2(T)⌉ bits. If the MAC CE indicates A activated TCI states, a total of A TCI state fields are required, and A×⌈log 2(T)⌉ bits indicate the A activated TCI states.

For example, if T=128, 7 bits (bit) may be used to indicate an identifier of the activated TCI state indicated by the MAC CE. For example, 0000000 indicates that a TCI state whose TCI state ID is 0 is activated, 0000001 indicates that a TCI state whose TCI state ID is 1 is activated, and so on. It should be understood that an identifier of the TCI state may also be understood as an index of the TCI state.

For another example, there may be a total of T (there may be a maximum of T) TCI state identifiers configured by the network device for a cell of a terminal device. In this case, one TCI state field is indicated by using T bits. If the MAC CE indicates A activated TCI states, a total of T TCI state fields are required, and T bits indicate the A activated TCI states. Each bit corresponds to an activated or deactivated state of one TCI state, and an $i^{th}$ bit corresponds to an $i^{th}$ TCI state in T TCI states. A bit value being 1 indicates that the $i^{th}$ TCI state is activated, and the bit value being 0 indicates that the $i^{th}$ TCI state is deactivated.

For example, if T=128, 128 bits (bit) may be used to indicate an identifier of the activated TCI state indicated by the MAC CE. For example, 0000000 indicates that a TCI state whose TCI state ID is 0 is activated, 0000001 indicates that a TCI state whose TCI state ID is 1 is activated, and so on. It should be understood that an identifier of the TCI state may also be understood as an index of the TCI state.

The C field is used to indicate a codepoint to which the activated TCI state is mapped. The C field may indicate, by using a status value, the codepoint to which the activated TCI state is mapped. Alternatively, the C field may indicate, in a bitmap manner, the codepoint to which the activated TCI state is mapped. The C field may also be referred to as a codepoint field.

When the C field indicates, by using a bitmap, the codepoint to which the activated TCI state is mapped, each bit in the bitmap may correspond to one $C_i$ field or one $C_{i,j}$ field. Optionally, for example, it is assumed that a value of the $C_i$ field being 1 indicates that a codepoint corresponding to the $C_i$ field is mapped to an activated TCI state; and it is assumed that the value of the $C_i$ field being 0 indicates that the codepoint corresponding to the $C_i$ field is not mapped to the activated TCI state. Optionally, it is assumed that a value of a $C_{i,1}$ field being 1 indicates that a codepoint corresponding to the $C_{i,1}$ field is mapped to an activated first TCI state; and it is assumed that the value of the $C_{i,1}$ field being 0 indicates that the codepoint corresponding to the $C_{i,1}$ field is not mapped to the activated first TCI state. It is assumed that a value of a $C_{i,1}$ field being 1 indicates that a codepoint corresponding to the $C_{i,1}$ field is mapped to an activated first TCI state; and it is assumed that the value of the $C_{i,1}$ field being 0 indicates that the codepoint corresponding to the $C_{i,1}$ field is not mapped to the activated first TCI state.

For example, there may be a maximum of P candidate states (which may also be understood that a maximum of P codepoints) configured by the network device for a TCI field in DCI of a terminal device. In this case, one C field indicates, by using $\lceil \log 2(P) \rceil$ bits, a codepoint to which an activated TCI state is mapped. If the MAC CE indicates L codepoints to which activated TCI states are mapped, a total of L C-state fields are required, and $L \times \lceil \log 2(P) \rceil$ bits indicate P codepoints to which activated TCI states are mapped. If the first TCI state and the second TCI state need to respectively indicate codepoints to which the first TCI state is mapped and codepoints to which the second TCI state is mapped, a total of L1+L2 C-state fields are required, and $(L1+L2) \times \lceil \log 2(P) \rceil$ bits indicate L1+L2 codepoints to which the activated TCI states are mapped. The first TCI state may be mapped to first L1 indicated codepoints, and the second TCI state may be mapped to last L2 indicated codepoints.

For example, if P=8, 3 bits (bit) may be used to indicate a codepoint to which the activated TCI state indicated by the MAC CE is mapped. For example, 000 indicates that the activated TCI state is mapped to a codepoint 000, 001 indicates that the activated TCI state is mapped to a codepoint 001, . . . , and so on. It should be understood that a codepoint that is indicated by a specific C field and to which a specific activated TCI indicated by the TCI state field is mapped may be determined by using the foregoing preset rule, and details are not described herein again.

For another example, there may be a maximum of P candidate states (which may also be understood that a maximum of P codepoints) configured by the network device for a TCI field in DCI of a terminal device. In this case, one C field indicates, by using P bits, L codepoints to which activated TCI states are mapped. The MAC CE indicates L codepoints to which activate TCI states are mapped. If the first TCI state and the second TCI state need to respectively indicate codepoints to which the first TCI state is mapped and codepoints to which the second TCI state is mapped, a total of L1+L2 C-state fields are required, and 2×P bits indicate L1+L2 codepoints to which the activated TCI states are mapped. First 8 bits may be used to indicate a codepoint to which the first TCI state is mapped, and last 8 bits may be used to indicate a codepoint to which the second TCI state is mapped. The first TCI state may be mapped to first L1 indicated codepoints, and the second TCI state may be mapped to last L2 indicated codepoints.

For example, if P=8, 16 bits (bit) may be used to indicate L1 codepoints to which an activated first TCI state indicated by the MAC CE is mapped and L2 codepoints to which an activated second TCI state indicated by the MAC CE is mapped. For example, 00010001 00011111 indicates that K1 (for example, 5) activated first TCI states are mapped to codepoints 000, 001, 010, 011, and 100 according to the preset rule and that K2 (for example, 2) activated second TCI states are mapped to codepoints 000 and 100 according to the preset rule. It should be understood that a codepoint that is indicated by a specific C field and to which a specific activated TCI indicated by the TCI state field is mapped may be determined by using the foregoing preset rule, and details are not described herein again.

It should be understood that, by using a cell as an example, a relationship between a serving cell ID field, a TCI state field, and a C field may be: The serving cell ID field indicates an ID of a serving cell for which the MAC CE applies, the TCI field indicates an activated TCI state, and the C field indicates an identifier or index of a codepoint to which the activated TCI state indicated by the TCI field is mapped. The codepoint is a candidate state value of a TCI field in DCI.

The A field occupies 6 bits or 1 byte and indicates a quantity of activated TCI states. The A field may indicate the quantity of activated TCI states by using a status value. The A field includes two fields: $A_1$ and $A_2$. $A_1$ indicates a quantity of activated first TCI states. For example, the $A_1$ field being "100" indicates that there are four activated first TCI states. The $A_1$ field being "101" indicates that there are five activated first TCI states. Certainly, meanings of values "100" and "101" are merely examples, and this application is not limited thereto. For example, the $A_2$ field being "011" indicates that there are three activated second TCI states. The $A_1$ field being "010" indicates that there are two activated first TCI states. Certainly, meanings of values "011" and "010" are merely examples, and this application is not limited thereto.

The A field is used to indicate a quantity of activated TCI states. The A field may indicate the quantity of activated TCI states by using a status value. The A field may include two fields: A1 and A2. $A_1$ indicates a quantity of activated first TCI states. For example, the $A_1$ field being "100" indicates that there are four activated first TCI states. The $A_1$ field being "101" indicates that there are five activated first TCI states. Certainly, meanings of values "100" and "101" are merely examples, and this application is not limited thereto. For example, the $A_2$ field being "011" indicates that there are three activated second TCI states. The $A_1$ field being "010" indicates that there are two activated first TCI states. Certainly, meanings of values "011" and "010" are merely examples, and this application is not limited thereto.

For example, it is assumed that the $A_1$ field indicates K1, indicating that there are K1 activated first TCI states, and the $A_2$ field indicates K2, indicating that there are K2 activated second TCI states.

Further, there may be a maximum of P candidate states (which may also be understood that a maximum of P codepoints) configured by the network device for a TCI field in DCI of a terminal device. In this case, one A field indicates, by using $\lceil \log 2(P) \rceil$ bits, a quantity of mapped activated TCI states. If both a quantity of activated first TCI states and a quantity of activated second TCI states need to be indicated, a total of $2 \times \lceil \log 2(P) \rceil$ bits are required to indicate quantities of the activated TCI states. It is assumed that the A field indicates that there are K1 activated first TCI states and K2 activated second TCI states. In this case, the activated first TCI states are mapped to first K1 codepoints in the P codepoints, and the activated second TCI states are mapped to first K2 codepoints in the P codepoints.

For example, if P=8, 6 bits (bit) may be used to indicate a quantity of activated first TCI states indicated by the MAC CE and a quantity of activated second TCI states indicated by the MAC CE. For example, 010110 indicates K1 (for example, 6) activated first TCI states and K2 (for example, 2) activated second TCI states. The K1 (for example, 6) activated first TCI states are mapped to codepoints 000, 001, 010, 011, 100, and 101 according to the preset rule. The K2 (for example, 2) activated second TCI states are mapped to codepoints 000 and 001 according to the preset rule. It should be understood that a codepoint that is indicated by a specific C field and to which a specific activated TCI indicated by the TCI state field is mapped may be determined by using the foregoing preset rule, and details are not described herein again.

It should be understood that, by using a cell as an example, a relationship between a serving cell ID field, a TCI state field, and a A field may be: The serving cell ID field indicates an ID of a serving cell for which the MAC CE applies; the TCI field indicates an activated TCI state; the A field indicates a quantity of bytes or bits included in the TCI field, or a quantity of activated first TCI states and a quantity of activated second TCI states.

The reserved field indicates a reserved bit, is generally set to "0", and is not used to indicate any information. Particularly, an R field in a first byte of the MAC CE may be set to 1, to indicate a format, a type, or a mapping rule of the MAC CE, or indicate whether some fields exist in the MAC CE.

It should be understood that the serving cell identity field, the bandwidth part identifier field, the TCI state identifier field (or the TCI state field), the reserved field, the C field, and the A field are merely names, and do not limit the protection scope of the embodiments of this application. The embodiments of this application do not exclude that another name is used to indicate a same meaning in a future protocol.

It should be understood that, in the embodiments of this application, the first indication information or the MAC CE may be information indicating an activated and/or deactivated TCI state of a PDSCH (for example, TCI States Activation/Deactivation for UE-specific PDSCH MAC CE).

The foregoing describes, by using examples, content that may be included in a MAC CE indicating a TCI state. It should be understood that the embodiments of this application are not limited thereto. In addition, the MAC CE may be the first indication information. The following provides description with reference to several specific examples in which the first indication information is a MAC-CE.

As shown in FIG. 4A to FIG. 4D, one octet (Oct, octet) represents a byte (byte) formed by 8 bits (bits), and different bytes are denoted as an Oct 1, an Oct 2, and the like for distinguishing. The Oct 1 may be referred to as a first byte for short, and the Oct 2 may be referred to as a second byte for short, or the like. It should be understood that the first byte, the second byte, and the like are merely names for distinguishing, and do not limit the protection scope of the embodiments of this application.

Example 1: FIG. 4A shows a possible MAC CE format of a MAC-CE that is used to indicate information about an activated TCI state.

It may be understood that for specific steps in this implementation, reference may be made to descriptions in the foregoing embodiments, and details are not described herein. In other words, a specific format of the first indication information is described in this example.

As shown in FIG. 4A, one Oct represents a byte including 8 bits. In FIG. 4A, K1+K2+3 Octs are included, and for distinguishing, are denoted as an Oct 1, an Oct 2, . . . , and an Oct K1+K2+3.

Specifically, the format includes at least the following fields.

A C field indicates one or more codepoints to which the activated TCI state is mapped. The C field may indicate, in a bitmap manner, the codepoints to which the activated TCI state is mapped. The C field includes two bitmaps. Any bit in the first bitmap indicates whether a first TCI state mapped to a codepoint corresponding to the bit exists, and is represented as $C_{i,1}$. Any bit in the second bitmap indicates whether a second TCI state mapped to a codepoint corresponding to the bit exists, and is represented as $C_{i,2}$.

It should be understood that a quantity of bits or bytes occupied by a TCI state field may be related to the C field. For example, a quantity of bits whose values are 1 in the C field is equal to the quantity of bytes included in the TCI state field.

In other words, a quantity of activated TCI states indicated by the TCI state field may be related to the C field. For example, the quantity of bits whose values are 1 in the C field is equal to the quantity of activated TCI states indicated by the TCI state field. For example, the $C_{i,1}$ field being "1" indicates that there is one first TCI state mapped to a codepoint i corresponding to the $C_{i,1}$ field. The $C_{i,1}$ field being "0" indicates that no first TCI state is mapped to the codepoint i corresponding to the $C_{i,1}$ field. Certainly, meanings of values "1" and "0" are merely examples, and this application is not limited thereto. $C_{i,2}$ corresponding to the second bitmap in the two bitmaps indicates a codepoint to which a second TCI state is mapped. For example, the $C_{i,2}$ field being "1" indicates that there is one second TCI state mapped to a codepoint i corresponding to the $C_{i,2}$ field. The $C_{i,2}$ field being "0" indicates that no second TCI state is mapped to the codepoint i corresponding to the $C_{i,2}$ field. Certainly, meanings of values "1" and "0" are merely examples, and this application is not limited thereto. When a codepoint i is mapped to both the first TCI state and the second TCI state, it indicates that the codepoint i may correspond to two TCI states.

In an embodiment, the C field occupies 16 bits, and i=0–7.

The TCI state field indicates an index of the activated TCI state. A quantity of bits that are included in the C field and whose values indicated by the first bitmap are 1 is equal to K1, and a quantity of bits that are included in the C field and whose values indicated by the second bitmap are 1 is equal to K2. In this case, the TCI state field indicates K1 activated first TCI states and K2 activated second TCI states. In other words, the TCI state field includes a first TCI state field and a second TCI state field. The first TCI state field indicates the K1 activated first TCI states, and the second TCI state field indicates the K2 activated second TCI states. In other words, the TCI state identifier field indicates K1+K2 activated TCI states.

In an embodiment, the TCI state field occupies (K1+K2)×7 bits or K1+K2 bytes. For example, the first TCI state field may include 7×K1 bits, and the second TCI state field may include 7×K2 bits. Alternatively, the TCI state field may include K1+K2 bytes.

In the TCI state field, the first TCI state field may be before the second TCI state field. According to an order of the activated TCI states indicated by the TCI state field, the TCI states indicated by the first TCI state field are first sequentially mapped to codepoints corresponding to bits, in the C field, whose values indicated by the first bitmap are 1, and then the TCI states indicated by the second TCI state field are sequentially mapped to codepoints corresponding to bits, in the C field, whose values indicated by the second bitmap are 1. For example, a TCI state $ID_{i,1}$ is mapped to an $(i+1)^{th}$ codepoint in the codepoints corresponding to the bits, in the C field, whose values indicated by the first bitmap are 1. A TCI state $ID_{i,2}$ is mapped to an $(i+1)^{th}$ codepoint in the codepoints corresponding to the bits, in the C field, whose values indicated by the second bitmap are 1.

In a method of using one bitmap to indicate whether each codepoint is mapped to one TCI state or two TCI states, a case in which a codepoint is not mapped to any TCI state is not included. In this case, a quantity of bits in the MAC CE is not fixed, and UE needs to learn, through blind detection, how much bit information is specifically included in the MAC CE. However, in the method in this example, by using two bitmaps (for example, the C field), the MAC CE may flexibly indicate a quantity of TCI states mapped to each codepoint. The codepoint may be mapped to no TCI state or only one TCI state or two TCI states.

Further, the MAC-CE may further include a serving cell identity field, a bandwidth part identifier field, and a reserved bit.

The serving cell identity field occupies 5 bits and indicates an ID of a serving cell for which the MAC CE applies.

The bandwidth part identifier field occupies 2 bits and indicates a bandwidth part identifier for which the MAC CE applies.

"R" indicates a reserved bit (Reserved bit), and is usually set to "0". Particularly, an R field in the Oct 1 may be 1.

Example 2: FIG. 4B shows a possible MAC CE format of a MAC-CE that is used to indicate information about an activated TCI state, and there are two C fields in the format.

As shown in FIG. 4B, one Oct represents a byte including 8 bits. In FIG. 4B, K1+K2+2 Octs are included, and for distinguishing, are denoted as an Oct 1, an Oct 2, . . . , and an Oct K1+K2+2.

Specifically, the format includes at least the following fields.

The A field indicates a quantity of activated TCI states. The A field may indicate the quantity of activated TCI states by using a status value. The A field may include two fields: $A_1$ and $A_2$. $A_1$ indicates a quantity of activated first TCI states, and $A_2$ indicates a quantity of activated first TCI states.

It should be understood that a quantity of bits or bytes occupied by a TCI state identifier field may be related to the A field. For example, the quantity of activated TCI states indicated by the A field is equal to the quantity of bytes included in the TCI state identifier field. In other words, a quantity of activated TCI states indicated by the TCI state identifier field may be related to the A field. For example, the quantity of activated TCI states indicated by the A field is equal to the quantity of activated TCI states indicated by the TCI state identifier field. A sum of the quantity of activated first TCI states and the quantity of activated second TCI states that is indicated by the A field is equal to the quantity of activated TCI states indicated by the TCI state identifier field.

For example, the $A_1$ field being "100" indicates that there are four activated first TCI states. The $A_1$ field being "101" indicates that there are five activated first TCI states. Certainly, meanings of values "100" and "101" are merely examples, and this application is not limited thereto. For another example, the $A_1$ field being "010" and the $A_2$ field being "011" indicate that there are two activated first TCI states and three activated second TCI states. Certainly, meanings of values "011" and "010" are merely examples, and this application is not limited thereto.

In an embodiment, the A field occupies 6 bits or 1 byte. If the A field may include two fields: $A_1$ and $A_2$, $A_1$ occupies 3 bits, and $A_2$ occupies 3 bits.

The TCI state identifier field indicates an identifier (or index) of the activated TCI state. The TCI state field may include a first TCI state field and a second TCI state field. The $A_1$ field indicates that a quantity of activated first TCI states is equal to K1, and the $A_2$ field indicates that a quantity of activated second TCI states is equal to K2. In this case, the TCI state field indicates the K1 activated first TCI states and the K2 activated second TCI states. In other words, the TCI state field includes the first TCI state field and the second TCI state field. The first TCI state field indicates the K1 activated first TCI states, and the second TCI state field indicates the K2 activated second TCI states.

In an embodiment, the TCI state identifier field occupies (K1+K2)×7 bits or K1+K2 bytes. For example, the first TCI state identifier field may include 7×K1 bits, and correspondingly, the first TCI state identifier field may include 7×K2 bits. For another example, the corresponding TCI state identifier field includes K1+K2 bytes.

In the TCI state identifier field, the first TCI state field may be before the second TCI state field. According to an order of the activated TCI states indicated by the TCI state field, the K1 TCI states indicated by the first TCI state field are first sequentially mapped to first K1 codepoints in eight codepoints, and then the K2 TCI states indicated by the second TCI state field are sequentially mapped to first K2 codepoints in the eight codepoints. For example, a TCI state $ID_{i,1}$ is mapped to an $(i+1)^{th}$ codepoint in the first K1 codepoints. A TCI state $ID_{i,2}$ is mapped to an $(i+1)^{th}$ codepoint in the first K2 codepoints.

It should be understood that the K1 codepoints are first K1 consecutive codepoints in the eight codepoints, for example, codepoints 0, 1, . . . , and K1-1; and the K2 codepoints are first K2 consecutive codepoints in the eight codepoints, for example, codepoints 0, 1, . . . , and K2-1.

When a codepoint i is mapped to both the first TCI state and the second TCI state, it indicates that the codepoint i may correspond to two TCI states.

In the conventional technology, a quantity of bits in the MAC CE is not fixed because a quantity of TCI states to which each codepoint is mapped is different, and a terminal device needs to learn, through blind detection, how much bit information is specifically included in the MAC CE. In the method in this example, the quantity of activated TCI states is indicated to indicate a specific quantity of bits occupied by a subsequent TCI state identifier field, so that resource overheads can be effectively reduced, and a problem of high complexity of detection performed by the terminal device is resolved.

Further, the MAC-CE may further include a serving cell identity field, a bandwidth part identifier field, and a reserved bit.

The serving cell identity field occupies 5 bits and indicates an ID of a serving cell for which the MAC CE applies.

The bandwidth part identifier field occupies 2 bits and indicates a bandwidth part identifier for which the MAC CE applies.

"R" indicates a reserved bit (Reserved bit), and is usually set to "0". Particularly, an R field in the Oct 1 may be 1.

Example 3: FIG. 4C shows a possible MAC CE format of a MAC-CE that is used to indicate information about an activated TCI state, and there are two C fields in the format.

As shown in FIG. 4C, one Oct represents a byte including 8 bits. In FIG. 4C, N+K2+1 Octs are included, and for distinguishing, are denoted as an Oct 1, an Oct 2, . . . , and an Oct N+K2+1.

Specifically, the format includes at least one of the following content.

A C field indicates a codepoint to which an activated second TCI state is mapped. The C field may indicate, by using a bitmap (bitmap), the codepoint to which the activated second TCI state is mapped. Each bit in the bitmap may correspond to one $C_i$ field. The bitmap $C_i$ indicates a quantity of second TCIs to which a codepoint i is mapped. For example, the $C_i$ field being "1" indicates that there is one second TCI state mapped to the codepoint i corresponding to the $C_i$ field. The $C_i$ field being "0" indicates that no second TCI state is mapped to the codepoint i corresponding to the $C_i$ field. Certainly, meanings of values "1" and "0" are merely examples, and this application is not limited thereto.

In an embodiment, the C field occupies 8 bits, and i=0-7.

A TCI state identifier field indicates an identifier (or index) of the activated TCI state. The TCI state field includes a first TCI state field and a second TCI state field. The first TCI state field indicates K1 activated first TCI states, and the second TCI state field indicates K2 activated second TCI states.

The first TCI state field indicates an activated first TCI state by using a bitmap, and each bit in the bitmap corresponds to a Ti field. The Ti field is used to indicate activation/deactivation of a TCI state whose TCI state identifier is i. Further, the Ti field being "1" indicates that the TCI whose TCI state identifier is i is activated, and is mapped to a TCI field in DCI. The Ti field being "0" indicates that the TCI state whose TCI state identifier is i is deactivated, and is not mapped to the TCI field in the DCI. The second TCI state field indicates an activated second TCI state by using an identifier indicating the TCI state. A quantity of bits that are included in the C field and whose values are 1 is equal to K2.

In an embodiment, the second TCI state field occupies K2×7 bits or K2 bytes.

It should be understood that a quantity of bits or bytes occupied by the second TCI state field may be related to the C field. For example, a quantity of bits whose values are 1 in the C field is equal to the quantity of bytes included in the second TCI state field. In other words, a quantity of activated TCI states indicated by the second TCI state field may be related to the C field. For example, the quantity of bits whose values are 1 in the C field is equal to the quantity of activated TCI states indicated by the second TCI state field. For example, when there are K2 bits whose values are 1 in the C field, the corresponding second TCI state field may include 7×K2 bits. Alternatively, the corresponding second TCI state field may include K2 bytes, or the second TCI state field indicates identifiers of K2 TCI states.

It should be understood that a quantity of bits or bytes occupied by the TCI state field may be related to the C field. For example, the quantity of bits whose values are 1 in the C field is equal to the quantity of bytes included in the TCI state field.

In the TCI state field, the first TCI state field may be before the second TCI state field. According to an order of activated TCI states indicated by the TCI state field, TCI states whose Ti field indication values are 1 may be first sequentially mapped to L1 codepoints in the P codepoints, and then the TCI states indicated by the TCI state field are sequentially mapped to codepoints whose indication values are 1 in the C field.

An "R" field indicates a reserved bit (Reserved bit), and is usually set to "0". Particularly, an R field in the Oct 1 may be 1.

Optionally, a value of the R field in the Oct 1 being 0 indicates that the MAC CE has no C field or second TCI state field, and the value of the R field in the Oct 1 being 1 indicates that the MAC CE has a C field and a TCI state field. In this way, when the value of the R field in the Oct 1 is 0, the MAC CE is in a same format as a MAC CE indicating an activated TCI state of a PDSCH in Release 15, and may be used for TCI indication in single-TRP transmission. (In other words, each codepoint corresponds to a maximum of one TCI state). When the value of the R field in the Oct 1 is 1, the MAC CE is in a different format from a MAC CE indicating an activated TCI state of a PDSCH in Release 15, and may be used for TCI indication in multi-TRP transmission. (In other words, each codepoint may correspond to a maximum of two TCI states).

Further, the MAC-CE may further include a serving cell identity field and a bandwidth part identifier field.

The serving cell identity field occupies 5 bits and indicates an ID of a serving cell for which the MAC CE applies.

The bandwidth part identifier field occupies 2 bits and indicates a bandwidth part identifier for which the MAC CE applies.

According to this method, the MAC CE may be compatible with the MAC CE indicating the TCI state of the PDSCH in Release 15 (Release 15) (for example, the MAC CE may be the same as that in Table 1, where one codepoint is mapped to a maximum of one TCI state) and may support flexible TCI indication (indicating one codepoint to be mapped to a maximum of one TCI state, or indicating one codepoint to be mapped to a maximum of two TCI states).

It should be understood that the first TCI state and the second TCI state may be from a same TCI state set, or the first TCI state and the second TCI state may be from different TCI state sets. This is not limited in the embodiments of this application.

In another possible embodiment, two MAC CEs are used to indicate an activated TCI state. The first MAC CE indicates indexes of all activated TCI states, and the second MAC CE indicates a mapping relationship between an activated index and a codepoint.

The information included in the first MAC CE may be in the same format as the MAC CE indicating the TCI state of the PDSCH in Release 15. For example, the first MAC CE may be the same as that in Table 1. However, a Ti field is only used to indicate an activated TCI state. A direct relationship between the TCI state and a codepoint is not determined in a predefined manner, but is indicated by using the second MAC CE.

In addition, an R field in an Oct 1 of the first MAC CE may be used to indicate whether the second MAC CE exists. Optionally, when a value of the R field in the Oct 1 of the first MAC CE is 0, it indicates that the second MAC CE does not exist, and the mapping relationship between an activated TCI state and a codepoint is still determined according to the method in Release 15. When the value of the R field value in the Oct 1 is 1, it indicates that the second MAC CE exists, and a TCI state corresponding to each codepoint is determined based on the mapping relationship, between an activated TCI state and a codepoint, that is indicated by the second MAC CE. In this way, when the value of the R field in the Oct 1 is 0, the MAC CE is in the same format as the MAC CE indicating the activated TCI state of the PDSCH in Release 15, and may be used for TCI indication in single-TRP transmission. (In other words, each codepoint corresponds to a maximum of one TCI state). When the value of the R field in the Oct 1 is 1, two MAC CEs may indicate TCI states used for multi-TRP transmission, or each codepoint may correspond to a maximum of two TCI states.

Specifically, the second MAC CE includes at least the following fields.

A C field indicates one or more codepoints to which the activated TCI state is mapped. The C field may indicate, in a bitmap manner, the codepoints to which the activated TCI state is mapped. The C field includes two bitmaps. Any bit in the first bitmap indicates whether a first TCI state mapped to a codepoint corresponding to the bit exists, and is represented as $C_{i,1}$. Any bit in the second bitmap indicates whether a second TCI state mapped to a codepoint corresponding to the bit exists, and is represented as $C_{i,2}$.

It should be understood that a quantity of bits or bytes occupied by a TCI state field may be related to the C field. For example, a quantity of bits whose values are 1 in the C field is equal to a quantity of bytes included in the TCI state field. In other words, a quantity of activated TCI states indicated by the TCI state field may be related to the C field. For example, the quantity of bits whose values are 1 in the C field is equal to the quantity of activated TCI states indicated by the TCI state field.

For example, the $C_{i,1}$ field being "1" indicates that there is one first TCI state mapped to a codepoint i corresponding to the $C_{i,1}$ field. The $C_{i,1}$ field being "0" indicates that no first TCI state is mapped to the codepoint i corresponding to the $C_{i,1}$ field. Certainly, meanings of values "1" and "0" are merely examples, and this application is not limited thereto. $C_{i,2}$ corresponding to the second bitmap in the two bitmaps indicates a codepoint to which a second TCI state is mapped. For example, the $C_{i,2}$ field being "1" indicates that there is one second TCI state mapped to a codepoint i corresponding to the $C_{i,2}$ field. The $C_{i,2}$ field being "0" indicates that no second TCI state is mapped to the codepoint i corresponding to the $C_{i,2}$ field. Certainly, meanings of values "1" and "0" are merely examples, and this application is not limited thereto. When a codepoint i is mapped to both the first TCI state and the second TCI state, it indicates that the codepoint i may correspond to two TCI states.

In an embodiment, the C field occupies 16 bits, and i=0-7.

The TCI state identifier field indicates an index of an activated TCI state to which a codepoint is mapped. It should be understood that the index is a relative index, and may be one of the activated TCI states indicated by the first MAC CE. The TCI state identifier field may include a first TCI state field and a second TCI state field. The TCI state identifier field is used to indicate one of the activated TCI states indicated by the first MAC CE. The TCI state field may indicate the activated TCI state by using a status value.

It should be understood that the quantity of bits or bytes occupied by the TCI state field may be related to the C field. In other words, the quantity of activated TCI states indicated by the TCI state field may be related to the C field. For example, the quantity of bits whose values are 1 in the C field is equal to the quantity of activated TCI states indicated by the TCI state field. It should be understood that the quantity of bits or bytes occupied by the TCI state field may be related to the C field. For example, the quantity of bits whose values are 1 in the C field is divided by 2 and rounded up to an integer, and the integer is equal to the quantity of bytes in the TCI state field.

A quantity of bits that are included in the C field and whose values indicated by the first bitmap are 1 is equal to K1, and a quantity of bits that are included in the C field and whose values indicated by the second bitmap are 1 is equal to K2. In this case, the TCI state identifier field indicates K1 activated first TCI states and K2 activated second TCI states. In other words, the TCI state identifier field includes the first TCI state field and the second TCI state field. The first TCI state field indicates the K1 activated first TCI states, and the second TCI state field indicates the K2 activated second TCI states. In other words, the TCI state identifier field indicates K1+K2 activated TCI states.

In an embodiment, the TCI state identifier field occupies $(K1+K2) \times 3$ bits or $\lceil (K1+K2)/21 \rceil$ bytes. For example, the corresponding first TCI state field may include $3 \times K1$ bits, and the corresponding second TCI state field may include $3 \times K2$ bits. Alternatively, the corresponding TCI state identifier field may include $\lceil (K1+K2)/2 \rceil$ bytes.

In the TCI state identifier field, the first TCI state field may be before the second TCI state field. According to an order of the TCI states indicated by the TCI state field, the first K1 TCI states are sequentially mapped to codepoints corresponding to bits, in the C field, whose values indicated by the first bitmap are 1, and then the following K2 TCI states are sequentially mapped to codepoints, in the C field, whose values indicated by the second bitmap are 1. For example, a TCI state $ID_0$ is mapped to an $(i+1)^{th}$ codepoint in the codepoints corresponding to the bits, in the C field, whose values indicated by the first bitmap are 1; a TCI state $ID_1$ is mapped to a second codepoint in the codepoints corresponding to the bits, in the C field, whose values indicated by the first bitmap are 1; . . . ; and so on. After the TCI states are mapped to all the codepoints whose values are 1 in the first bitmap, the other K2 TCI states indicated by the TCI state field are sequentially mapped to the codepoints whose values are 1 in the second bitmap.

Further, the MAC-CE may further include a serving cell identity field, a bandwidth part identifier field, and a reserved field. The serving cell identity field, the bandwidth part identifier field, and the reserved field may be the same as the explanations in the foregoing embodiment (same as the explanations when one MAC CE is used to indicate the activated TCI state). Details are not described herein again.

For example, there may be A activated TCI states (or a maximum of A activated TCI states) indicated by the network device by using the first MAC CE. In this case, one TCI state field indicates, by using $\lceil \log 2(A) \rceil$ bits, that one of the A activated TCI states is mapped to a codepoint.

For example, if A=8, 3 bits (bit) may be used to indicate a relative index of the activated TCI state indicated by the MAC CE. For example, 000 indicates a first activated TCI state in the first MAC CE. 001 indicates a second activated TCI state in the first MAC CE, and so on.

FIG. 4D shows a possible format of the second MAC CE.

As shown in FIG. 4D, one Oct represents a byte including 8 bits. In FIG. 4D, M Octs are included, and for distinguishing, are denoted as an Oct 1, an Oct 2, . . . , and an Oct M. As shown in FIG. 4D, the MAC-CE may include a serving cell identity field, a bandwidth part identifier field, a C field, a TCI state field, and a reserved bit.

The serving cell identity field occupies 5 bits and indicates an ID of a serving cell for which the MAC CE applies.

The bandwidth part identifier field occupies 2 bits and indicates a bandwidth part identifier for which the MAC CE applies.

"R" indicates a reserved bit, and is usually set to "0".

It should be understood that, in the embodiments of this application, an "R" field in a first byte in a MAC CE indicating a TCI state may be used to indicate a mapping rule, or indicate whether some fields exist in the MAC CE, or indicate a format of the MAC CE.

For example, when the R field is 0, the MAC CE (which may be the same as the MAC CE indicating the TCI state in Release 15) indicates only a first TCI state; and when the R field is 1, the MAC CE indicates the first TCI state and a second TCI state. For another example, when the R field is 0, a field indicating second TCI state-related information does not exist in the MAC CE; and when the R field is 1, the field indicating the second TCI state-related information exists in the MAC CE. The field of the second TCI state-related information may include only a field indicating an activated second TCI state, or may include a field indicating an activated second TCI state and an indication field indicating a codepoint to which the activated second TCI state is mapped. According to the method in this example, the MAC CE may be compatible with the MAC CE indicating the TCI state of the PDSCH in Release 15 (Release 15) (for example, the MAC CE may be the same as that in Table 1, where one codepoint is mapped to a maximum of one TCI state) and may support flexible TCI indication (updating the mapping relationship between a TCI state and a codepoint by using the second MAC CE). In addition, alternatively, the method in this embodiment may separately update an indication of the activated TCI state and the mapping relationship between an activated TCI state and a codepoint, thereby effectively reducing overheads. For example, the indication of the activated TCI state may not need to be updated frequently, and the mapping relationship between an activated TCI state and a codepoint (which may also be understood that cooperation of different TRPs causes different TCI states to be mapped to one codepoint) may be updated in time as a UE location moves.

In step 402, the network device 101 determines a first codepoint value according to the foregoing preset rule and based on the at least one first TCI state and/or at least one second TCI state.

Based on the example 4-2-1A, the first order A in Table 8 is used as an example. When the network device 101 determines that a current TCI state is the TCI 2, namely, a TCI state whose TCI state identifier is 2 in the K1 first TCI states, the network device 101 determines that the first codepoint value is 001.

Based on the example 4-2-1A, the third order A in Table 9 is used as an example. When the network device 101 determines that current TCI states are the TCI 66 and the TCI 122, namely, a second TCI state including the TCI 65 and the TCI 121 in the K2 second TCI states, the network device 101 determines that the first codepoint value is 001.

Based on the example 4-2-1A, Table 10 is used as an example. When the network device 101 determines that current TCI states are the TCI 4 and the TCI 6, namely, first TCI states whose identifiers are the TCI 4 and the TCI 6 in the K1 first TCI states, the network device 101 determines that the first codepoint value is 001.

Based on the example 4-2-1A, Table 8 and Table 9 are used as examples. It is assumed that the network device 101 determines that the first TCI state is the TCI 2, and the second TCI state is a second TCI state including the TCI 65 and the TCI 121. In this case, the network device 101 determines that the first codepoint value is 001.

It may be understood that one or more of the preset rule, the first TCI state mapping rule, and the second TCI state mapping rule may be fixed in a protocol, or notified by the network device to the terminal device by using signaling information. Specifically, the signaling information may be physical layer signaling or higher layer signaling, and specific signaling is not limited in the embodiments of the present invention. The preset rule, the first TCI state mapping rule, and the second TCI state mapping rule may be the same, or partially the same, or totally different.

It may be understood that, in step 402, the network device may first obtain a mapping table according to the preset rule, and then obtain the first codepoint by looking up the table based on the at least one TCI state. Alternatively, the network device determines the first codepoint each time according to the preset rule and based on the at least one TCI state. This is not limited in this application.

In an embodiment, the third indication information and the fourth indication information may be same indication information or different indication information. This is not limited in this application.

The operation of the network device 101 in step 402 may be performed by the processor 201.

For operations related to the third indication information and/or the fourth indication information and/or the fifth indication information and/or the sixth indication information and/or the indication information associated with the first indication information in step 402, an operation of the network device 101 may be performed by the transceiver 202, or may be performed by the processor 201 through the transceiver 202; and an operation of the terminal device 111 in step 402 may be performed by the transceiver 301, or may be performed by the processor 304 through the transceiver 301.

Step 403: The network device 101 sends second indication information to the terminal device 111, where the second indication information is used to indicate the first codepoint. Correspondingly, the terminal device 111 receives the second indication information.

Specifically, the second indication information may be carried in physical layer control signaling such as DCI, or may be carried in control signaling of another layer. This is not limited in the embodiments of this application.

For example, the second indication information may be a TCI field included in the DCI. The field includes N bits, and may indicate a maximum of $2^N$ codepoints, where corresponding codepoint values are 0 to ($2^N-1$). In the embodiments of this application, unless otherwise specified, a quantity P of codepoints$\leq 2^N$.

In an optional implementation, it is assumed that a QCL corresponding to a TCI ID of a same type includes one reference signal in step 400, and when A$\leq 2^N$ (or P), one codepoint may correspond to one TCI state (or one TCI ID). In this case, this method may be applied to a single-network device/beam/link/transport layer/TRP scenario.

In an optional implementation, it is assumed that a QCL corresponding to a TCI ID of a same type includes one reference signal in step 400, and when A<$2^N$ (or P), at least one codepoint may correspond to two or more TCI states (or two or more TCI IDs). In this case, this method may be applied to a multi-network device/beam/link/transport layer/TRP scenario.

In an optional implementation, it is assumed that a QCL corresponding to a TCI ID of a same type includes two reference signals in step 400, and when A$\leq 2^N$ (or P), one codepoint may correspond to one TCI state (or one TCI ID). In this case, this method may also be applied to a multi-network device/beam/link/transport layer/TRP scenario.

In a possible embodiment, the network device 101 may send indication information associated with the second indication information. The indication information may be used to indicate a TCI state set used for communication between the terminal device and the network device, that is, which network device/beam/link/transport layer/TRP communicates with the terminal device. Optionally, the indication information associated with the second indication information may be a format of the DCI, CRC scrambling information of the DCI, information (for example, an index number) of search space in which the DCI is located, information (for example, an index number) of a control channel set in which the DCI is located, antenna port information carried in the DCI, transport block TB information or codeword information carried in the DCI, or other information in the DCI. For example, the indication information may be the antenna port information. When the antenna port information is a first value, at least one TCI state in a first TCI state set may be used for communication; when the antenna port information is a second value, at least one TCI state in a second state set may be used for communication; and the like. For operations related to the second indication information in step 403, an operation of the network device 101 may be performed by the transceiver 202, or may be performed by the processor 201 by using the transceiver 202, and an operation of the terminal device 111 in step 403 may be performed by the transceiver 301, or may be performed by the processor 304 through the transceiver 301.

Step 404: The terminal device 111 determines, according to the preset rule and based on the first codepoint value, the at least one TCI state corresponding to the first codepoint value.

It may be understood that, for the operation of the terminal device 111 in step 404, reference may be made to the operation of the network device 101 in step 402. A difference only lies in that the network device first determines the at least one TCI state, and then determines the first codepoint value, but in step 404, the terminal device 111 performs a reverse process, that is, determines the at least one TCI state based on the value of the received first codepoint.

Table 7 is used as an example. Mapping is performed based on the first order A and the second order A. If the codepoint value of the first codepoint received by the terminal device 111 is 001, it is determined that the at least one TCI state is the TCI 2 (referring to the third row and the second column in Table 7). In other words, the first TCI state is the TCI 2.

Table 8 is used as an example. Mapping is performed based on the third order A and the second order A. If the codepoint value of the first codepoint received by the terminal device 111 is 001, it is determined that the at least one TCI state is the TCI 65 and the TCI 121 (referring to the third row and the second column in Table 8). In other words, the second TCI state is a TCI state including the TCI 65 and the TCI 121.

Table 7 and Table 8 are used as an example. It is assumed that the terminal device 111 determines that the first codepoint value is 001. In this case, it is determined that the first TCI state is the TCI 2, and the second TCI state is a second TCI state including the TCI 65 and the TCI 121.

The operation of the terminal device 111 in step 404 may be performed by the processor 304.

Step 405: The terminal device 111 communicates with the network device 101 based on the determined at least one TCI state.

Specifically, the network device 101 sends downlink information to the terminal device 111 based on the determined at least one TCI state, where the downlink information includes downlink signaling information and downlink data information. For example, the downlink information is sent on a PDCCH, or the downlink information is sent on a PDSCH. Alternatively, the network device 101 receives uplink information from the terminal device 111 based on the determined at least one TCI state, where the uplink information includes uplink signaling information and uplink data information. For example, the information is received on a PUSCH or the information is received on a PUCCH. This is not limited in the embodiments of this application.

Correspondingly, the terminal device 111 sends information to the network device 101 based on the determined at least one TCI state, where the information includes signaling information and data information. For example, the information is sent on the PUCCH, or the downlink information is sent on the PUSCH. Alternatively, the terminal device 111 receives information from the network device 101 based on the determined at least one TCI state, where the information includes signaling information and data information. For example, the information is received on the PDSCH or the information is received on the PDCCH. This is not limited in the embodiments of this application.

The operation of the network device 101 in step 405 may be performed by the transceiver 202, or may be performed by the processor 201 through the transceiver 202. The operation of the terminal device 111 in step 405 may be performed by the transceiver 301, or may be performed by the processor 304 through the transceiver 301.

In the embodiments of this application, QCL information of a physical channel, namely, information about the currently used TCI state, may be indicated in a multi-beam or multi-TRP transmission scenario, to implement effective communication in the scenario.

In a possible embodiment, the TCI state may alternatively be replaced with spatial correlation information (Spatial Relation Information). Correspondingly, the TCI field in the second indication information may be replaced with an SRI field or another field used to indicate the spatial relation information. In this embodiment, uplink data transmission, for example, PUSCH transmission, may be implemented. The present invention can resolve, in a scenario in which one piece of data is scheduled by one piece of DCI (namely, the second indication information in step 403), and data scheduled by different DCI comes from different network devices/a plurality of beams/a plurality of links/a plurality of transmission layers/a plurality of TRPs, or a scenario in which a TRP by which the data is sent is dynamically determined, a problem of how to indicate a TCI ID by using MAC-CE signaling (namely, the first indication information in step 401) and how to map the TCI ID to a codepoint in a TCI field in DCI. When no MAC-CE bit is added, single-network device/multi-beam/multi-link/transport layer/TRP transmission and multi-network device/multi-beam/multi-link/transport layer/TRP transmission are supported, to reduce indication overheads.

The embodiments of this application may further resolve problems of how the MAC-CE updates the TCI state sets, how to update each TCI state set, and which TCI state set to be updated.

In this embodiment, it may be understood that a TCI ID X may also be represented as a TCI state ID or a TCI X, and is used to indicate the TCI state.

In addition, this application further provides a communication failure recovery method and apparatus, to avoid a problem that when subcarrier spacings of carriers on which first indication information and communication failure response information are located are different, time for a terminal device to detect communication failure response information is not aligned with time for a network device to send the communication failure response information, resulting that the terminal device cannot detect a link failure recovery response.

In the embodiments of this application, a communication failure may also be referred to as a communications link failure, a communications link fault, a link fault, a link failure, a communication fault, a beam failure, or the like. The communication failure means that signal quality of a reference signal used for PDCCH beam failure detection is less than or equal to a preset threshold. In the embodiments of this application, these concepts have a same meaning. After a communications link is faulty, the terminal device needs to select, from a candidate reference signal resource set, a reference signal resource whose channel quality information (such as RSRP, RSRQ and a CQI) is greater than the preset threshold, to recover the communications link.

Optionally, the preset threshold may be configured by the network device. Herein, a beam failure detection RS is used by the terminal device to detect channel quality of a transmit beam of the network device, and the transmit beam is a beam used when the network device communicates with the terminal device.

A candidate beam identification RS is a reference signal set used by the terminal device to initiate link reconfiguration after the terminal device determines that a communications link fault occurs on the transmit beam of the network device.

In the embodiments of this application, the communication failure may also be referred to as a communication fault, a link failure, a link fault, a beam failure, a beam fault, a communications link failure, a communications link fault, or the like.

In the embodiments of this application, communication failure recovery may also be referred to as recovery of communication between the network device and the terminal device, communication fault recovery, link failure recovery, link fault recovery, beam failure recovery, beam fault recovery, communications link failure recovery, communications link fault recovery, link reconfiguration, or the like.

In a an embodiment, two sets, namely, a reference signal resource set used for the beam failure detection and a reference signal resource set used to recover the link between the terminal device and the network device may alternatively have other names. This is not specifically limited in this application.

In the embodiments of this application, communication failure recovery request information may also be referred to as communication fault recovery request information, link failure recovery request information, link fault recovery request information, beam failure recovery request information, beam fault recovery request information, communications link failure recovery request information, communications link fault recovery request information, link reconfiguration request information, reconfiguration request information, or the like.

In the embodiments of this application, communication failure recovery response information may also be referred to as communication failure response information, beam failure recovery response information, beam failure response information, communications link fault recovery response information, communications link fault response information, communications link failure recovery response information, communications link failure response information, beam fault recovery response information, beam fault response information, link reconfiguration response information, link fault recovery response information, link fault response information, link failure recovery response information, link failure response information, communication fault recovery response information, communication fault response information, reconfiguration response information, or the like.

In the embodiments of this application, optionally, a communication failure recovery request may indicate that a signal is sent on a resource used to carry the communication failure recovery request. The communication failure recovery response information may indicate that downlink control information (downlink control information, DCI) whose cyclic redundancy check (cyclic redundancy check, CRC) is scrambled by using a cell radio network temporary identifier (cell radio network temporary identifier, C-RNTI) is received on a control resource set and/or a search space set used to send a communication failure recovery response. The communication failure recovery response information may alternatively be scrambled by using other information. This is not limited in the embodiments of this application.

It should be understood that in the embodiments of this application, the communication failure, the communication failure recovery, the communication failure recovery request information, and the communication failure recovery response information may alternatively have other names. This is not specifically limited in this application.

Figure 5:
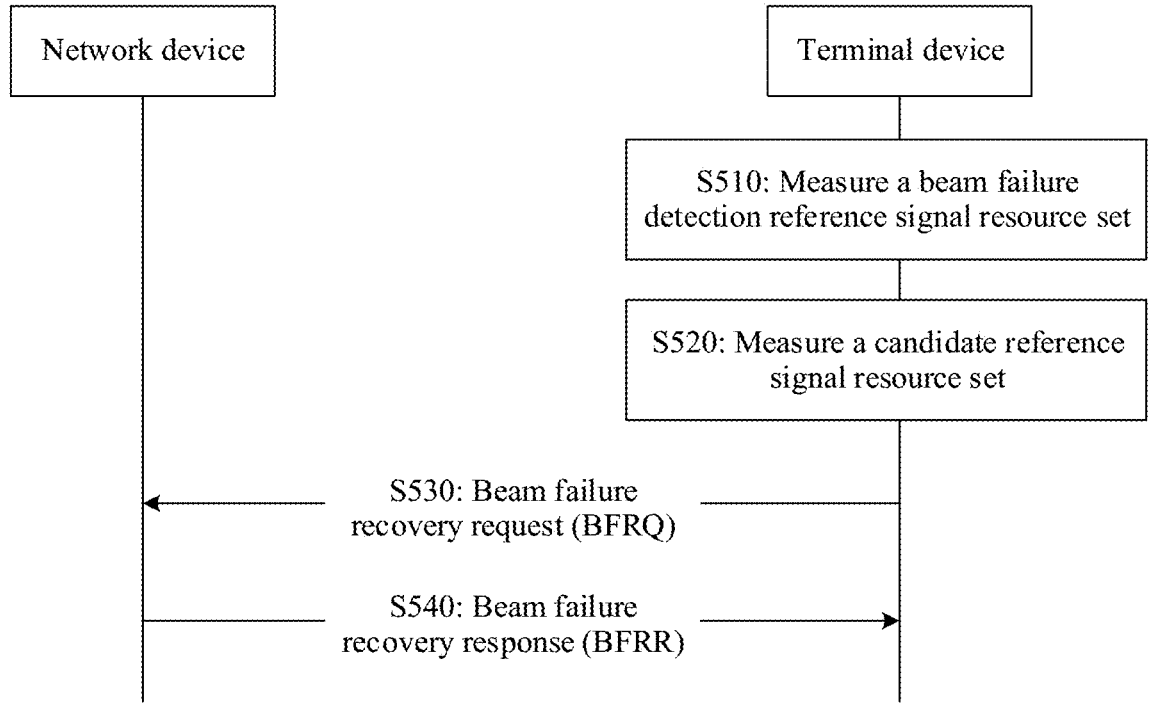
FIG. 5 is a schematic flowchart of a communication failure recovery procedure according to an embodiment of this application.

FIG. 5 is a schematic flowchart of a communication failure recovery procedure according to an embodiment of this application. As shown in FIG. 5, the communication failure recovery procedure includes the following steps.

S510: A terminal device measures a beam failure detection reference signal resource set (beam failure detection RS set), to determine that a link between the terminal device and a network device is faulty.

For example, when the terminal device determines that channel quality information of a beam failure detection RS or channel quality information of all or some reference signals in the beam failure detection RS set is less than or equal to a second preset threshold for N consecutive times, the terminal device may determine that a fault occurs on the link between the terminal device and the network device.

It should be understood that, in this embodiment of this application, a manner in which the terminal device determines that the link between the terminal device and the network device is faulty is not limited to the foregoing example, and may alternatively be determined in another determining manner. This is not limited in this application.

S520: The terminal device determines, based on channel quality information of a candidate reference signal set (candidate beam identification RS), a reference signal (namely, a new identified beam) whose channel quality is greater than or equal to a first preset threshold, where the determining process herein may be determining the reference signal by measuring the channel quality information of the candidate reference signal set.

It should be understood that S520 is an optional step, and may be implemented in another manner.

S530: The terminal device sends a beam failure recovery request (BFRQ) to the network device, where the beam failure recovery request information is associated with the reference signal (namely, the new identified beam) that is identified in S320 and whose channel quality is greater than or equal to the preset threshold, and the terminal device may explicitly or implicitly notify the network device of the new identified beam or a reference signal resource and/or a cell identity of a first cell. Optionally, the beam failure recovery request may be sent by using one or more resources. For example, a base station is first notified by using one resource (which may be a periodic resource or a semi-periodic resource) that a beam failure event occurs. Then, information about the new identified reference signal and/or the cell identifier of the first cell are notified by using another resource (which may be an aperiodic resource or a semi-periodic resource).

It should be understood that, in this embodiment of this application, the terminal device may send the BFRQ to the network device, to recover, by using the network device, the fault of the link between the terminal device and the network device. Alternatively, the terminal device may send the BFRQ to another network device, and recover, by using the another network device, the fault of the link between the terminal device and the network device.

Optionally, a media access control (MAC) layer of the terminal device maintains a beam failure recovery timer and a beam failure recovery counter. The beam failure recovery timer is used to control an entire beam failure recovery time. The beam failure recovery counter is used to limit a quantity of times that the terminal device sends the beam failure recovery request. When the beam failure recovery counter reaches a maximum value, the terminal device considers that beam failure recovery fails, and stops a beam failure recovery process. A recovery time of the recovery timer and a count value of the recovery counter may be configured by the network device, or may be preset values.

S540: The network device sends a beam failure recovery response (BFRR) to the terminal device, and the terminal device detects a control resource set (CORESET) and a search space set, and receives the BFRR.

It should be understood that, optionally, the CORESET and/or the search space set are a dedicated CORESET and a dedicated search space set configured by the network device for the terminal device, and are used by the network device to send a downlink control resource of beam failure response information after the terminal device sends a beam failure request.

It should be further understood that in this embodiment of this application, S310 and S320 in the beam failure recovery procedure are not subject to a time order. S510 may be performed before S520, S520 may be performed before S510, or S510 and S520 may be performed simultaneously.

The uplink resource may be a physical uplink control channel (PUCCH) resource, and/or a physical random access channel (PRACH) resource, and/or a physical uplink shared channel (PUSCH) resource.

Because a beam failure is an emergency, overheads of allocating a dedicated periodic uplink resource by the network device are relatively large. In the solution of this embodiment of this application, the beam failure recovery request is sent by multiplexing or puncturing a PUCCH or a physical uplink shared channel (PUSCH) that is used for channel state information (CSI) reporting, so that resource overheads can be effectively reduced.

The terminal device sends or completes sending beam failure request information in a $p^{th}$ time unit, and detects beam failure recovery response information in a $q^{th}$ time unit. However, because subcarrier spacings (or numerologies) of an uplink carrier and a downlink carrier in the cell are different, the terminal device does not know which subcarrier spacing (or numerology) is for the $p^{th}$ time unit, and does not know which subcarrier spacing (or numerology) is for the $q^{th}$ time unit. In an existing system, absolute times of time units in different subcarrier spacings are different. In view of this, the following describes a communication failure recovery method.

A communication failure recovery method 600 according to an embodiment of this application may be applied to a multi-carrier aggregation scenario. A primary cell may assist a secondary cell in performing communication failure recovery. The primary cell and the secondary cell need to exchange information. In an ideal backhaul scenario, an interaction delay is relatively short, but the interaction delay may not be fixed. In a non-ideal backhaul scenario, an interaction delay is relatively long, and it is difficult to predict a time for receiving, in the secondary cell, response information of a communication failure request sent in the primary cell. A terminal device does not know when to receive communication failure response information sent by the second network device. If a start time of receiving the communication failure response information by the terminal device is very early, power consumption of the terminal device may be very high, or the terminal device cannot receive the communication failure response information and initiate a communication failure recovery request again within a limited time (time window). Consequently, the link cannot be quickly recovered or even the link cannot be recovered. The method 600 in this embodiment of this application is mainly used to resolve a problem that the terminal device cannot successfully receive the communication failure recovery response information.

Figure 6:
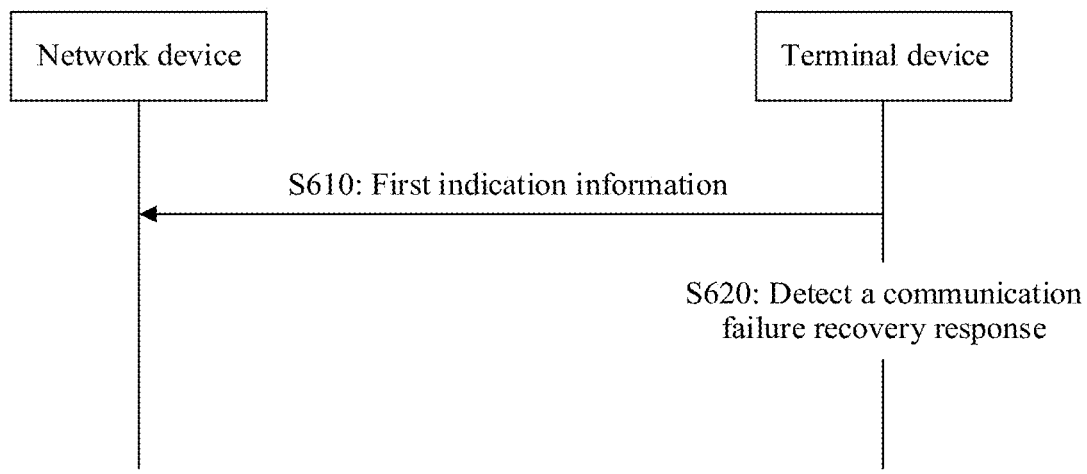
FIG. 6 is a schematic flowchart of a communication failure recovery method according to an embodiment of this application.
Figure 7:
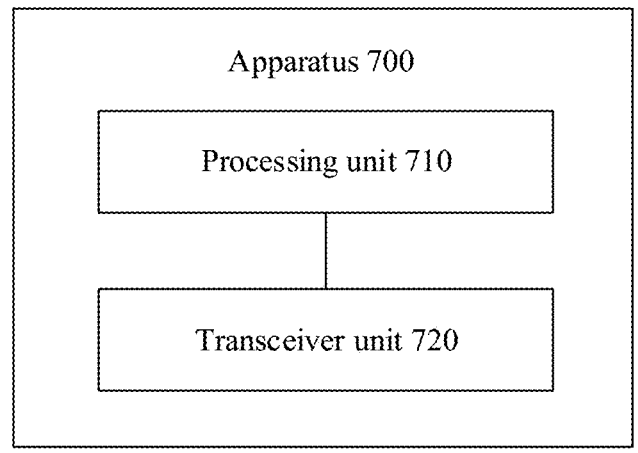
FIG. 7 is a schematic block diagram of a communication failure recovery apparatus according to an embodiment of this application.

FIG. 6 is a schematic flowchart of the communication failure recovery method 600 in this embodiment of this application. As shown in FIG. 6, the method 600 includes the following steps.

S610: The terminal device sends first indication information to the network device on a first uplink resource, and the network device receives, on the first uplink resource, the first indication information sent by the terminal device, where the first indication information is used to indicate a communication failure on a first downlink resource.

The first uplink resource belongs to a first cell, and the first downlink resource and/or a second downlink resource belong to a second cell. The first cell and the second cell are different cells or a same cell.

Optionally, the terminal device sends the first indication information to a first network device on the first uplink resource, and the communication failure indicates that communication between the terminal device and a second network device in the second cell fails.

Optionally, the first uplink resource may include one or more of a time domain resource, a frequency domain resource, a space resource, and a beam resource.

It should be understood that the first uplink resource belongs to the first cell, and the first cell may be a cell served by the first network device.

Optionally, the first indication information may be sent on one or more first uplink resources. For example, a $1^{st}$ first uplink resource is used to notify a link failure event, and a $2^{nd}$ first uplink resource is used to notify a cell identity of the second cell and/or newly identified reference signal information (where the reference signal information may be a reference signal index, and the information is used to restore a downlink of the second cell). For another example, a $1^{st}$ first uplink resource is used to notify a link failure event and a cell identity of the second cell, and a $2^{nd}$ first uplink resource is used to notify newly identified reference signal information (where the reference signal information may be a reference signal index, and the information is used to restore a downlink of the second cell).

Optionally, before the terminal device sends the first indication information to the first network device, the method further includes:

S601: The terminal device determines that communication on the first downlink resource fails.

Optionally, the terminal device determines that communication in the second cell and between the terminal device and the second network device fails, and the first downlink resource belongs to the second cell.

It should be understood that the first indication information may correspond to the BFRQ information in FIG. 5, and the BFRQ information is used to request to recover a failure of a link between the terminal device and the second network device.

Specifically, the BFRQ information may be used to recover a link in the second cell and between the terminal device and the second network device. It should be understood that the BFRQ may alternatively be other information used to recover the link in the second cell and between the terminal device and the second network device. The BFRQ may alternatively be indication information, and the information is used for link failure recovery.

Optionally, the first network device and the second network device are a same network device.

It should be understood that the communication failure on the first downlink resource may be understood as that channel quality of a reference signal used for beam failure detection of the second network device is less than or equal to a preset threshold, or meets another condition.

Specifically, the communication failure on the first downlink resource may be understood as that channel quality of a reference signal used for beam failure detection, in the second cell, of the second network device is less than or equal to the preset threshold, or meets another condition.

It should be further understood that the first downlink resource may be a downlink resource configured by the second network device for the terminal device or a downlink resource configured by the first network device for the terminal device.

Specifically, the first downlink resource may be a downlink resource, in the second cell, configured by the second network device for the terminal device, or a downlink resource, in the second cell, configured by the first network device for the terminal device.

Optionally, the first network device may be a primary network device of the terminal device, and the second network device may be one of a plurality of secondary network devices of the terminal device.

In an embodiment, the first network device may be a primary base station, and the second network device may be a secondary base station. Alternatively, the first network device may be a secondary base station, and the second network device may be a primary base station.

In this embodiment of this application, the first network device may be a base station of a primary cell/primary serving cell (Pcell), a base station of a primary secondary cell (PScell), a base station of a special cell (SPcell), a transmission reception point (TRP), or a base station of a secondary cell/secondary serving cell (Scell). The second network device may be a TRP or a base station of an Scell. Alternatively, the first network device may be a TRP or a base station of an Scell. The second network device may be a TRP, or a base station of a Pcell, a PScell, an SPcell, or an Scell.

In this embodiment of this application, the first cell may be a Pcell, a Pscell, an SPcell, or an Scell, and the second cell may be an Scell. Alternatively, the first cell may be an Scell, and the second cell may be a Pcell, a PScell, an SPcell, or an Scell.

Explanations about the Pcell, the PScell, the Scell, and the SPcell are as follows:

Pcell: The Pcell is a cell on which the terminal device camps in a CA scenario. Generally, only the Pcell has uplink resources, such as a PUCCH channel.

PScell: The PScell is a special secondary cell that is on a secondary network device and that is configured by a primary network device for the terminal device by using RRC connection signaling.

Scell: The Scell is a cell that is configured for the terminal device by using RRC connection signaling and that works on a secondary component carrier (SCC), and can provide more radio resources for the terminal device. In an SCell, there can be downlink transmission only or both downlink and uplink transmission.

SPcell: In a DC scenario, the SPcell is a Pcell in a master cell group (MSG) or a PScell in a secondary cell group (SCG). Alternatively, in a CA scenario, the SPcell is a Pcell.

It should be understood that the technical solution in this embodiment of this application may be applied to a case in which a primary cell (Pcell) is at a high frequency or a low frequency, and a secondary cell (Scell) is at a high frequency or a low frequency. For example, when the Pcell is at a low frequency and the Scell is at a high frequency, because no uplink resource is configured for the Scell, and the Pcell is at the low frequency cell and is not configured with a PRACH or PUCCH resource for link failure detection, PUCCH/PUSCH for CSI reporting resources of the Pcell may be used to assist the Scell in link recovery. Usually, a low frequency and a high frequency are relative to each other, or may be delimited by a specific frequency, for example, 6 GHz.

In an embodiment, the technical solution in this embodiment of this application may be applied to the following cases: In a carrier aggregation (carrier aggregation, CA) scenario, one cell assists another cell or a plurality of cells in link recovery; in a DC scenario, one cell in one cell group assists another cell or a plurality of cells in link recovery.

In this embodiment of this application, the "one cell" and the "another cell" may belong to a same cell group, or belong to different cell groups. For the different cell groups, a case in which one cell in a cell group 1 may assist another cell in a cell group 2 in link recovery in a DC scenario is mainly described.

Optionally, a cell in the MCG assists a cell in the SCG in link recovery.

Optionally, a cell in the SCG assists a cell in the MCG in link recovery.

It should be further understood that the "cell" may be understood as a "serving cell" or a "carrier" in this application.

Optionally, the cell includes at least one of a downlink carrier, an uplink (uplink, UL) carrier, and a supplementary uplink (supplementary uplink, SUL) carrier. Specifically, the cell may include a downlink carrier and an uplink carrier; or the cell may include a downlink carrier and a supplementary uplink carrier; or the cell includes a downlink carrier, an uplink carrier, and a supplementary uplink carrier.

Optionally, a carrier frequency of the supplementary uplink carrier is lower than that of the uplink carrier, so as to improve uplink coverage.

Optionally, generally, in an FDD system, a carrier frequency of an uplink carrier is different from that of a downlink carrier. In a TDD system, a carrier frequency of an uplink carrier is the same as that of a downlink carrier.

It should be further understood that, in this application, an uplink resource is on an uplink carrier, and the uplink resource includes the first uplink resource; and a downlink resource is on a downlink carrier, and the downlink resource includes the first downlink resource, the second downlink resource, and a third downlink resource.

It should be further understood that, in this application, the uplink carrier may be a normal uplink carrier or a supplementary uplink (supplementary uplink, SUL) carrier.

In an optional manner, in this embodiment of this application, if the first cell includes a plurality of uplink carriers, for example, a first uplink carrier in the first cell and a second uplink carrier in the first cell, the terminal device may send the first indication information on an uplink carrier with a smallest subcarrier spacing in the plurality of uplink subcarriers in the first cell. If a subcarrier spacing of the first uplink carrier in the first cell is less than a subcarrier spacing of the second uplink carrier in the first cell, the terminal device sends the first indication information and/or the second indication information on the first uplink carrier in the first cell. If the first cell includes a plurality of uplink carriers, for example, a first uplink carrier in the first cell and a second uplink carrier in the first cell, the terminal device may send the first indication information on an uplink carrier with a smallest subcarrier spacing in the plurality of uplink subcarriers in the first cell. If a subcarrier spacing of the first uplink carrier in the first cell is greater than a subcarrier spacing of the second uplink carrier in the first cell, the terminal device sends the first indication information on the second uplink carrier in the first cell. The first uplink resource may be a resource on the first uplink carrier in the first cell, or the first uplink resource may be a resource on the second uplink carrier in the first cell. The first uplink carrier in the first cell or a second uplink carrier in the second cell may be a carrier with a smallest subcarrier spacing. In this way, the terminal device may send the first indication information on the carrier with the smallest subcarrier spacing, so that a probability of successfully sending the first indication information can be improved, so as to improve a probability of successful link failure recovery. Further, the terminal device may determine, in a carrier set, a carrier with a smallest subcarrier spacing as an uplink carrier for sending the first indication information. The carrier set includes a plurality of carriers. In an embodiment, the carrier set may be a set including uplink carriers configured by the network device for the terminal device. In another possible implementation, the carrier set may be a set including uplink carriers configured by the network device for a primary cell and/or a secondary primary cell of the terminal device.

It should be noted that the uplink carrier may be replaced with an uplink channel and/or an uplink signal. Optionally, the uplink channel includes one or more of the following channels: a PUSCH, a PUCCH, and a PRACH. Optionally, the uplink signal includes one or more of the following signals: an SRS, a CSI-RS, and a DMRS.

In an embodiment, different spatial relation parameters are mainly used to describe a coordinated multipoint transmission (coordinated multipoint transmission/reception, CoMP) scenario in which one TRP assists another TRP in link recovery; or a single-station non-reciprocity scenario in which the uplink resource is available but the downlink resource is unavailable and an uplink is used to assist downlink recovery. In this embodiment of this application, a single-station scenario or a multi-station scenario may be reflected by using the spatial relation parameter. A spatial relation parameter of the downlink resource may correspond to TCI or QCL information (including one or more reference signals). A spatial relation parameter of the uplink resource may correspond to a spatial relation (including one or more reference signals). The spatial relation parameter is equivalent to a spatial filter (spatial domain transmission/receive filter). Optionally, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. The CoMP includes non-coherent joint transmission (NCJT), coherent joint transmission (CJT), joint transmission (JT), and the like.

In this embodiment of this application, different spatial relation parameters mean that a spatial transmit filter used by the terminal device to send information on the uplink resource is different from a spatial receive filter used by the terminal device to receive information on the downlink resource.

The technical solutions in the embodiments of this application may be applied to a case in which the first cell and the second cell belong to a same network device, or may be applied to a case in which the first cell and the second cell belong to different network devices.

Optionally, the first network device and the second network device are different network devices.

Specifically, the method 600 in this embodiment of this application may be applied to a dual-link transmission scenario or a coordinated multipoint transmission scenario. The terminal device may be connected to one primary network device and a plurality of secondary network devices. When a secondary network device in the plurality of secondary network devices fails to communicate with the terminal device, the terminal device may send the first indication information to the primary network device.

For example, after communication between the terminal device and a secondary network device fails in the second cell, the terminal device may send the first indication information by using an uplink resource, in the first cell, that belongs to the primary network device.

Optionally, the first network device and the second network device are a same network device.

Specifically, the method 600 in this embodiment of this application may further be applied to a carrier aggregation scenario. The first cell and the second cell may be different cells. For example, when communication between the terminal device and the first network device in the second cell fails, the terminal device may send the first indication information by using an uplink resource, in the first cell, that belongs to the first network device.

Specifically, the method 600 in this embodiment of this application may also be applied to a single-carrier scenario. The first cell and the second cell may be a same cell. When communication between the terminal device and a network device fails in the first cell, the terminal device may send the first indication information by using an uplink resource, in the first cell, that belongs to the network device.

Optionally, the first downlink resource and/or the second downlink resource are physical downlink control channel PDCCH resources.

Optionally, the PDCCH is scrambled by using a cell radio network temporary identifier (cell radio network temporary identifier, C-RNTI).

Optionally, the first uplink resource is a physical uplink control channel PUCCH resource or a physical uplink shared channel PUSCH resource.

It should be understood that the communication failure on the first downlink resource may also be understood as a failure or a fault of the link between the terminal device and the second network device.

It should be further understood that the communication failure on the first downlink resource may further be understood as a failure or a fault of the link in the second cell and between the terminal device and the second network device.

S620: The terminal device detects communication failure response information in a $q^{th}$ time unit, a time window starting from the $q^{th}$ time unit, or a time window starting from a $v^{th}$ time-frequency resource location that is after the $q^{th}$ time unit and that is used to send a downlink control channel.

v is a number greater than or equal to 0, and q is a number greater than or equal to 0. The first uplink resource belongs to the first cell, and the first downlink resource and/or the second downlink resource belong to the second cell. The first cell and the second cell are different cells or a same cell.

The $q^{th}$ time unit is determined based on a time unit in which the first indication information is sent or sending of the first indication information is completed, and/or a numerology of the first cell, and/or a numerology of the second cell.

The communication failure response information may be a response, carried on the second downlink resource, to the communication failure on the first downlink resource.

It should be understood that, in this embodiment of this application, that the terminal device detects communication failure response information may further be understood as that the terminal device receives the communication failure response information.

It should be further understood that, in this embodiment of this application, the first cell may be a Pcell, a Pscell, an SPcell, or an Scell, and the second cell may be an Scell. Alternatively, the first cell may be an Scell, and the second cell may be a Pcell, a PScell, an SPcell, or an Scell.

Optionally, the time-frequency resource location may be a time-frequency resource location, in the second cell, that is used to send a downlink control channel.

Optionally, the terminal device receives the communication failure response information sent by the second network device.

Optionally, when the first cell belongs to the first network device and the second cell belongs to the second network device, the terminal device receives the communication failure response information sent by the second network device in the second cell.

Optionally, the first network device and the second network device are a same network device, or the first network device and the second network device are different network devices.

Optionally, the first downlink resource, the second downlink resource, and the third downlink resource all belong to the second cell.

It should be understood that the first indication information may alternatively be link failure recovery request (BFRQ) information, and the BFRQ information is used to request to recover the failure of the link between the terminal device and the second network device.

It should be further understood that the communication failure response information may be link failure recovery response (BFRR) information, and the BFRR information is a response, sent by the second network device, to the BFRQ information.

It should be further understood that in the embodiments of this application, the time unit may be one or more radio frames, one or more subframes, one or more slots, one or more mini slots (mini slot), one or more orthogonal frequency division multiplexing (OFDM) symbols, or the like defined in an LTE system or a 5G NR system, or may be a time window including a plurality of frames or subframes, for example, a system information (SI) window.

Optionally, the terminal device receives the communication failure response information in the second cell.

Optionally, the terminal device receives the communication failure response information on a first time-frequency resource.

Optionally, a time unit in which the terminal device sends the first indication information is a $p^{th}$ time unit, or a time unit in which the terminal device completes sending of the first indication information is a $p^{th}$ time unit.

The $p^{th}$ time unit is determined based on the numerology of the first cell and/or the numerology of the second cell.

Optionally, the $p^{th}$ time unit may be determined based on a maximum value or a minimum value between the numerology of the first cell and the numerology of the second cell.

p is a number greater than or equal to 0.

In an embodiment, the numerology of the first cell is a numerology of an uplink carrier in the first cell, and/or the numerology of the second cell is a numerology of a downlink carrier in the second cell.

Optionally, further, the numerology of the uplink carrier in the first cell is one of a numerology of the first uplink resource, a numerology of a second uplink resource of the first cell, and a numerology of an uplink resource with a smallest numerology in all uplink resources of the first cell.

Optionally, the numerology of the downlink carrier in the second cell is one of a numerology of the first downlink resource, a numerology of the second downlink resource, a numerology of a third downlink resource of the second cell, and a numerology of a downlink resource with a smallest numerology in all downlink resources of the second cell.

Specifically, optionally, the $p^{th}$ time unit is a $p^{th}$ time unit determined based on the numerology of the uplink carrier in the first cell.

Alternatively, the $p^{th}$ time unit is a $p^{th}$ time unit determined based on the numerology of the first uplink resource.

Alternatively, the $p^{th}$ time unit is a $p^{th}$ time unit determined based on the numerology of the second uplink resource of the first cell.

Alternatively, the $p^{th}$ time unit is a $p^{th}$ time unit determined based on the numerology of the uplink resource with the smallest numerology in all the uplink resources of the first cell.

Alternatively, the $p^{th}$ time unit is a $p^{th}$ time unit determined based on the numerology of the downlink carrier in the second cell.

Alternatively, the $p^{th}$ time unit is a $p^{th}$ time unit determined based on the numerology of the first downlink resource. Alternatively, the $p^{th}$ time unit is a $p^{th}$ time unit determined based on the numerology of the second downlink resource.

Alternatively, the $p^{th}$ time unit is a $p^{th}$ time unit determined based on the numerology of the third uplink resource of the second cell.

Alternatively, the $p^{th}$ time unit is a $p^{th}$ time unit determined based on the numerology of the downlink resource with the smallest numerology in all the downlink resources of the second cell.

Optionally, the $q^{th}$ time unit is a $q^{th}$ time unit determined based on the numerology of the uplink carrier in the first cell and the numerology of the downlink carrier in the second cell.

Alternatively, the $q^{th}$ time unit is a $q^{th}$ time unit determined based on the numerology of the first uplink resource and the numerology of the first downlink resource.

Alternatively, the $q^{th}$ time unit is a $q^{th}$ time unit determined based on the numerology of the first uplink resource and the numerology of the second downlink resource.

Alternatively, the $q^{th}$ time unit is a $q^{th}$ time unit determined based on the numerology of the second uplink resource of the first cell and the numerology of the third downlink resource of the second cell.

Alternatively, the $q^{th}$ time unit is a $q^{th}$ time unit determined based on the numerology of the uplink carrier in the first cell, the numerology of the downlink carrier in the second cell, and p.

Alternatively, the $q^{th}$ time unit is a $q^{th}$ time unit determined based on the numerology of the first uplink resource, the numerology of the first downlink resource, and p.

Alternatively, the $q^{th}$ time unit is a $q^{th}$ time unit determined based on the numerology of the first uplink resource, the numerology of the second downlink resource, and p.

Alternatively, the $q^{th}$ time unit is a $q^{th}$ time unit determined based on the numerology of the second uplink resource of the first cell, the numerology of the third downlink resource of the second cell, and p.

Optionally, that the terminal device receives communication failure response information includes: The terminal device receives, on a specified downlink resource, the communication failure response information sent by the second network device.

Optionally, that the terminal device receives communication failure response information includes: The terminal device receives, on a specified downlink resource, the communication failure response information sent by the second network device in the second cell.

It should be understood that the first network device and the second network device may be a same network device, and both a network device serving the first cell and a network device serving the second cell are the first network device. Alternatively, the first network device and the second network device are different network devices, a network device serving the first cell is the first network device, and a network device serving the second cell is the second network device.

Optionally, the terminal device sends the first indication information to the first network device on the first uplink resource.

Optionally, the first downlink resource is a physical downlink control channel PDCCH resource.

Optionally, the second downlink resource is a physical downlink control channel PDCCH resource.

Optionally, the first uplink resource is a physical random access channel PRACH resource.

Optionally, the first uplink resource is a physical uplink control channel PUCCH resource or a physical uplink shared channel PUSCH resource.

Optionally, the numerology (numerology) includes a subcarrier spacing (subcarrier spacing, SCS) and/or a cyclic prefix (cyclic prefix, CP).

It should be understood that, in this embodiment of this application, optionally, a length of one time unit is jointly determined by the subcarrier spacing and the cyclic prefix.

Optionally, a subcarrier spacing of the first cell and/or a subcarrier spacing of the second cell may be 15 KHz, 30 KHz, 60 KHz, 120 KHz, or 240 KHz.

Optionally, the subcarrier spacing of the first cell is a subcarrier spacing of the uplink carrier or a subcarrier spacing of the downlink carrier.

Optionally, the subcarrier spacing of the second cell is a subcarrier spacing of the downlink carrier.

Optionally, the method 600 further includes the following step.

The terminal device determines the $q^{th}$ time unit based on one of the following formulas:

$$q = p + K \tag{1}$$

$$q = p + K \cdot \left\lceil \frac{2^{\mu 2}}{2^{\mu 1}} \right\rceil \tag{2}$$

$$q = p + K \cdot \left\lfloor \frac{2^{\mu 2}}{2^{\mu 1}} \right\rfloor \tag{3}$$

$$q = p + \left\lceil K \cdot \frac{2^{\mu 2}}{2^{\mu 1}} \right\rceil \tag{4}$$

$$q = p + \left\lfloor K \cdot \frac{2^{\mu 2}}{2^{\mu 1}} \right\rfloor \tag{5}$$

$$q = p + K \cdot \frac{2^{\mu 2}}{2^{\mu 1}} \tag{6}$$

$$q = \left\lceil p \cdot \frac{2^{\mu 2}}{2^{\mu 1}} \right\rceil + \left\lceil K \cdot \frac{2^{\mu 2}}{2^{\mu 1}} \right\rceil \tag{7}$$

$$q = \left\lfloor p \cdot \frac{2^{\mu 2}}{2^{\mu 1}} \right\rfloor + \left\lceil K \cdot \frac{2^{\mu 2}}{2^{\mu 1}} \right\rceil \tag{8}$$

$$q = \left\lfloor p \cdot \frac{2^{\mu 2}}{2^{\mu 1}} \right\rfloor + \left\lfloor K \cdot \frac{2^{\mu 2}}{2^{\mu 1}} \right\rfloor \tag{9}$$

$$q = \left\lfloor p \cdot \frac{2^{\mu 2}}{2^{\mu 1}} \right\rfloor + K \cdot \frac{2^{\mu 2}}{2^{\mu 1}} \tag{10}$$

$$q = \left\lceil (p + K) \cdot \frac{2^{\mu 2}}{2^{\mu 1}} \right\rceil \tag{11}$$

$$q = \left\lfloor (p + K) \cdot \frac{2^{\mu 2}}{2^{\mu 1}} \right\rfloor \tag{12}$$

Optionally, the terminal device determines K based on the subcarrier spacing of the first cell.

For example, if the subcarrier spacing of the first cell is 60 KHz, a length of K time units may be four downlink slots (slot) of the first cell.

For another example, if the subcarrier spacing of the first cell is 120 KHz, a length of K time units may alternatively be eight downlink slots (slot) of the first cell.

Optionally, the terminal device determines K based on the subcarrier spacing of the second cell.

For example, if the subcarrier spacing of the second cell is 60 KHz, a length of K time units may be four downlink slots (slot) of the second cell.

For another example, if the subcarrier spacing of the second cell is 120 KHz, a length of K time units may alternatively be eight downlink slots (slot) of the second cell.

Optionally, the terminal device determines K based on the subcarrier spacing of the first cell and the subcarrier spacing of the second cell.

Optionally, the terminal device determines K based on a minimum value between the subcarrier spacing of the first cell and the subcarrier spacing of the second cell. For example, if the subcarrier spacing of the first cell is 60 KHz, and the subcarrier spacing of the second cell is 120 KHz, K determined by the terminal device is a quantity of time units when the subcarrier spacing is 60 KHz. Optionally, the terminal device determines K based on a maximum value between the subcarrier spacing of the first cell and the subcarrier spacing of the second cell. For example, if the subcarrier spacing of the first cell is 60 KHz, and the subcarrier spacing of the second cell is 120 KHz, K determined by the terminal device is a quantity of time units when the subcarrier spacing is 120 KHz.

Optionally, the terminal device may determine K based on a minimum value between the subcarrier spacing of the uplink carrier of the first cell and the downlink subcarrier spacing of the second cell. For example, if the uplink subcarrier spacing of the first cell is 60 KHz, and the downlink subcarrier spacing of the second cell is 120 KHz, n determined by the terminal device is K time units when the subcarrier spacing is 60 KHz. Optionally, the terminal device may determine K based on a maximum value between the subcarrier spacing of the uplink carrier of the first cell and the downlink subcarrier spacing of the second cell. For example, if the uplink subcarrier spacing of the first cell is 60 KHz, and the downlink subcarrier spacing of the second cell is 120 KHz, K determined by the terminal device is K time units when the subcarrier spacing is 120 KHz.

Optionally, the terminal device may determine K based on a minimum value between the subcarrier spacing of the downlink carrier of the first cell and the downlink subcarrier spacing of the second cell. For example, if the downlink subcarrier spacing of the first cell is 60 KHz, and the downlink subcarrier spacing of the second cell is 120 KHz, K determined by the terminal device is K time units when the subcarrier spacing is 60 KHz. Optionally, the terminal device may determine n or m based on a maximum value between the subcarrier spacing of the downlink carrier of the first cell and the downlink subcarrier spacing of the second cell. For example, if the downlink subcarrier spacing of the first cell is 60 KHz, and the downlink subcarrier spacing of the second cell is 120 KHz, K determined by the terminal device is K time units when the subcarrier spacing is 120 KHz.

Optionally, the terminal device may determine K based on a minimum value between a subcarrier spacing of the first uplink resource and a subcarrier spacing of the first downlink resource or the second downlink resource. For example, if the subcarrier spacing of the first uplink resource is 60 KHz, and the subcarrier spacing of the first downlink resource or the second downlink resource is 120 KHz, K determined by the terminal device is K time units when the subcarrier spacing is 60 KHz. Optionally, the terminal device may determine K based on a maximum value between a subcarrier spacing of the first uplink resource and a subcarrier spacing of the first downlink resource or the second downlink resource. For example, if the subcarrier spacing of the first uplink resource is 60 KHz, and the subcarrier spacing of the first downlink resource or the second downlink resource is 120 KHz, K determined by the terminal device is K time units when the subcarrier spacing is 120 KHz. It should be noted herein that the first uplink resource may be a resource on the uplink carrier in the first cell, and the first downlink resource or the second downlink resource may be a resource on the downlink carrier in the second cell.

Optionally, the terminal device may determine K based on a minimum value between a subcarrier spacing of the first uplink resource and a subcarrier spacing of the first downlink resource or the second downlink resource. For example, if the subcarrier spacing of the first uplink resource is 60 KHz, and the subcarrier spacing of the first downlink resource or the second downlink resource is 120 KHz, K determined by the terminal device is K time units when the subcarrier spacing is 60 KHz. Optionally, the terminal device may determine K based on a maximum value between a subcarrier spacing of the first uplink resource and a subcarrier spacing of the first downlink resource or the second downlink resource. For example, if the subcarrier spacing of the first uplink resource is 60 KHz, and the subcarrier spacing of the first downlink resource or the second downlink resource is 120 KHz, K determined by the terminal device is K time units when the subcarrier spacing is 120 KHz. It should be noted herein that the first uplink resource may be a resource on the uplink carrier in the first cell, and the first downlink resource or the second downlink resource may be a resource on the downlink carrier in the second cell. It should be understood that n is a positive integer. Optionally, K is predefined, configured by a base station, or reported by a terminal capability.

It should be noted that in this embodiment of this application, the determined K may be a value having a correspondence with a subcarrier spacing.

In an embodiment, the terminal device determines K based on time of detecting a communication failure recovery response in the first cell and subcarrier spacing offsets of the first cell and the second cell. Alternatively, the terminal device determines K based on time of detecting a communication failure recovery response in the first cell, the subcarrier spacing of the first cell, and the subcarrier spacing of the second cell.

Optionally, the first network device sends communication failure response information in an $s^{th}$ time unit, a time window starting from the $s^{th}$ time unit, or a time window starting from a $z^{th}$ time-frequency resource location that is after the $s^{th}$ time unit and that is used to send a downlink control channel, where the communication failure response information is a response, carried on the second downlink resource, to the communication failure on the first downlink resource. The method is similar to that of the terminal device, and details are not described herein again.

Optionally, in this embodiment of this application, if the terminal device does not receive the communication failure response information within the time window, the terminal device resends the first indication information to the first network device, that is, re-initiates the communication failure recovery request. The communication failure recovery request may be re-initiated by using a beam different from a beam previously used to send the communication failure recovery request, or a same beam as the beam previously used to send the communication failure recovery request, and the terminal device may correspondingly increase transmit power.

Optionally, if the terminal device receives the first indication information in the time window, the terminal device further continues to detect (or receive) the first time-frequency resource or a PDCCH carried on the first time-frequency resource. Optionally, the terminal device detects or receives the PDCCH by using a beam of a reference signal whose channel quality is greater than or equal to a first threshold, or detects or receives the PDCCH by using a beam of a downlink reference signal associated with the first indication information. In other words, the terminal device detects or receives the PDCCH by using a spatial relation parameter of the reference signal whose channel quality is greater than or equal to the first threshold or the downlink reference signal associated with the first indication information.

According to the communication failure recovery method in this embodiment of this application, the network device sends, to the terminal device, information about a start moment of receiving the communication failure response information, to help the terminal device ensure that the terminal device detects the communication failure response information.

It should be further understood that, in this embodiment of this application, after receiving the first indication information sent by the terminal device, the first network device may send other information to the second network device in addition to sending information about the first reference signal to the second network device. For example, the first network device may forward the first indication information to the second network device.

Optionally, the first network device sends the DCI to the terminal device on a control resource set dedicated to sending the communication failure response information and/or a search space set dedicated to sending the communication failure response information. Alternatively, the first network device sends RRC and a MAC CE on a PDSCH resource scheduled by a PDCCH carried in a control resource set dedicated to sending the communication failure response information and/or a search space set dedicated to sending the communication failure response information. Optionally, the control resource set and/or the search space set and/or the PDSCH are resources/resource, in the second cell, that are/is configured for the first network device.

In this embodiment of this application, because the first network device knows subcarrier spacings/a subcarrier spacing of the primary cell and/or the secondary cell, or an interaction or processing delay within/between network devices, and/or terminal capability information (for example, a cell handover delay) reported by the terminal, the first network device may send the indication information to the terminal, to notify the terminal device of the start moment of receiving the communication failure response information.

In the link failure recovery method in this embodiment of this application, the indication information is sent to the terminal device, to help ensure that the terminal device more accurately and efficiently receives the link failure recovery response information, quickly recovers a link, and ensures system stability, and further help reduce power consumption of the terminal device.

Table 5: A quantity $N_{symb}^{slot}$ of OFDM symbols included in each slot of a normal cyclic prefix, a quantity $N_{slot}^{frame,\mu}$ of slots included in each frame, and a quantity $N_{slot}^{subframe,\mu}$ of slots included in each subframe

TABLE 5

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 6: A quantity $N_{symb}^{slot}$ of OFDM symbols included in each slot of an extended cyclic prefix, a quantity $N_{slot}^{frame,\mu}$ of slots included in each frame, and a quantity $N_{slot}^{subframe,\mu}$ of slots included in each subframe.

TABLE 6

| μ | $N_{symb}^{slot}$ | $N_{slot}^{frame,\mu}$ | $N_{slot}^{subframe,\mu}$ |
|---|---|---|---|
| 2 | 12 | 40 | 4 |

μ is a numerology identifier, and a value of μ is related to a subcarrier spacing, as shown in Table 7 below.

TABLE 7

| μ | Subcarrier spacing ($\Delta f = 2^\mu \cdot 15$ [kHz]) | Cyclic prefix (Cyclic prefix) |
|---|---|---|
| 0 | 15 | Normal (Normal) |
| 1 | 30 | Normal (Normal) |
| 2 | 60 | Normal (Normal) |
|   |    | Extended (Extended) |
| 3 | 120 | Normal (Normal) |
| 4 | 240 | Normal (Normal) |

Unit lengths of an uplink slot and a downlink slot may be different. The PDCCH is used as an example. Subcarrier spacings (Subcarrier spacing, SCS) used for uplink transmission and downlink transmission may be different. For example, a 15-kHz SCS is used for the uplink transmission, and a length of one uplink slot is 1 millisecond. A 120-kHz SCS is used for the downlink transmission, and a length of one downlink slot is 0.125 milliseconds. With reference to Table 3, it can be learned that the 15-kHz SCS is used for the uplink transmission, that is, Δf is 15 kHz, and a corresponding numerology μ is 0. The 120-kHz SCS is used for the downlink transmission, that is, Δf is 120 kHz, and a corresponding numerology μ is 3. Therefore, numerologies corresponding to the uplink transmission and the downlink transmission are different, and the unit lengths of the uplink slot and the downlink slot are also different. Consequently, the network device and the terminal have different understandings about a moment (the $p^{th}$ time unit) at which the link failure recovery request information is sent or sending of the link failure recovery request information is completed and a moment (the $q^{th}$ time unit) at which the link failure recovery response information is detected.

The following uses an example to describe the method 600.

In an embodiment, the $p^{th}$ time unit is a $p^{th}$ time unit, in time units that are determined based on the subcarrier spacing of the downlink carrier in the second cell, that corresponds to a moment at which sending of the first indication information is completed. In this case, q=p+k. To be specific, the $q^{th}$ time unit is a $(p+k)^{th}$ time unit in the time units determined based on the subcarrier spacing of the downlink carrier in the second cell. k may be 4.

In another possible implementation, the $p^{th}$ time unit is a time unit in which the first indication information is sent, and the time unit is a $p^{th}$ time unit in time units determined based on the subcarrier spacing of the uplink carrier in the first cell. In this case, q=p+k. To be specific, the $q^{th}$ time unit is a $(p+k)^{th}$ time unit in the time units determined based on the subcarrier spacing of the uplink carrier in the first cell. k may be 4.

In another possible implementation, the $p^{th}$ time unit is a time unit in which the first indication information is sent, and the time unit is a $p^{th}$ time unit in time units determined based on the subcarrier spacing of the uplink carrier in the first cell. In this case, the $q^{th}$ time unit is a $q^{th}$ time unit in time units determined based on the subcarrier spacing of the downlink carrier in the second cell. q may be determined by one of the following formulas:

$$q = \left\lceil p \cdot \frac{2^{\mu 2}}{2^{\mu 1}} \right\rceil + \left\lceil K \cdot \frac{2^{\mu 2}}{2^{\mu 1}} \right\rceil \quad (7)$$

$$q = \left\lfloor p \cdot \frac{2^{\mu 2}}{2^{\mu 1}} \right\rfloor + \left\lceil K \cdot \frac{2^{\mu 2}}{2^{\mu 1}} \right\rceil \quad (8)$$

$$q = \left\lfloor p \cdot \frac{2^{\mu 2}}{2^{\mu 1}} \right\rfloor + \left\lfloor K \cdot \frac{2^{\mu 2}}{2^{\mu 1}} \right\rfloor \quad (9)$$

$$q = \left\lfloor p \cdot \frac{2^{\mu 2}}{2^{\mu 1}} \right\rfloor + K \cdot \frac{2^{\mu 2}}{2^{\mu 1}} \quad (10)$$

$$q = \left\lceil (p+K) \cdot \frac{2^{\mu 2}}{2^{\mu 1}} \right\rceil \quad (11)$$

$$q = \left\lfloor (p+K) \cdot \frac{2^{\mu 2}}{2^{\mu 1}} \right\rfloor \quad (12)$$

k may be 4.

μ1 is the numerology of the uplink carrier in the first cell, and μ2 is the numerology of the downlink carrier in the second cell. Alternatively, μ1 is the numerology of the downlink carrier in the second cell, and μ2 is the numerology of the uplink carrier in the first cell.

In another possible implementation, the $p^{th}$ time unit is a time unit in which the first indication information is sent, and the time unit is a $p^{th}$ time unit in time units determined based on the subcarrier spacing of the uplink carrier in the first cell. In this case, the $q^{th}$ time unit is a $q^{th}$ time unit in the time units determined based on the subcarrier spacing of the uplink carrier in the first cell. q may be determined by one of the following formulas:

$$q = p + K \quad (1)$$

$$q = p + K \cdot \left\lfloor \frac{2^{\mu 2}}{2^{\mu 1}} \right\rfloor \quad (2)$$

$$q = p + K \cdot \left\lceil \frac{2^{\mu 2}}{2^{\mu 1}} \right\rceil \quad (3)$$

$$q = p + \left\lfloor K \cdot \frac{2^{\mu 2}}{2^{\mu 1}} \right\rfloor \quad (4)$$

$$q = p + \left\lceil K \cdot \frac{2^{\mu 2}}{2^{\mu 1}} \right\rceil \quad (5)$$

$$q = p + K \cdot \frac{2^{\mu 2}}{2^{\mu 1}} \quad (6)$$

k may be 4.

μ1 is the numerology of the uplink carrier in the first cell, and μ2 is the numerology of the downlink carrier in the second cell. Alternatively, μ1 is the numerology of the downlink carrier in the second cell, and μ2 is the numerology of the uplink carrier in the first cell.

A same method may be used to determine s and t on a network side, and details are not described herein again.

It should be understood that the foregoing is a method in which the terminal device determines time for detecting the communication failure response information, and p and q may be specifically determined in the foregoing manners. A method in which the network device determines time for sending the communication failure response information is similar to the method in which the terminal device determines the time for detecting the communication failure response information. Alternatively, the network device may determine, in the foregoing manner, time for receiving the first indication information and the time for sending the failure response information. Details are not described herein.

The foregoing describes in detail the communication failure recovery method provided in the embodiments of this application with reference to FIG. 5 to FIG. 6. The following describes in detail a communication failure recovery apparatus, a terminal device, and a network device provided in the embodiments of this application with reference to FIG. 9 to FIG. 11.

Figure 8:
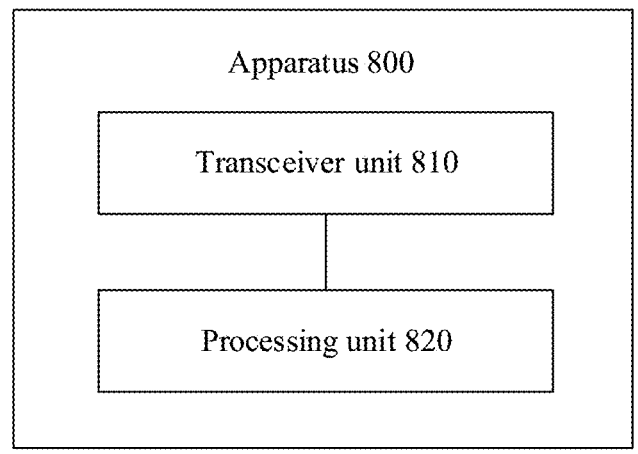
FIG. 8 is another schematic block diagram of a communication failure recovery apparatus according to an embodiment of this application.
Figure 9:
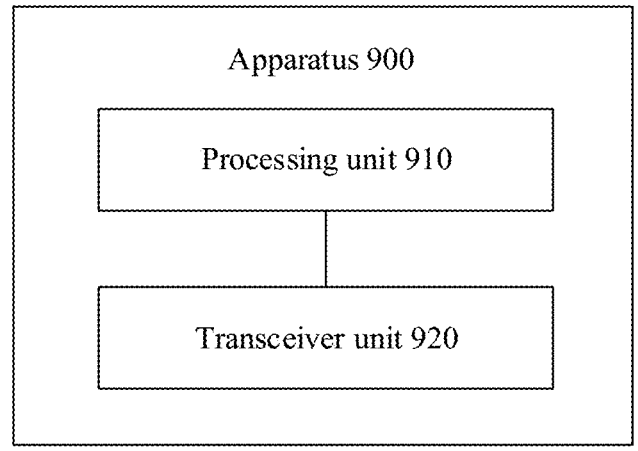
FIG. 9 is another schematic block diagram of a communication failure recovery apparatus according to an embodiment of this application.

FIG. 9 is a schematic block diagram of a communication failure recovery apparatus 900 according to an embodiment of this application. The apparatus 900 may correspond to the terminal device described in the method 600, or may correspond to a chip or a component of the terminal device. In addition, each module or unit in the apparatus 900 may be separately configured to perform an action or a processing process performed by the terminal device in the method 600. As shown in FIG. 8, the communication failure recovery apparatus 900 may include a processing unit 910 and a transceiver unit 920.

Specifically, the processing unit 910 is configured to determine a communication failure of the apparatus on a first downlink resource.

The transceiver unit 920 is configured to send first indication information to a network device on a first uplink resource, where the first indication information is used to indicate the communication failure of the apparatus on the first downlink resource.

The transceiver unit 920 is further configured to detect communication failure response information in a $q^{th}$ time unit, a time window starting from the $q^{th}$ time unit, or a time window starting from a $v^{th}$ time-frequency resource location that is after the $q^{th}$ time unit and that is used to send a downlink control channel, where the communication failure response information is a response, carried on a second downlink resource, to the communication failure on the first downlink resource.

v is a number greater than or equal to 0, and q is a number greater than or equal to 0. The first uplink resource belongs to a first cell, and the first downlink resource and/or the second downlink resource belong to a second cell. The first cell and the second cell are different cells or a same cell.

The $q^{th}$ time unit is determined based on a time unit in which the first indication information is sent or sending of the first indication information is completed, and/or a numerology of the first cell, and/or a numerology of the second cell. Optionally, the processing unit 810 is further configured to determine a $q^{th}$ time unit based on a time unit in which the first indication information is sent or sending of the first indication information is completed, and/or the numerology of the first cell, and/or the numerology of the second cell.

The time unit in which the first indication information is sent or sending of the first indication information is completed is the $p^{th}$ time unit.

It should be understood that for a specific process of performing the foregoing corresponding steps by the units in the apparatus 900, refer to the foregoing descriptions of the method embodiment with reference to FIG. 6. For brevity, details are not described herein again.

Figure 10:
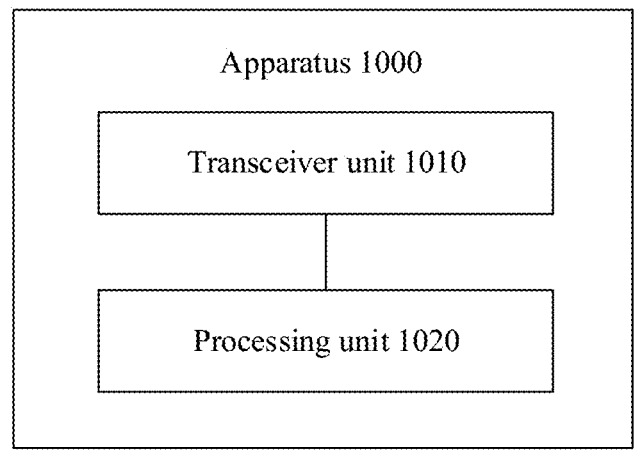
FIG. 10 is another schematic block diagram of a communication failure recovery apparatus according to an embodiment of this application.

FIG. 10 is a schematic block diagram of a communication failure recovery apparatus 1000 according to an embodiment of this application. The apparatus 1000 may correspond to the network device described in the method 600, or may correspond to a chip or a component of the network device. In addition, each module or unit in the apparatus 1000 may be separately configured to perform an action or a processing process performed by the network device in the method 600. As shown in FIG. 9, the communication failure recovery apparatus 1000 may include a transceiver unit 1010 and a processing unit 1020.

Specifically, the transceiver unit 1010 is configured to receive, on a first uplink resource, first indication information sent by a terminal device, where the first indication information is used to indicate a communication failure of the terminal device on a first downlink resource.

The processing unit 1020 is configured to determine the communication failure of the terminal device on the first downlink resource.

The transceiver unit 1010 is further configured to: receive the first indication information on the first uplink resource, where the first indication information is used to indicate the communication failure on the first downlink resource; and
 send communication failure response information in an $s^{th}$ time unit, a time window starting from the $s^{th}$ time unit, or a time window starting from a $z^{th}$ time-frequency resource location that is after the $s^{th}$ time unit and that is used to send a downlink control channel, where the communication failure response information is a response, carried on a second downlink resource, to the communication failure on the first downlink resource.

z is a number greater than or equal to 0, and s is a number greater than or equal to 0. The first uplink resource belongs to a first cell, and the first downlink resource and/or the second downlink resource belong to a second cell. The first cell and the second cell are different cells or a same cell.

The $s^{th}$ time unit is determined based on a time unit in which the first indication information is received or receiving of the first indication information is completed, and/or a numerology of the first cell, and/or a numerology of the second cell. Optionally, the processing unit 1020 is further configured to determine the $s^{th}$ time unit based on the time unit in which the first indication information is received or receiving of the first indication information is completed, and/or the numerology of the first cell, and/or the numerology of the second cell.

Optionally, the processing unit 920 is specifically configured to determine the $s^{th}$ time unit according to the following formulas:

$$s = t + L \tag{13}$$

$$s = t + L \cdot \left\lfloor \frac{2^{\mu 2}}{2^{\mu 1}} \right\rfloor \tag{14}$$

$$s = t + L \cdot \left\lceil \frac{2^{\mu 2}}{2^{\mu 1}} \right\rceil \tag{15}$$

$$s = t + \left\lfloor L \cdot \frac{2^{\mu 2}}{2^{\mu 1}} \right\rfloor \tag{16}$$

$$s = t + \left\lceil L \cdot \frac{2^{\mu 2}}{2^{\mu 1}} \right\rceil \tag{17}$$

$$s = t + L \cdot \frac{2^{\mu 2}}{2^{\mu 1}} \tag{18}$$

$$s = \left\lfloor t \cdot \frac{2^{\mu 2}}{2^{\mu 1}} \right\rfloor + \left\lfloor L \cdot \frac{2^{\mu 2}}{2^{\mu 1}} \right\rfloor \tag{19}$$

$$s = \left\lceil t \cdot \frac{2^{\mu 2}}{2^{\mu 1}} \right\rceil + \left\lceil L \cdot \frac{2^{\mu 2}}{2^{\mu 1}} \right\rceil \tag{20}$$

$$s = \left\lfloor t \cdot \frac{2^{\mu 2}}{2^{\mu 1}} \right\rfloor + \left\lceil L \cdot \frac{2^{\mu 2}}{2^{\mu 1}} \right\rceil \tag{21}$$

$$s = \left\lfloor t \cdot \frac{2^{\mu 2}}{2^{\mu 1}} \right\rfloor + L \cdot \frac{2^{\mu 2}}{2^{\mu 1}} \tag{22}$$

$$s = \left\lfloor (t+L) \cdot \frac{2^{\mu 2}}{2^{\mu 1}} \right\rfloor \tag{23}$$

$$s = \left\lceil (t+L) \cdot \frac{2^{\mu 2}}{2^{\mu 1}} \right\rceil \tag{24}$$

It should be understood that for a specific process of performing the foregoing corresponding steps by the units in the apparatus 1000, refer to the foregoing descriptions of the method embodiment with reference to FIG. 6. For brevity, details are not described herein again.

In a hardware implementation, the processing unit may be a processor, a processing circuit, or the like; the transceiver unit may be a transceiver (or a transceiver circuit) or the like; and the transceiver unit may form a communications interface.

In a an embodiment process, the processor may be configured to perform, for example but not limited to, baseband-related processing; and the transceiver may be configured to perform, for example but not limited to, radio frequency receiving and sending. The foregoing components may be separately disposed on chips independent of each other, or at least some or all of the components may be disposed on a same chip. For example, the processor may further be classified into an analog baseband processor and a digital baseband processor. The analog baseband processor and the transceiver may be integrated on a same chip, and the digital baseband processor may be disposed on an independent chip. With continuous development of integrated circuit technologies, more components can be integrated into a same chip. For example, the digital baseband processor and a plurality of application processors (for example, but not limited to, a graphics processing unit and a multimedia processor) may be integrated into a same chip. Such chip may be referred to as a system on chip (system on chip, SOC). Whether the components are independently disposed on different chips or are integrated and disposed on one or more chips usually depends on a specific requirement of a product design. A an embodiment form of the foregoing components is not limited in the embodiments of this application.

Figure 11:
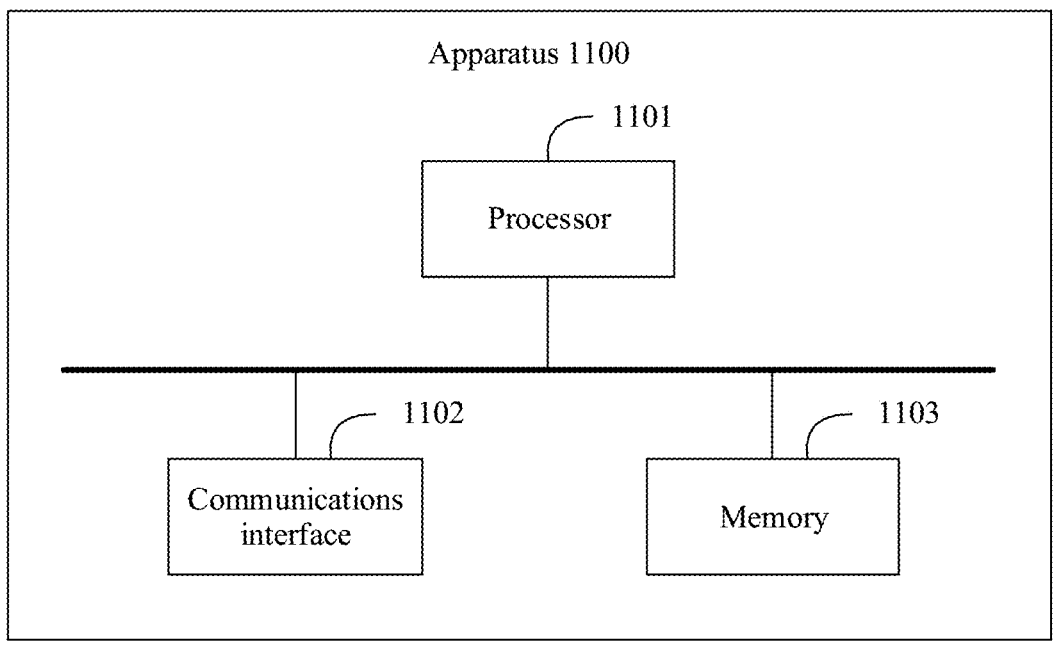
FIG. 11 is another schematic block diagram of a communication failure recovery apparatus according to an embodiment of this application.

It may be understood that, for the terminal device or the network device in the foregoing embodiments, program instructions can be executed by a hardware platform having a processor and a communications interface to implement the functions in any one of the designs in the foregoing embodiments of this application. Based on this, FIG. 11 is schematic block diagram of a communications failure recovery apparatus 1100 according to an embodiment of this application. The apparatus 1100 includes:
 at least one processor 1101, and optionally includes a communications interface 1102 and a memory 1103, where the communications interface 1102 is configured to support the communications apparatus 1100 in communicating and interacting with another device, the memory 1003 has program instructions, and the at least one processor 1101 runs the program instructions, so that a function of operating on any one of the following devices in any design of the foregoing embodiments of this application is implemented: a terminal device or a network device. In an optional design, the memory 1103 may be configured to store program instructions required for implementing the foregoing device functions or process data generated in a program execution process. Optionally, the apparatus 1100 may further include an internal interconnection line, to implement communication interaction between the at least one processor 1101, the communications interface 1102, and the memory 1103. It may be considered that the at least one processor 1001 may be implemented by using a dedicated processing chip, a processing circuit, a processor, or a general-purpose chip.

It may be understood that the methods, the procedures, the operations, or the steps in the designs described in the embodiments of this application can be implemented in a one-to-one correspondence manner by using computer software, electronic hardware, or a combination of computer software and electronic hardware. Whether these functions are performed in a hardware manner or a software manner depends on specific application and a design constraint of the technical solutions. For example, in consideration of aspects such as good universality, low costs, and decoupling between software and hardware, these functions may be implemented by executing program instructions. For another example, in consideration of aspects such as system performance and reliability, these functions may be implemented by using a private circuit. A person of ordinary skill in the art may implement the described functions by using different methods for each particular application. This is not limited herein.

According to the methods provided in the embodiments of this application, this application further provides a computer program product. The computer program product includes computer program code. When the computer program code is run on a computer, the computer is enabled to perform the methods in the foregoing embodiments. The embodiments in this application may also be combined with each other.

Based on the methods provided in the embodiments of this application, this application further provides a computer-readable medium. The computer-readable medium stores program code, and when the program code is run on a computer, the computer is enabled to perform the methods in the foregoing embodiments.

Based on the methods provided in the embodiments of this application, this application further provides a system, including the foregoing terminal device and network device.

In the embodiments of this application, it should be noted that the foregoing method embodiments in the embodiments of this application may be applied to a processor, or may be implemented by a processor. The processor may be an integrated circuit chip and has a signal processing capability. In an embodiment process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

An embodiment of this application further provides a processor-readable storage medium, including instructions. When the instructions are run on a processor, the foregoing method is implemented. When the processor executes the method in the embodiments of the present invention, a sending action may be that an input/output port of the processor outputs a baseband signal that carries to-be-sent information, and a receiving action may be that the input/output port of the processor receives a baseband signal that carries to-be-received information. It may be understood that the processor-readable storage medium provided in this embodiment of the present invention may also be a computer-readable storage medium.

An example of the present invention further provides an apparatus (for example, an integrated circuit, a wireless device, or a circuit module), configured to implement the foregoing methods. The apparatus includes a processor and a memory connected to the processor. The memory is configured to store instructions. The processor is configured to read and execute the instructions stored in the memory, so that the apparatus performs the foregoing method. The apparatus described in this specification may be implemented by an independent device or a part of a relatively large device. The device may be: (i) an independent IC, (ii) a set of one or more ICs, where the set may include a memory IC configured to store data and/or instructions, (iii) an RFIC such as an RF receiver or an RF transmitter/receiver, (iv) an ASIC such as a mobile station modem, (v) a module that can be embedded in another device, (vi) a receiver, a cellular phone, a wireless device, a hand-held phone, or a mobile unit, or (vii) others.

The method and apparatus that are provided in the embodiments of the present invention may be applied to a terminal device or an access network device (or a network device) (which may be collectively referred to as a wireless device). The terminal device, the access network device, or the wireless device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method is not limited in the embodiments of the present invention, provided that the execution body can perform communication based on the signal transmission method in the embodiments of the present invention by running a program that records code of the method in the embodiments of the present invention. For example, the wireless communication method in the embodiments of the present invention may be performed by the terminal device or the access network device, or a function module that is in the terminal device or the access network device and that can invoke and execute a program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular application and a design constraint of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD)), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present invention essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely an embodiments of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. An information indication method, comprising:
receiving, by a terminal device, first indication information, wherein the first indication information indicates A transmission configuration indicator (TCI) states, where A is a positive integer greater than or equal to two;
receiving, by the terminal device, second indication information, wherein the second indication information indicates a first codepoint, and the first codepoint is one of P codepoint(s), where P is a positive integer;
determining, by the terminal device, according to a preset rule and based on the first codepoint, at least one TCI state corresponding to the first codepoint, wherein the preset rule comprises a rule for mapping the A TCI states to the P codepoint(s), and at least one codepoint in the P codepoint(s) corresponds to at least two TCI states in the A TCI states; and
receiving, by the terminal device, downlink information based on the at least one TCI state corresponding to the first codepoint:
wherein the A TCI states comprise K1 first TCI states and K2 second TCI states, where K1 and K2 are positive integers, and $K1+K2 \leq A$;
wherein the preset rule comprises a first TCI state mapping rule and a second TCI state mapping rule, wherein the first TCI state mapping rule comprises a rule for mapping the K1 first TCI states to L1 codepoints in the P codepoint(s), and wherein the second TCI state mapping rule comprises a rule for mapping the K2 second TCI states to L2 codepoints in the P codepoint(s), where L1 and L2 are positive integers:
wherein K1 and L1 are greater than or equal to 2;
wherein the first TCI state mapping rule comprises: the K1 first TCI states arranged in a first order are sequentially mapped to K1 codepoints in the L1 codepoints arranged in a second order, where $K1 \leq L1$;
wherein the first order is indicated by the first indication information:
wherein the second order is an ascending order of codepoint values;
wherein K2 and L2 are greater than or equal to 2;
wherein the second TCI state mapping rule comprises: the K2 second TCI states arranged in a third order are sequentially mapped to K2 codepoints in the L2 codepoints arranged in a fourth order, where $K2 \leq L2$;
wherein the third order is indicated by the first indication information; and
wherein the fourth order is an ascending order of codepoint values.

2. The method according to claim 1, wherein the L1 codepoints are predefined; and
wherein the L2 codepoints are indicated by fourth indication information.

3. The method according to claim 2, wherein
the fourth indication information comprises a second bitmap, wherein the second bitmap is a P bitmap, and wherein L2 bits having values of 1 in the second bitmap indicate the L2 codepoints.

4. The method according to claim 1, wherein:
a minimum codepoint value in the L1 codepoints is X, wherein X is predefined or is indicated by fifth indication information, where X is an integer, and $0 \leq X+L1 \leq P$; or a maximum codepoint value in the L1 codepoints is X, wherein X is predefined or is indicated by the fifth indication information, where X is an integer, and $X \geq L1$; and/or
wherein:
a minimum codepoint value in the L2 codepoints is Y, wherein Y is predefined or is indicated by sixth indication information, where Y is an integer, and $0 \leq Y+L2 \leq P$; or
a maximum codepoint value in the L2 codepoints is Y, wherein Y is predefined or is indicated by the sixth indication information, where Y is an integer, and $Y \geq L2$.

5. The method according to claim 1, wherein the codepoint values of the L1 codepoints are consecutive.

6. The method according to claim 1, wherein the L1 codepoints and the L2 codepoints comprise at least one same codepoint.

7. The method according to claim 1, wherein the first indication information is a media access control control element (MAC CE).

8. The method according to claim 1, wherein the first indication information comprises a first media access control control element (MAC CE) and a second MAC CE, wherein the first MAC CE indicates the K1 first TCI states, and wherein the second MAC CE indicates the K2 second TCI states.

9. An information indication method, comprising:
sending, by a base station, first indication information, wherein the first indication information indicates A transmission configuration indicator (TCI) states, and A is a positive integer greater than or equal to 2;
determining, by the base station, according to a preset rule and based on at least one TCI state, a first codepoint corresponding to the at least one TCI state, wherein the preset rule comprises a rule for mapping the A TCI states to P codepoint(s), wherein at least one codepoint in the P codepoint(s) corresponds to at least two TCI states in the A TCI states, and wherein the first codepoint is one of the P codepoint(s), where P is a positive integer;
sending, by the base station, second indication information, wherein the second indication information indicates the first codepoint; and
sending, by the base station, downlink information based on the at least one TCI state;
wherein the A TCI states comprise K1 first TCI states and K2 second TCI states, where K1 and K2 are positive integers, and $K1+K2 \leq A$;
wherein the preset rule comprises a first TCI state mapping rule and a second TCI state mapping rule, wherein the first TCI state mapping rule comprises a rule for mapping the K1 first TCI states to L1 codepoints in the P codepoint(s), and wherein the second TCI state mapping rule comprises a rule for mapping the K2 second TCI states to L2 codepoints in the P codepoint(s), where L1 and L2 are positive integers;
wherein K1 and L1 are greater than or equal to 2;
wherein the first TCI state mapping rule comprises: the K1 first TCI states arranged in a first order are sequentially mapped to K1 codepoints in the L1 codepoints arranged in a second order, where $K1 \leq L1$;
wherein the first order is indicated by the first indication information;
wherein the second order is an ascending order of codepoint values;
wherein K2 and L2 are greater than or equal to 2;

wherein the second TCI state mapping rule comprises: the K2 second TCI states arranged in a third order are sequentially mapped to K2 codepoints in the L2 codepoints arranged in a fourth order, where K2≤L2;

wherein the third order is indicated by the first indication information; and wherein the fourth order is an ascending order of codepoint values.

10. The method according to claim 9, wherein the L1 codepoints are predefined; and wherein the L2 codepoints are indicated by fourth indication information.

11. The method according to claim 10, wherein the fourth indication information comprises a second bitmap, wherein the second bitmap is a P bitmap, and wherein L2 bits having values of 1 in the second bitmap indicate the L2 codepoints.

12. The method according to claim 9, wherein the codepoint values of the L1 codepoints are consecutive.

13. The method according to claim 9, wherein the first indication information is a media access control control element (MAC CE).

14. An information indication apparatus, comprising:

a processor; and a transceiver coupled to the processor;

wherein the transceiver is configured to receive first indication information, wherein the first indication information indicates A transmission configuration indicator TCI states, where A is a positive integer greater than or equal to 2;

wherein the transceiver is further configured to receive second indication information, wherein the second indication information indicates a first codepoint, and the first codepoint is one of P codepoint(s), where P is a positive integer;

wherein the processor is configured to determine, according to a preset rule and based on the first codepoint, at least one TCI state corresponding to the first codepoint, wherein the preset rule comprises a rule for mapping the A TCI states to the P codepoint(s), and at least one codepoint in the P codepoint(s) corresponds to at least two TCI states in the A TCI states; and wherein the transceiver is configured to receive downlink information and/or send uplink information based on the at least one TCI state corresponding to the first codepoint;

wherein the A TCI states comprise K1 first TCI states and K2 second TCI states, where K1 and K2 are positive integers, and K1+K2≤A;

wherein the preset rule comprises a first TCI state mapping rule and a second TCI state mapping rule, wherein the first TCI state mapping rule comprises a rule for mapping the K1 first TCI states to L1 codepoints in the P codepoint(s), and wherein the second TCI state mapping rule comprises a rule for mapping the K2 second TCI states to L2 codepoints in the P codepoint (s), where L1 and L2 are positive integers;

wherein K1 and L1 are greater than or equal to 2:

wherein the first TCI state mapping rule comprises: the K1 first TCI states arranged in a first order are sequentially mapped to K1 codepoints in the L1 codepoints arranged in a second order, where K1≤L1;

wherein the first order is indicated by the first indication information;

wherein the second order is an ascending order of codepoint values;

wherein K2 and L2 are greater than or equal to 2;

wherein the second TCI state mapping rule comprises: the K2 second TCI states arranged in a third order are sequentially mapped to K2 codepoints in the L2 codepoints arranged in a fourth order, where K2≤L2:

wherein the third order is indicated by the first indication information; and wherein the fourth order is an ascending order of codepoint values.

15. The apparatus according to claim 14, wherein the L1 codepoints are predefined; and wherein the L2 codepoints are indicated by fourth indication information.

16. The apparatus according to claim 15, wherein the fourth indication information comprises a second bitmap, wherein the second bitmap is a P bitmap, and wherein L2 bits having values of 1 in the second bitmap indicate the L2 codepoints.

17. The apparatus according to claim 14, wherein the codepoint values of the L1 codepoints are consecutive.

18. The apparatus according to claim 14, wherein the first indication information is a media access control control element (MAC CE).

* * * * *